United States Patent
Igashira et al.

(10) Patent No.: US 6,311,674 B1
(45) Date of Patent: Nov. 6, 2001

(54) FUEL INJECTION SYSTEM FOR INTERNAL COMBUSTION ENGINE

(75) Inventors: Toshihiko Igashira, Toyokawa; Shigeiku Enomoto, Aichi-ken; Tadaaki Makino, Aichi-ken; Yutaka Miyamoto, Aichi-ken; Yasuhiro Horiuchi, Toyota; Nobuhiko Shima, Kariya, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/291,181

(22) Filed: Apr. 14, 1999

(30) Foreign Application Priority Data

Apr. 15, 1998 (JP) .................................................. 10-104714
May 15, 1998 (JP) .................................................. 10-152135
May 28, 1998 (JP) .................................................. 10-147550

(51) Int. Cl.⁷ .......................... F02M 41/00; F02M 37/04
(52) U.S. Cl. ........................................... 123/458; 123/496
(58) Field of Search .................................. 123/458, 456, 123/506, 445, 446, 496, 447; 417/386, 462, 450

(56) References Cited

U.S. PATENT DOCUMENTS

| | | | |
|---|---|---|---|
| 4,492,534 | 1/1985 | Miyaki et al. | 417/386 |
| 4,719,889 * | 1/1988 | Amann et al. | 123/447 |
| 4,777,921 * | 10/1988 | Miyaki et al. | 123/456 |
| 4,784,101 * | 11/1988 | Iwanaga et al. | 123/446 |
| 4,884,545 | 12/1989 | Mathis | 123/447 |
| 5,094,216 | 3/1992 | Miyaki et al. | 123/506 |
| 5,101,797 | 4/1992 | Sturz et al. . | |
| 5,697,343 | 12/1997 | Isozumi et al. . | |

FOREIGN PATENT DOCUMENTS

| | | |
|---|---|---|
| 19611803 A1 | 10/1997 | (DE) . |
| 0 429 205 A2 | 5/1991 | (EP) . |
| 0 669 457 A1 | 8/1995 | (EP) . |
| 0 802 322 A1 | 10/1997 | (EP) . |
| 0 816 672 A2 | 1/1998 | (EP) . |
| 59-65523 | 4/1984 | (JP) . |
| 63-50649 | 3/1988 | (JP) . |
| 64-73166 | 3/1989 | (JP) . |
| 2742584 | 2/1998 | (JP) . |

* cited by examiner

*Primary Examiner*—Henry C. Yuen
*Assistant Examiner*—Mahmoud M Gimie
(74) *Attorney, Agent, or Firm*—Pillsbury Winthrop LLP

(57) ABSTRACT

A fuel injection apparatus for an internal combustion engine is provided which is designed to control a fuel discharge from a fuel injection pump by regulating the quantity of fuel sucked into the fuel injection pump. The fuel injection pump is driven in synchronism with rotation of the engine to pressurize and supply the fuel to an accumulator chamber from which the fuel is injected into cylinders of the engine. The solenoid valve moves a valve member linearly to open and close a fluid path leading to the fuel injection pump. The controller actuates the solenoid valve in one of a first control mode when the engine speed is low and a second control mode when the engine speed is high. In the first control mode, a valve on-duration in which the solenoid valve is turned on to open the fluid path through the valve member and an area of the fluid path opened by the valve member are both controlled. In the second control mode, only the opened area of the fluid path is controlled. This achieves fine adjustment of quantity of fuel discharged from the fuel injection pump over a wide range of engine speeds.

26 Claims, 32 Drawing Sheets

LOW ENGINE SPEED MODE

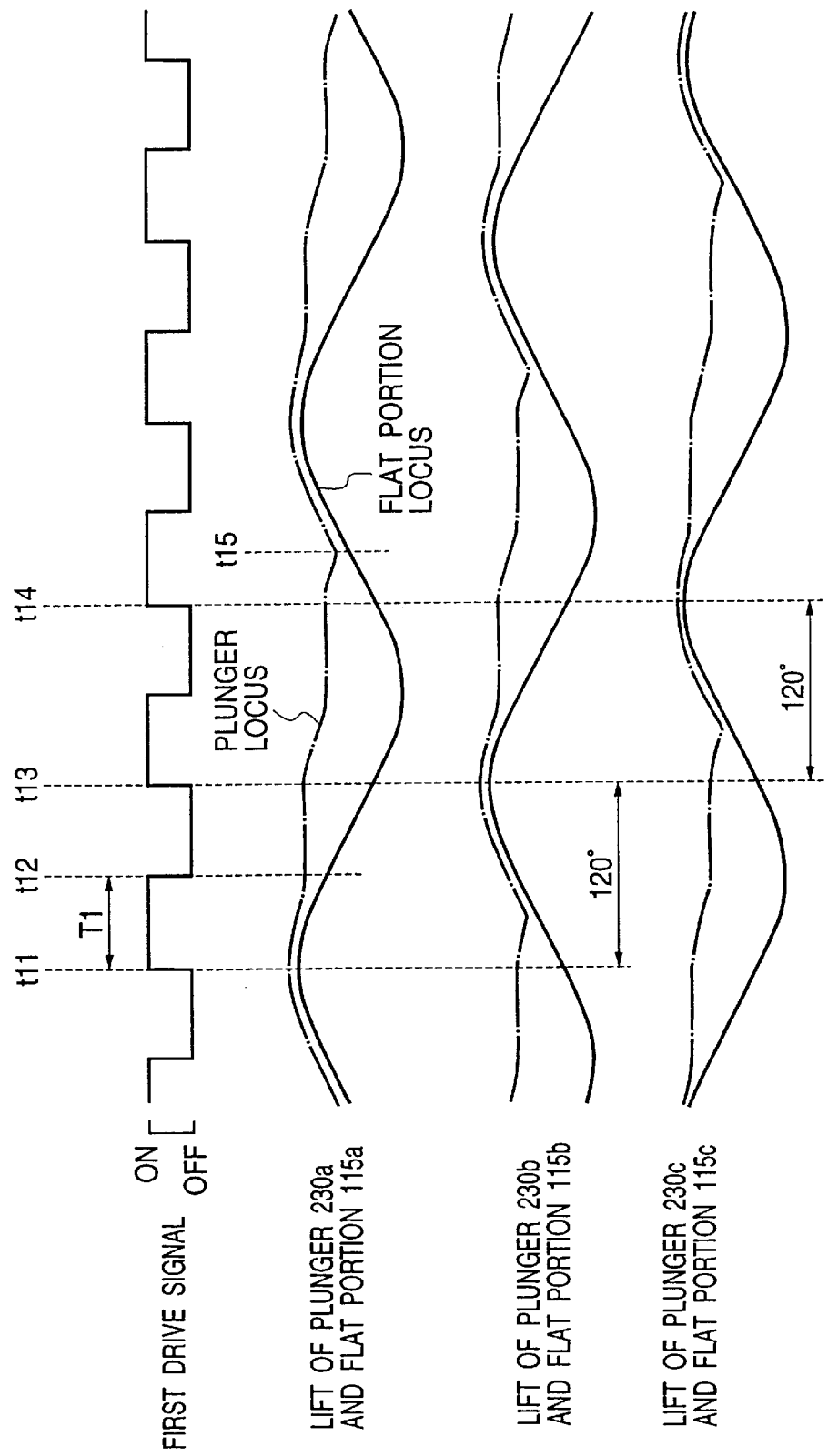

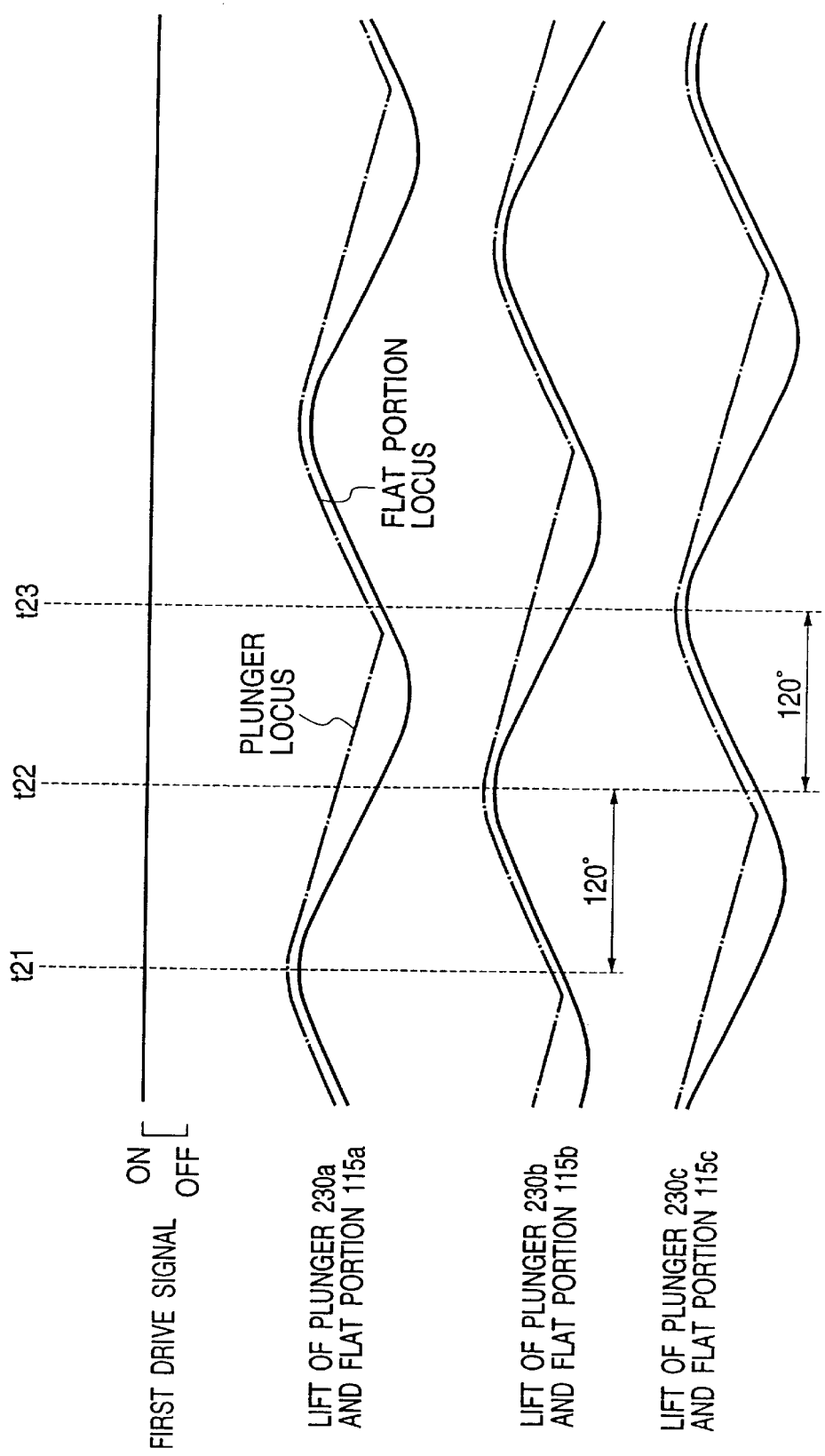

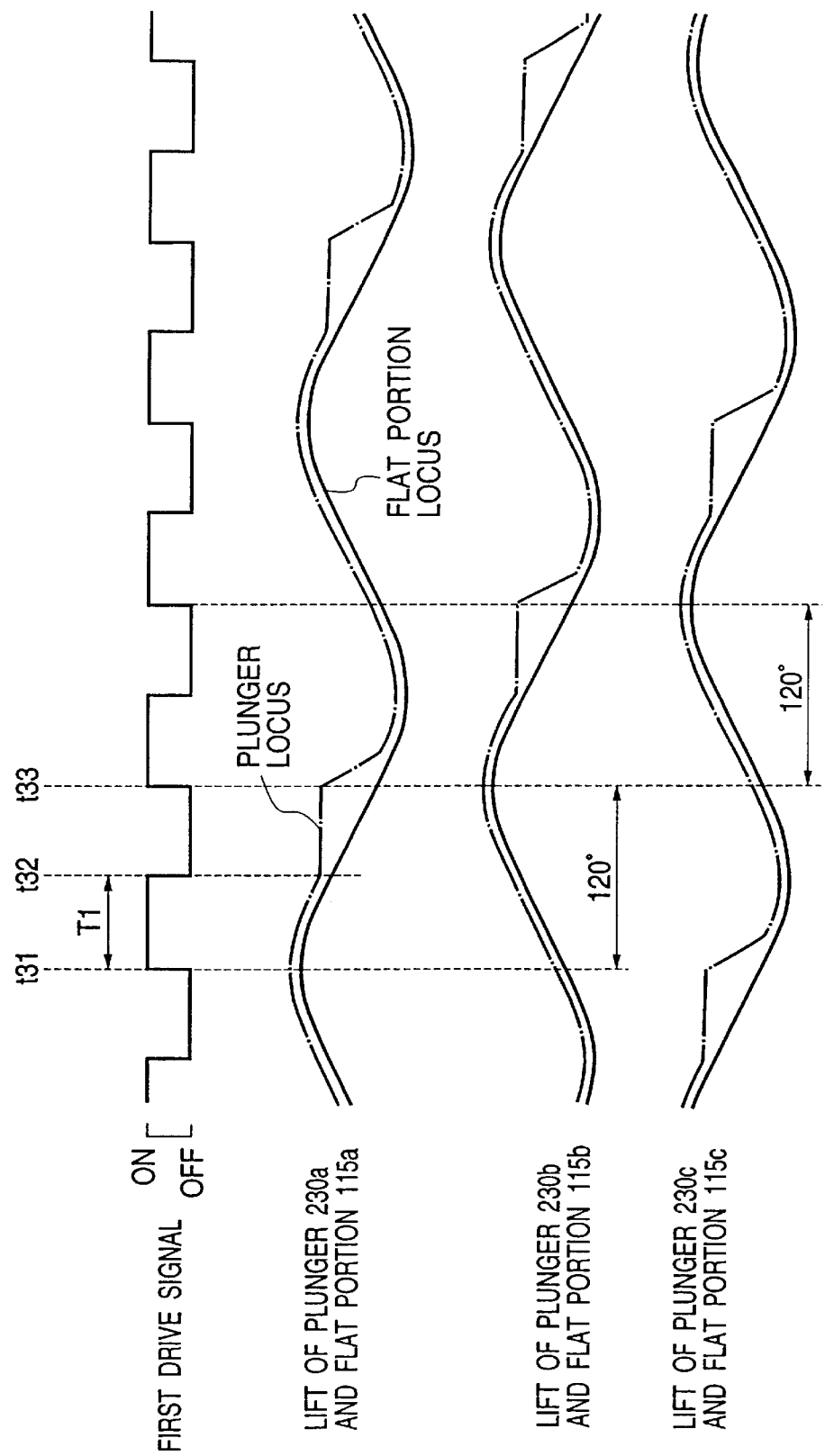

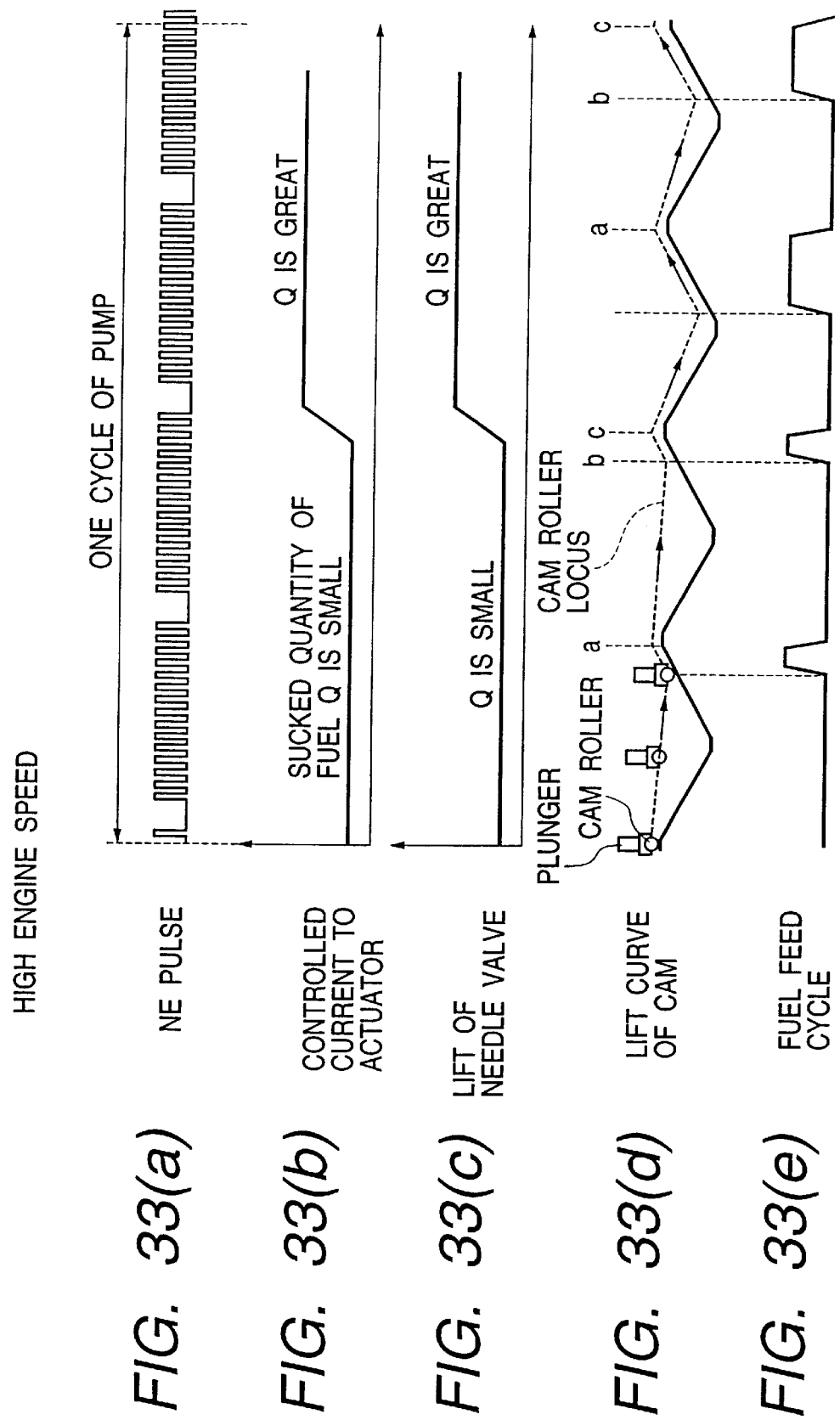

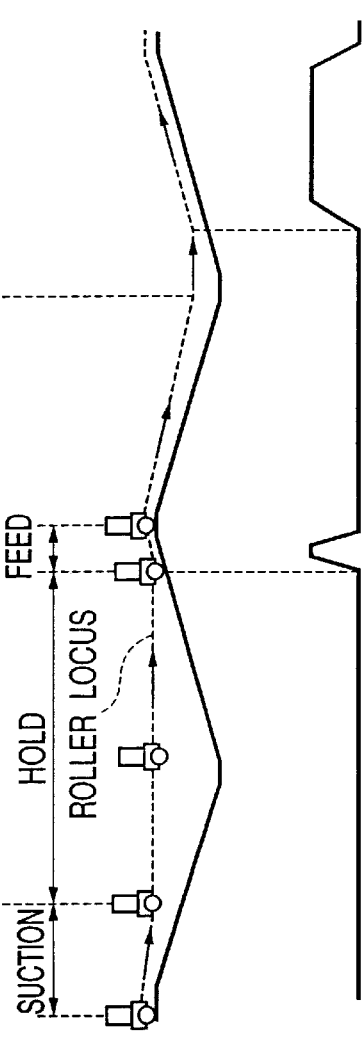
FIG. 34(a) NE PULSE
FIG. 34(b) CONTROLLED CURRENT TO ACTUATOR
FIG. 34(c) LIFT OF NEEDLE VALVE
FIG. 34(d) LIFT CURVE OF CAM
FIG. 34(e) FUEL FEED CYCLE

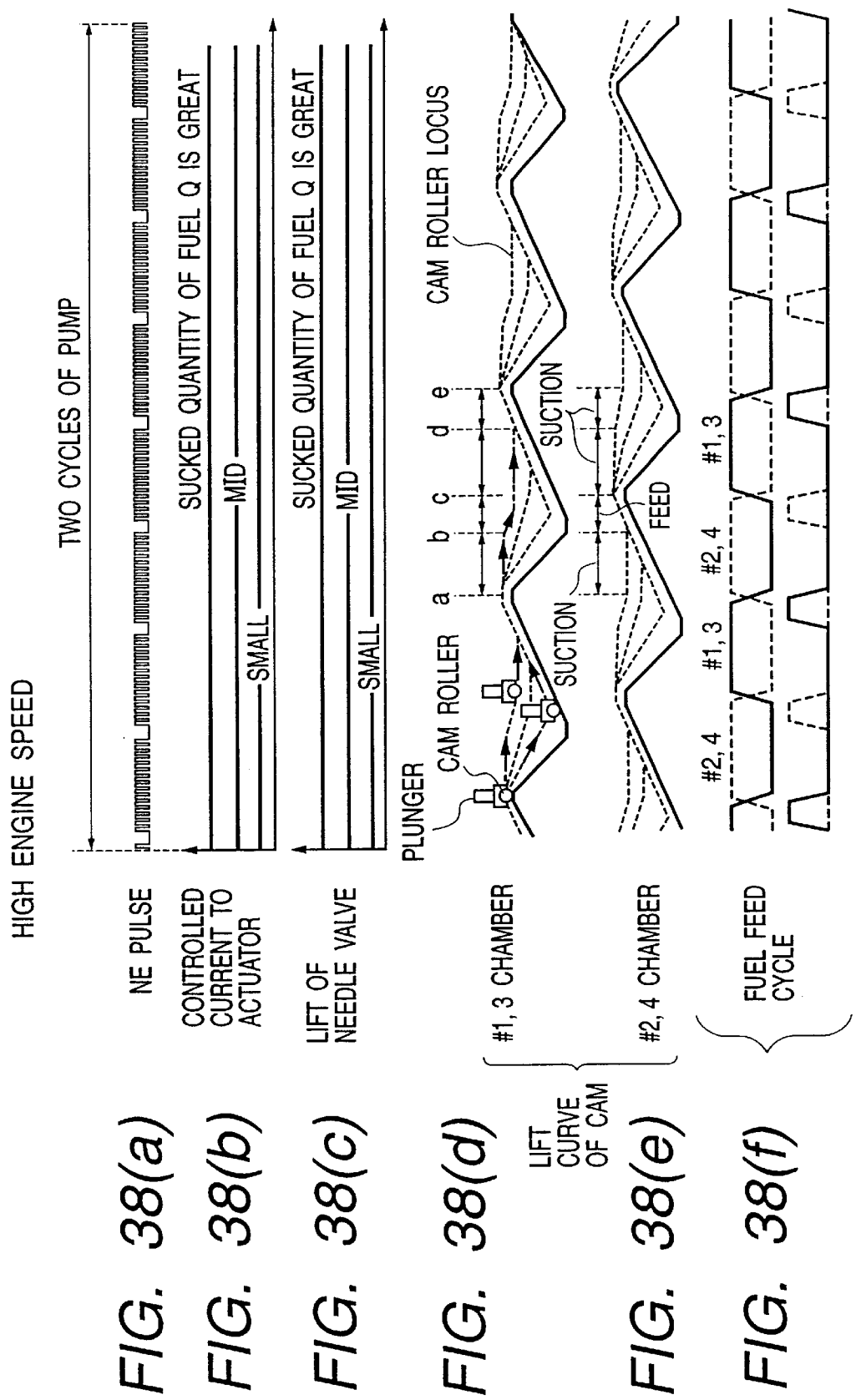

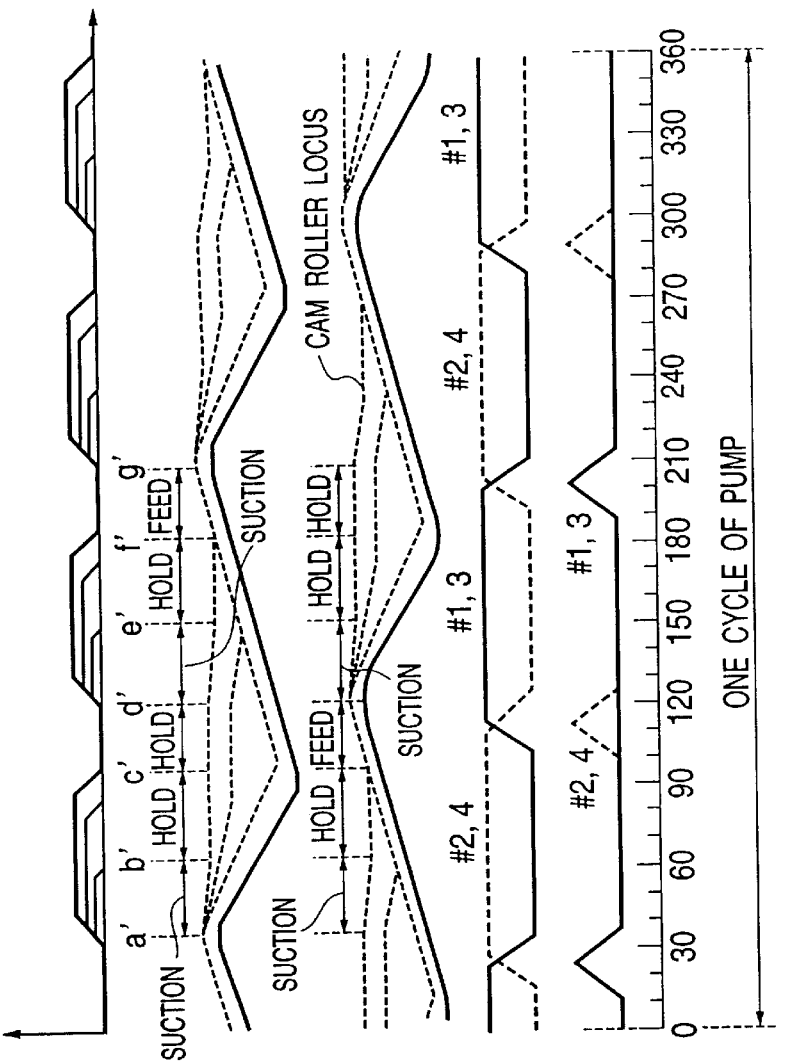
FIG. 39(a) NE PULSE
FIG. 39(b) CONTROLLED CURRENT TO ACTUATOR
FIG. 39(c) LIFT OF NEEDLE VALVE
FIG. 39(d) #1, 3 CHAMBER
FIG. 39(e) #2, 4 CHAMBER
FIG. 39(f) FUEL FEED CYCLE

FUEL INJECTION SYSTEM FOR INTERNAL COMBUSTION ENGINE

BACKGROUND OF THE INVENTION

1. Technical Field of the Invention

The present invention relates generally to a fuel injection system for internal combustion engines designed to control a fuel discharge from a fuel injection pump by regulating the quantity of fuel sucked into the fuel injection pump.

2. Background Art

U.S. Pat. No. 4,492,534 (Japanese Patent First Publication No. 59-65523) teaches a fuel injection system which has a metering valve disposed in a fuel feed line between a feed pump and a fuel injection pump and controls an on-off duration in which the metering valve is turned on and off cyclically to regulate the quantity of fuel sucked into the fuel injection pump. The metering valve is switched between a fully opened position and a fully closed position. The ratio of a change in sucked quantity of fuel to a change in on-duration in which the metering valve is opened is, thus, increased as the on-duration is prolonged, which leads to difficulty in controlling the quantity of fuel supplied to the fuel injection pump accurately by changing the on-duration of the metering valve.

Usually, the fuel injection pump sucks the fuel in synchronism with rotation of the engine. An increase in engine speed, thus, causes the length of time the fuel injection pump sucks the fuel to be decreased. Switching between the fully opened position and the fully closed position of the metering valve consumes the response time inherent to the metering valve. Therefore, for instance, when the engine is operating at high speeds and high loads, and it is required to increase the quantity of fuel discharged from the fuel injection pump, it will cause the switching between the fully opened position and the fully closed position of the metering valve to become fast, thus resulting in difficulty in controlling the quantity of fuel sucked into the fuel injection pump if the response rate of the metering valve is low.

This problem may be alleviated by elevating the voltage for energizing the metering valve to increase the response rate thereof. This is, however, impractical because of increase in manufacturing cost.

The adjustment of quantity of fuel supplied to the fuel injection pump may alternatively be achieved by changing an opening area of the metering valve. In typical distributor type fuel injection pumps, the current supplied to a timing control valve is controlled to regulate an opening area of the timing control valve in order to control the fuel injection timing. This technique may be employed to regulate the quantity of fuel sucked into the fuel injection pump.

However, when the engine is operating at low speeds, it will cause the length of time the fuel injection pump sucks the fuel to be increased. Therefore, a ratio $\Delta q/\Delta L$ of a change in quantity of fuel discharged from the metering valve to a change in opened area of the metering valve, as shown in FIG. 16, increases as the engine speed decreases. For example, during idle modes of engine operation, it becomes difficult to control the quantity of fuel supplied to the fuel injection pump accurately.

SUMMARY OF THE INVENTION

It is therefore a principal object of the present invention to avoid the disadvantages of the prior art.

It is another object of the present invention to provide an improved pump structure used in a fuel injection apparatus which is capable of controlling the quantity of fuel supplied to a fuel injection pump accurately over a wide range of engine speeds.

According to one aspect of the invention, there is provided a fuel injection apparatus for an internal combustion engine. The fuel injection apparatus comprises: (1) a fuel injection pump which sucks fuel from a feed pump in synchronism with rotation of the engine and pressurizes and discharges the fuel for fuel injection to the engine; (2) a metering valve disposed between the feed pump and the fuel injection pump to regulate the quantity of fuel sucked into the fuel injection pump, the metering valve having formed therein a fluid path communicating at one end with the feed pump and at the other end with the fuel injection pump and a valve member designed to selectively open and close the fluid path and change an area of the fluid path opened by the valve member; and (3) a controller which actuates the metering valve so that a pressure of the fuel discharged from the fuel pump reaches a target pressure, the controller controlling a valve on-off duration in which the valve member of the metering valve opens and closes the fluid path in a cycle to establish and block fluid communication between the feed pump and the fuel injection pump and the opened area of the fluid path independently as a function of an engine operating condition.

In the preferred mode of the invention, the controller actuates the metering valve in a first control mode in which the valve on-off duration and the opened area of the fluid path of the metering valve are both controlled when an engine speed is low and in a second control mode in which only the opened area of the fluid path of the metering valve is controlled when the engine speed is high.

The controller includes (a) a controlled variable determining circuit which determines a first basic controlled variable for determining the valve on-off duration of the metering valve and a second basic controlled variable for determining the opened area of the fluid path of the metering valve according to a quantity of the fuel to be discharged from the fuel injection pump, (b) a correction circuit which, when the pressure of fuel discharged from the fuel injection pump is different from the target pressure, corrects the first basic controlled variable to have the pressure of fuel discharged from the fuel injection pump reach the target pressure, (c) a decision circuit which decides whether the corrected first controlled variable lies within a preselected control range or not, (d) a first target controlled variable determining circuit which determines the corrected first controlled variable as a first target controlled variable that is a target of the valve on-off duration when it is decided that the corrected first controlled variable lies within the preselected control range and which determines one of upper and lower limits defining the control range close to the corrected first controlled variable as the first target controlled variable when it is decided that the corrected first controlled variable lies out of the preselected control range, (e) a second target controlled variable determining circuit which determines the second controlled variable as a second target controlled variable that is a target of the opened area of the fluid path of the metering valve when it is decided that the corrected first controlled variable lies within the preselected control range and which corrects the second controlled variable to produce the second target controlled variable so as to have the pressure of fuel discharged from the fuel injection pump reach the target pressure when it is decided that the corrected first controlled variable lies out of the preselected control range.

The metering valve includes a solenoid valve which moves the valve member. The controller controls an on-off operation of the solenoid valve and a rate of current supplied to the solenoid valve to regulate the on-off duration of the metering valve and the opened area of the fluid path.

The fuel injection pump feeds the fuel to an accumulator chamber storing therein the fuel under high pressure for supplying the fuel to injectors installed in cylinders of the engine. The controller determines the on-off duration of the metering valve and the opened area of the fluid path based on an actual fuel pressure in the accumulator chamber, a target injection quantity of the fuel and a target pressure of the fuel injected to the engine from the injectors, and a speed of the engine so that the actual fuel pressure in the accumulator chamber reaches the target pressure of fuel.

According to the second aspect of the invention, there is provided a fuel injection apparatus for an internal combustion engine. The fuel injection apparatus comprises: (1) a variable discharge pump driven in synchronism with rotation of the engine to pressurize and supply fuel to an accumulator chamber from which the fuel is injected into cylinders of the engine; (2) a solenoid valve moving a valve member linearly to open and close a fluid path connecting at one end with an inlet and at the other end with an outlet of the variable discharge pump; and (3) a controller monitoring an operating condition of the engine, the controller actuating the solenoid valve in one of a first control mode and a second control mode according to the operating condition of the engine. In the first control mode, a valve on-duration in which the solenoid valve is turned on to open the fluid path through the valve member and an area of the fluid path opened by the valve member to establish fluid communication between the inlet and outlet of the variable discharge pump are both controlled. In the second control mode, only the opened area of the fluid path is controlled.

In the preferred mode of the invention, the controller monitors a speed of the engine as the operating condition and actuates the solenoid valve in the first control mode when the speed of the engine is low and in the second control mode when the speed of the engine is high.

The variable discharge pump includes a moving member which rotates to suck and feed the fuel cyclically. An angular position determining circuit is further provided which determines an angular position the moving member of the variable discharge pump. The controller monitors the angular position of the moving member determined by the angular position determining circuit and controls an on-off operation of the solenoid valve in synchronism with feeding of the fuel by the variable discharge pump.

The solenoid valve is disposed in the inlet of the variable discharge pump.

The solenoid valve includes a coil connecting at a first end with a power supply terminal and at a second end with a grounding terminal. The controller includes a solenoid drive circuit which includes a first switching element connecting with the second end of the coil to control a current flow through the coil, a diode disposed in a circuit line extending in parallel to the coil between the power supply terminal and the grounding terminal, allowing the current flow only to the power supply terminal from the grounding terminal, and a second switching element which is disposed in a portion of the circuit line between the diode and the grounding terminal and which is turned on when the solenoid valve is energized to open the fluid path to allow the current to flow through the circuit line.

The solenoid drive circuit includes a step-up circuit which connects with the first switching element and which steps up an electric potential appearing at the grounding terminal of the coil temporarily.

According to the third aspect of the invention, there is provided a fuel injection apparatus for an internal combustion engine. The fuel injection apparatus comprises: (1) a variable discharge pump driven in synchronism with rotation of the engine to pressurize and supply fuel to an accumulator chamber from which the fuel is injected into cylinders of the engine; (2) a solenoid valve moving a valve member linearly to open and close a fluid path connecting at one end with an inlet and at the other end with an outlet of the variable discharge pump; and (3) a controller monitoring an operating condition of the engine. The controller regulates an amount of movement of the valve member to control an opened area of the fluid path according to a quantity of the fuel to be fed to the accumulator chamber and a valve on-duration in which the solenoid valve is turned on to open the fluid path through the valve member according to the operating condition of the engine.

In the preferred mode of the invention, the controller monitors a speed of the engine as the operating condition and actuates the solenoid valve in the first control mode when the speed of the engine is low and in the second control mode when the speed of the engine is high.

The variable discharge pump includes a moving member which rotates to suck and feed the fuel cyclically. An angular position determining circuit is further provided which determines an angular position the moving member of the variable discharge pump. The controller monitors the angular position of the moving member determined by the angular position determining circuit and controls an on-off operation of the solenoid valve in synchronism with feeding of the fuel by the variable discharge pump.

The solenoid valve is disposed in the inlet of the variable discharge pump.

The solenoid valve includes a coil connecting at a first end with a power supply terminal and at a second end with a grounding terminal. The controller includes a solenoid drive circuit which includes a first switching element connecting with the second end of the coil to control a current flow through the coil, a diode disposed in a circuit line extending in parallel to the coil between the power supply terminal and the grounding terminal, allowing the current flow only to the power supply terminal from the grounding terminal, and a second switching element which is disposed in a portion of the circuit line between the diode and the grounding terminal and which is turned on when the solenoid valve is energized to open the fluid path to allow the current to flow through the circuit line.

The solenoid drive circuit includes a step-up circuit which connects with the first switching element and which steps up an electric potential appearing at the grounding terminal of the coil temporarily.

According to the fourth aspect of the invention, there is provided a variable discharge pump. The variable discharge pump comprises: (1) a pump body having formed therein a cylindrical chamber within which a plunger is disposed slidably to define a pressure chamber between a head of the plunger and an inner wall of the cylindrical chamber; (2) a plunger moving member disposed within the pump body, moving the plunger in a first direction to increase a volume of the pressure chamber to suck fuel from an inlet line and in a second direction to decrease the volume of the pressure chamber to pressurize and fed the sucked fuel from an outlet line; (3) a throttle valve opening and closing a portion of the inlet line leading to the pressure chamber in the pump body, the throttle valve being designed to change an opened area of the portion of the inlet line; (4) a check valve allowing the fuel to flow from the throttle valve to the pressure chamber during a time when the fuel is sucked into the pressure chamber and blocking flow of the fuel from the pressure chamber to the throttle valve during a time when the fuel is pressurized and fed to the outlet line; and (5) a controller controlling a valve on-off duration in which the throttle valve opens and closes the portion of the inlet line in a cycle and the opened area of the portion of the inlet line to regulate a quantity of the fuel flowing into the pressure chamber.

In the preferred mode of the invention, the controller determines a valve on-duration in which the throttle valve opens the portion of the inlet line in synchronism with an operation of the plunger moving member.

According to the fifth aspect of the invention, there is provided a variable discharge pump. The variable discharge pump comprises: (1) a pump body having formed therein cylindrical chambers within which first and second plungers are disposed slidably to define first and second pressure chambers between heads of the first and second plungers and inner walls of the cylindrical chambers, respectively; (2) a plunger moving member disposed within the pump body, moving the first and second plungers in a first direction to increase volumes of the first and second pressure chambers to suck fuel from an inlet line and in a second direction to decrease the volumes of the first and second pressure chambers to pressurize and fed the sucked fuel from an outlet line, the plunger moving member moving the first and second plungers with different timings; (3) a throttle valve opening and closing a portion of the inlet line leading to the pressure chambers in the pump body, the throttle valve being designed to change an opened area of the portion of the inlet line; (4) first and second check valves disposed in first and second fluid paths connecting the inlet line and the first and second pressure chambers, respectively, the first and second check valves allowing the fuel to flow from the throttle valve to the first and second pressure chambers through the first and second fluid paths during a time when the fuel is sucked into the pressure chambers and blocking flow of the fuel from the first and second pressure chambers to the throttle valve through the first and second fluid paths during a time when the fuel is pressurized and fed to the outlet line; and (5) a controller controlling a valve on-off duration in which the throttle valve opens and closes the portion of the inlet line in a cycle and the opened area of the portion of the inlet line to regulate a quantity of the fuel flowing into the first and second pressure chambers.

According to the sixth aspect of the invention, there is provided a fuel injection apparatus for an internal combustion engine. The fuel injection apparatus comprises: (1) a variable discharge pump including (a) a pump body having formed therein a cylindrical chamber within which a plunger is disposed slidably to define a pressure chamber between a head of the plunger and an inner wall of the cylindrical chamber, (b) a plunger moving member disposed within the pump body, driven in synchronism with rotation of the engine, the plunger moving member moving the plunger in a first direction to increase a volume of the pressure chamber to suck fuel from an inlet line and in a second direction to decrease the volume of the pressure chamber to pressurize and fed the sucked fuel from an outlet line, (c) a throttle valve opening and closing a portion of the inlet line leading to the pressure chamber in the pump body, the throttle valve being designed to change an opened area of the portion of the inlet line, and (d) a check valve allowing the fuel to flow from the throttle valve to the pressure chamber during a time when the fuel is sucked into the pressure chamber and blocking flow of the fuel from the pressure chamber to the throttle valve during a time when the fuel is pressurized and fed to the outlet line; (2) an accumulator storing therein the fuel fed from the variable discharge pump for fuel injection to the engine; (3) an accumulator pressure sensor measuring a pressure of the fuel in the accumulator chamber; and (4) a controller controlling a valve on-off duration in which the throttle valve opens and closes the portion of the inlet line in a cycle and the opened area of the portion of the inlet line to regulate a quantity of the fuel flowing into the pressure chamber so that the pressure of the fuel in the accumulator reach a target pressure.

In the preferred mode of the invention, an engine speed determining circuit is further provided which determines a speed of the engine. The controller controls the valve on-off duration only when the speed of the engine is lower than a predetermined value.

The controller controls the valve on-off duration only when a change in pressure of the fuel in the accumulator chamber measured by the accumulator pressure sensor exceeds a given value.

According to the seventh aspect of the invention, a fuel injection apparatus for an internal combustion engine. The fuel injection apparatus comprises: (1) a variable discharge pump including (a) a pump body having formed therein cylindrical chambers within which first and second plungers are disposed slidably to define first and second pressure chambers between heads of the first and second plungers and inner walls of the cylindrical chambers, respectively, (b) a plunger moving member disposed within the pump body, moving the first and second plungers in a first direction to increase volumes of the first and second pressure chambers to suck fuel from an inlet line and in a second direction to decrease the volumes of the first and second pressure chambers to pressurize and fed the sucked fuel from an outlet line, the plunger moving member moving the first and second plungers with different timings, (c) a throttle valve opening and closing a portion of the inlet line leading to the pressure chambers in the pump body, the throttle valve being designed to change an opened area of the portion of the inlet line, and (d) first and second check valves disposed in first and second fluid paths connecting the inlet line and the first and second pressure chambers, respectively, the first and second check valves allowing the fuel to flow from the throttle valve to the first and second pressure chambers through the first and second fluid paths during a time when the fuel is sucked into the pressure chambers and blocking flow of the fuel from the first and second pressure chambers to the throttle valve through the first and second fluid paths during a time when the fuel is pressurized and fed to the outlet line; (2) an accumulator storing therein the fuel fed from the variable discharge pump for fuel injection to the engine; (3) an accumulator pressure sensor measuring a pressure of the fuel in the accumulator chamber; and (4) a controller controlling a valve on-off duration in which the throttle valve opens and closes the portion of the inlet line in a cycle and the opened area of the portion of the inlet line to regulate a quantity of the fuel flowing into the pressure chamber so that the pressure of the fuel in the accumulator reach a target pressure.

In the preferred mode of the invention, an engine speed determining circuit is further provided which determines a speed of the engine. The controller controls the valve on-off duration only when the speed of the engine is lower than a predetermined value.

The controller controls the valve on-off duration only when a change in pressure of the fuel in the accumulator chamber measured by the accumulator pressure sensor exceeds a given value.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 19 is a time chart which shows the relation among a first drive signal and the amount of lift of flat portions of an eccentric cam and plungers of a variable discharge high pressure pump in a low engine speed control mode;

FIG. 20 is a time chart which shows the relation among a first drive signal and the amount of lift of flat portions of an eccentric cam and plungers of a variable discharge high pressure pump in a high engine speed control mode;

FIG. 21 shows the relation among a first drive signal and the amount of lift of flat portions of an eccentric cam and plungers of a variable discharge high pressure pump when only the valve on-duration T1 is controlled;

FIG. 33(a) shows NE pulses produced by outputs of a rotational angle sensor;

FIG. 33(b) shows a controlled current supplied to an actuator of a throttle valve in a high engine speed range;

FIG. 33(c) shows a lift of a needle valve;

FIG. 33(d) shows a lift curve of a cam;

FIG. 33(e) shows an operation of a delivery valve in a low engine speed range;

FIG. 34(a) shows NE pulses produced by outputs of a rotational angle sensor;

FIG. 34(b) shows a controlled current supplied to an actuator of a throttle valve in a low engine speed range;

FIG. 34(c) shows a lift of a needle valve;

FIG. 34(d) shows a lift curve of a cam;

FIG. 34(e) shows an operation of a delivery valve in a low engine speed range;

FIG. 38(a) shows NE pulses produced by outputs of a rotational angle sensor;

FIG. 38(b) shows a controlled current supplied to an actuator of a throttle valve in a high engine speed range;

FIG. 38(c) shows a lift of a needle valve;

FIG. 38(d) shows a lift curve of a cam and the amount of lift of plungers in #1 and #3 pressure chambers;

FIG. 38(e) shows a lift curve of a cam and the amount of lift of plungers in #2 and #4 pressure chambers;

FIG. 38(f) shows an operation of a delivery valve in a high engine speed range;

FIG. 39(a) shows NE pulses produced by outputs of a rotational angle sensor;

FIG. 39(b) shows a controlled current supplied to an actuator of a throttle valve in a low engine speed range;

FIG. 39(c) shows a lift of a needle valve;

FIG. 39(d) shows a lift curve of a cam and the amount of lift of plungers in #1 and #3 pressure chambers;

FIG. 39(e) shows a lift curve of a cam and the amount of lift of plungers in #2 and #4 pressure chambers; and FIG. 39(f) shows an operation of a delivery valve in a low engine speed range.

DESCRIPTION OF THE PREFERRED EMBODIMENTS

Figure 1:
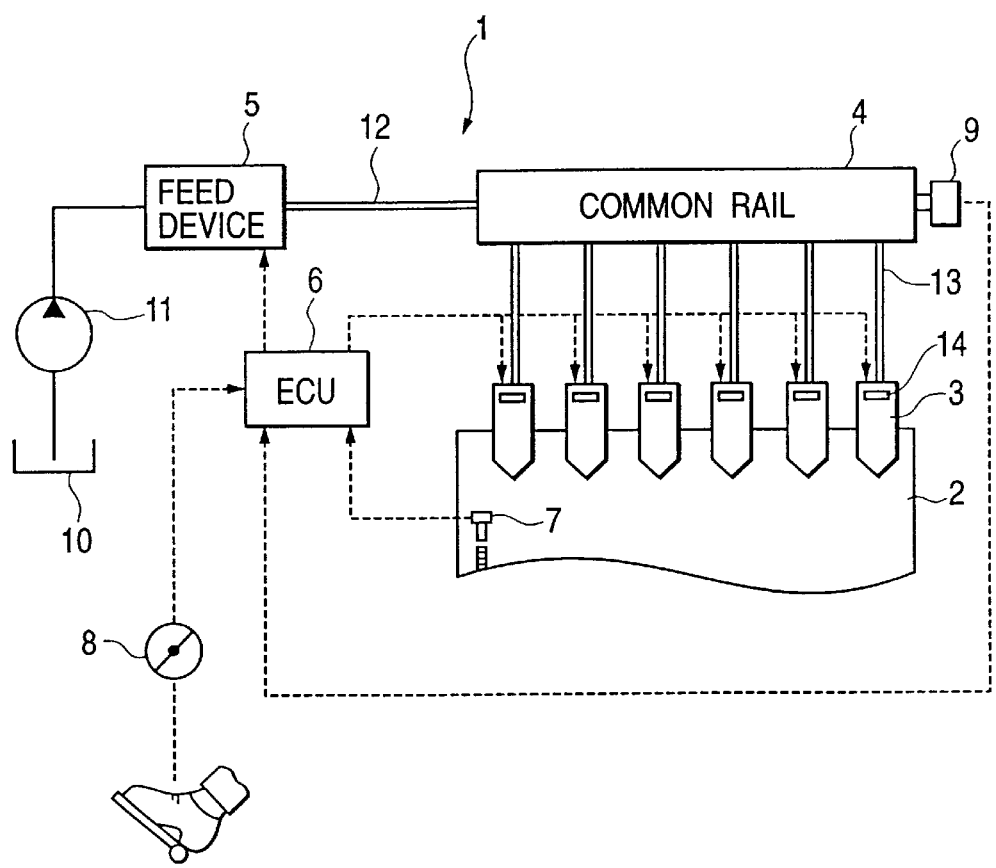
FIG. 1 is a block diagram which shows a fuel injection system according to the first embodiment of the invention.

Referring now to the drawings, wherein like numbers refer to like parts in several views, particularly to FIG. 1, there is shown an accumulator fuel injection system 1 used with a six-cylinder diesel engine 2 of an automotive vehicle as one example.

The accumulator fuel injection system 1 includes generally fuel injectors 3 each provided for one of cylinders of the engine 2, an accumulator or common rail 4 storing high-pressure fuel to be supplied to the fuel injectors 3, a fuel feed device 5 feeding the high-pressure fuel to the common rail 4, and an electronic control unit (ECU) 6.

The ECU 6 consists of a microcomputer made up of a CPU, a ROM, and a RAM and monitors engine operating conditions such as the engine speed NE measured by a speed sensor 7 and the accelerator opening Acc indicating an engine load measured by an accelerator sensor 8 to determine a target fuel pressure (i.e., a target common rail pressure PFIN) which optimizes the burning of fuel in the engine 2 as a function of the engine operating conditions. The ECU 6 controls the fuel feed device 5 to regulate an actual fuel pressure (i.e., an actual common rail pressure Pc) measured by a common rail pressure sensor 9 to agree with the target common rail pressure PFIN.

The fuel feed device 5 is responsive to control commands from the ECU 6 to suck a low-pressure fuel from a fuel tank 10 through a feed pump 11 and pressurizes and supplies it to the common rail 4 through a feed pipe 12.

Each of the injectors 3 is connected to the common rail 4 through a pipe 13 and opens and closes a control valve 14 built therein to inject fuel kept at a target fuel pressure to a combustion chamber of one of the cylinders of the engine 2.

Figure 2:
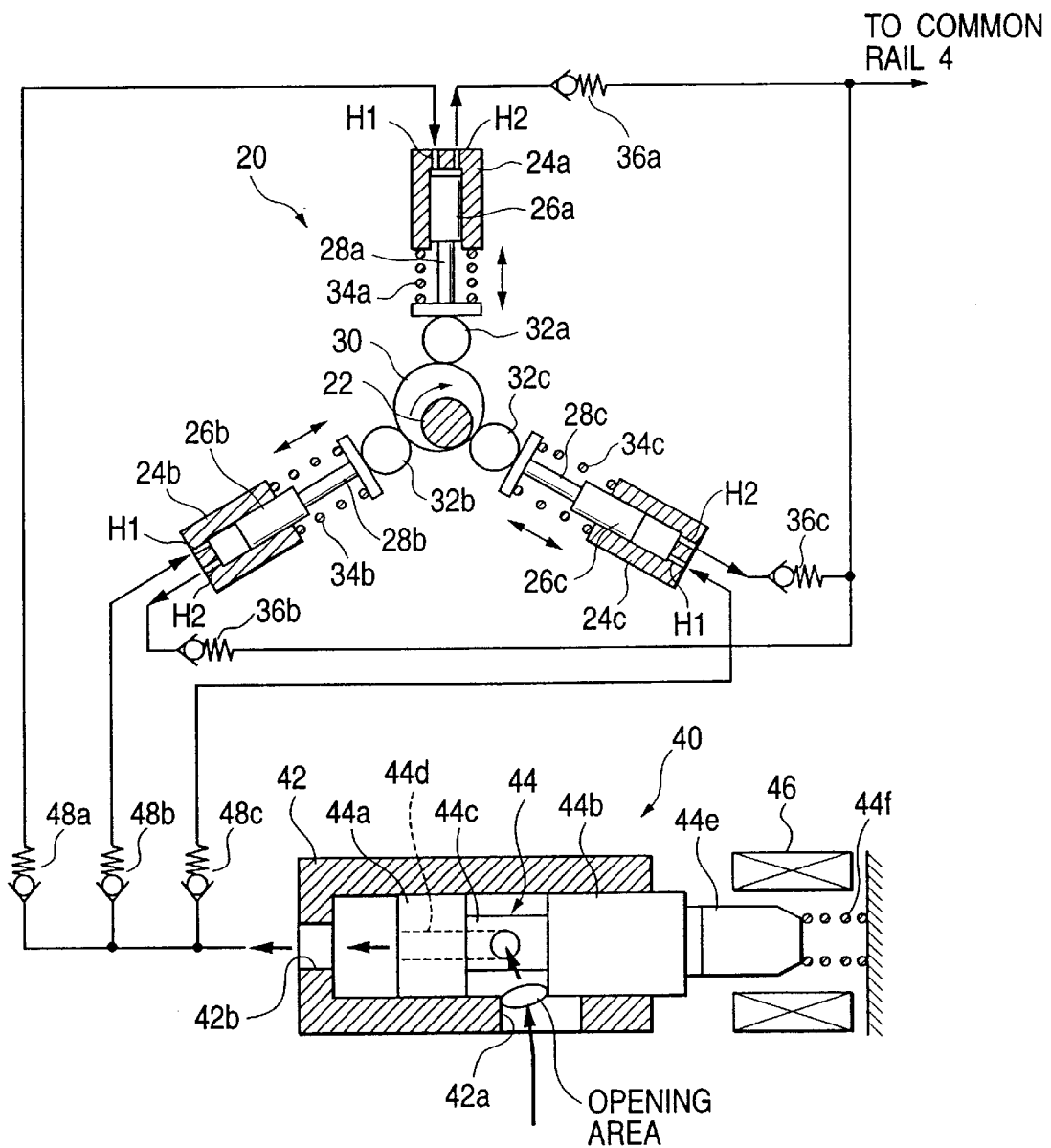
FIG. 2 shows internal structures of a rotary pump and a feed pump used in the fuel injection system of FIG. 1.

The actuation of the control valve 14 of each of the injectors 3 is controlled in response to a injector control command issued from the ECU 6. The injector control command is to regulate the quantity of fuel to be injected and the injection timing thereof and provided using outputs of the speed sensor 7 and the accelerator sensor 8. The injector control command is outputted from the ECU 6 with given timing determined based on the outputs of the speed sensor 7 and a cylinder identification sensor (not shown). The fuel feed device 5, as clearly shown in FIG. 2, includes a rotary pump 20 working as a fuel injection pump and a metering valve 40 supplying a regulated amount of fuel to the rotary pump 20.

The rotary pump 20 consists of a drive shaft 22 connected to an output shaft (i.e., a crankshaft) of the engine 2, three cylinders 24a, 24b, and 24c oriented radially at regular intervals of 120° around the drive shaft 22, and three plungers 26a, 26b, and 26c each disposed slidably within the cylinders 24a to 24c.

The plungers 26a to 26c have rods 28a, 28b, and 28c which extend toward the drive shaft 22. The rods 28a to 28c have cam followers 32a, 32b, and 32c which are in contact with an eccentric cam 30 installed on the drive shaft 22 eccentrically. Disposed between the cam followers 32a to 32c and ends of the cylinders 24a to 24c are coil springs 34a, 34b, and 34c which urge the plungers 26a to 26c into constant engagement with the drive shaft 22 through the cam followers 32a to 32c.

With these arrangements of the rotary pump 20, the drive shaft 22, i.e., the cam 30 makes a complete turn every rotation of the engine 2 to have each of the plungers 26a to 26c undergo reciprocating motion one time within one of the cylinders 24a to 24c. The radial arrangement of the cylinders 24a to 24c at regular intervals of 120° will cause the movements of the plungers 24a to 24c to be shifted 120° out of phase with each other which is equivalent to 120° CA (crank angle) of the engine 2.

Each of the cylinders 24a to 24c has formed in its bottom an inlet port H1 and an outlet port H2. The inlet port H1 communicates with the metering valve 40 and allows the fuel to be sucked into the cylinder (24a, 24b, or 24c) when the plunger (26a, 26b, or 26c) is displaced toward the drive shaft 22. The outlet port H2 allows the fuel to be discharged when the plunger (26a, 26b, or 26c) is displaced away from the drive shaft 22.

The outlet ports H2 of the cylinders 24a to 24c communicate with the fuel feed pipe 12 through check valves 36a, 36b, and 36c which avoid backflow of the fuel to the cylinders 24a to 24c. This causes the high-pressure fuel to be supplied from the fuel feed device 5 to the common rail 4 three times every rotation of the engine 2.

The metering valve 40 is designed to regulate the quantity of fuel flowing into the cylinders 24a to 24c when the plungers 26a to 26c are displaced outward, i.e., toward the drive shaft 22. The metering valve 40 includes a cylinder 42 having a chamber formed therein, a valve body 44 installed slidably in the chamber of the cylinder 42, and a solenoid 46 controlling the position of the valve body 44 to modify the quantify of fuel passing through the metering valve 40.

The cylinder 42 of the metering valve 40 has an inlet port 42a formed in a side wall and an outlet port 42b formed in an end wall. The inlet port 42a communicates with the feed pump 11 to allow the fuel to be sucked into the chamber of the cylinder 42. The outlet port 42b communicates with the inlet port H1 of the cylinders 24a to 24c of the rotary pump 20 to discharge the fuel to the rotary pump 20. Interposed between the outlet port 42b and the inlet ports H1 of the cylinders 24a to 24c are check valves 48a, 48b, and 48c which avoid backflow of the fuel into the metering valve 40.

The valve body 44 consists of a pair of sliding portions 44a and 44b and a connecting rod 44c connecting the sliding portions 44a and 44b. The sliding portions 44a and 44b slide within the cylinder 42 in liquid-tight engagement with an inner wall of the cylinder 42. The connecting rod 44c connects the sliding portions 44a and 44b at an interval equivalent to the diameter of the inlet port 42a. In other words, the distance between opposed end surfaces of the sliding portions 44a and 44b is set equal to the diameter of the inlet port 42a. When the sliding portion 44a is in contact with the end wall of the cylinder 42 to close the outlet port 42b, the sliding portion 44b closes the inlet port 42a to block a fuel feed path extending from the feed pump 11 to the rotary pump 20.

The valve body 44 has formed therein a fuel path 44d which extends from an outer surface of the connecting rod 44c to the end surface of the sliding portion 44a to establish fluid communication between the outlet port 42b and the inlet port 42a when the sliding portion 44a is in position away from the outlet port 42b, thereby allowing the fuel to be supplied from the feed pump 11 to the rotary pump 20.

An opening area of the inlet port 42a changes as a function of position of the valve body 44 in the cylinder 42. The quantity of fuel supplied to the cylinders 24a to 24c of the rotary pump 30 through the metering valve 40 may, thus, be regulated by controlling the position of the valve body 44 in the cylinder 42 using the solenoid 46.

The metering valve 40 also includes a plunger 44e and a coil spring 44f. The plunger 44e is connected to the end of the valve body 44. The spring 44f is disposed between a wall of a valve casing and an end of the plunger 44e to urge the valve body 44 toward the outlet port 42b. The position of the valve body 44 is controlled by adjusting an electromagnetic force produced by the solenoid 46, i.e., the current supplied to the solenoid 46. Specifically, the more the amount of current supplied to the solenoid 46, the greater will be the opening area of the inlet port 42a, thus resulting in an increase in quantity of fuel sucked into the rotary pump 20. The breakage of the current flow to the solenoid 46 causes the spring 44f to urge the valve body 44 to close the inlet port 42a.

Figure 3:
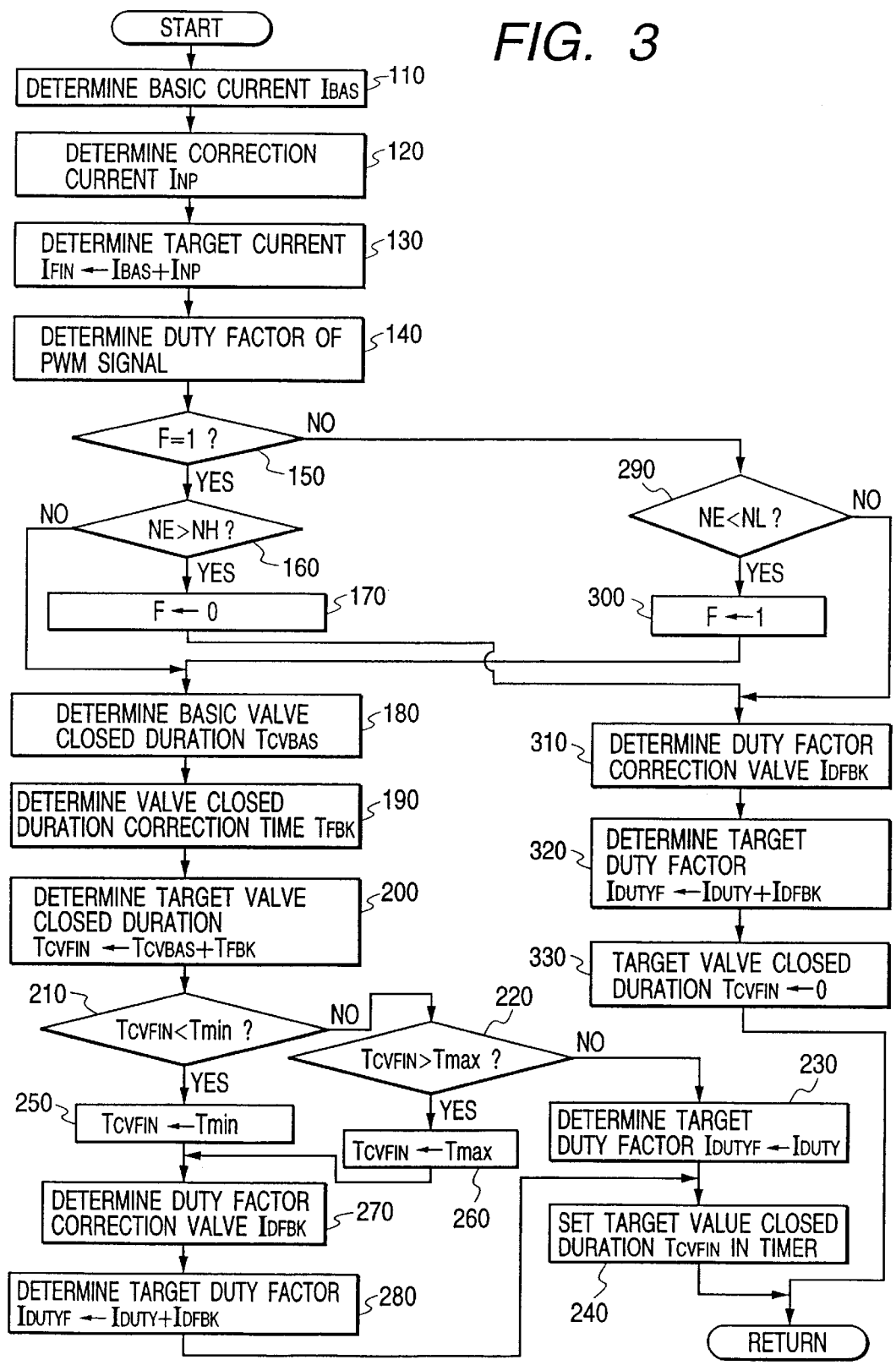
FIG. 3 is a flowchart of a program performed to control the pressure of fuel in a common rail.

FIG. 3 shows a program or sequence of logical steps performed by the ECU 6 to control the fuel pressure in the common rail 4 through the fuel feed device 5. The program is executed every 120° CA of the engine 2 in synchronism with a fuel discharge cycle of the rotary pump 20.

Figure 4A:
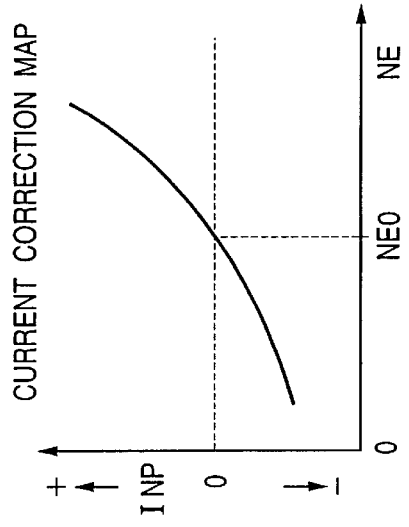
FIG. 4(a) shows a basic current map used in determining a basic current to be supplied to a metering valve.

After entering the program, the routine proceeds to step 110 wherein a basic current IBAS to be supplied to the solenoid 46 of the metering valve 40 is determined by look-up using a basic current map, as shown in FIG. 4(a), stored in the ROM in terms of the target injection quantity QFIN of fuel to be injected into the engine 2 through the injectors 3 and the target common rail pressure PFIN. The target injection quantity QFIN and target common rail pressure PFIN are target controlled variables calculated using given algorithm based on the speed NE of the engine 2 and the accelerator opening Acc. The basic current map is so made that the basic current IBAS increases with increases in the target injection quantity QFIN and target common rail pressure PFIN. This is because increasing the quantity of fuel (i.e., the target injection quantity QFIN) to be supplied to each cylinder of the engine 2 or elevating the fuel pressure in the common rail 4 (i.e., the target common rail pressure PFIN) requires increasing the quantity of fuel to be supplied to the common rail 4, i.e., the opening area of the inlet port 42a of the metering valve 40.

Figure 4B:
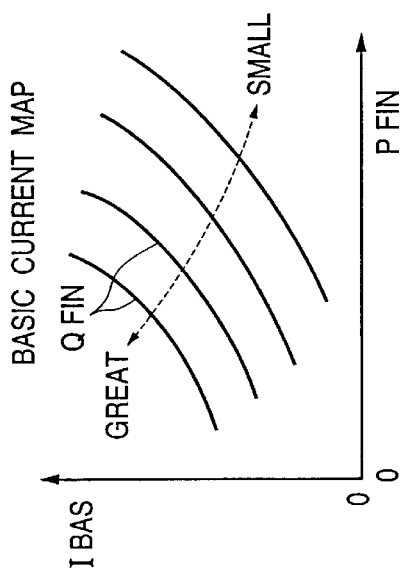
FIG. 4(b) shows a current correction map used in correcting the basic current determined using the map of FIG. 4(a)

The routine proceeds to step 120 wherein a correction current INP is determined by look-up using a current correction map, as shown in FIG. 4(b), based on the speed NE of the engine 2. The correction current INP is to correct the basic current IBAS, as determined in step 110, as a function of the speed NE of the engine 2 since the quantity of fuel supplied to the common rail 4 changes with a change in speed NE of the engine 2 even if the current flowing through the solenoid 46 is constant. The current correction map plots positive values which increase with an increase in engine speed NE in a range where the engine speed NE is higher than a reference engine speed NE0 that is the speed of the engine 2 when the basic current IBAS is determined using the basic current map in FIG. 4(a), while it plots negative values which decrease with a decrease in engine speed NE in a range where the engine speed NE is lower than the reference engine speed NE0.

Figure 4C:
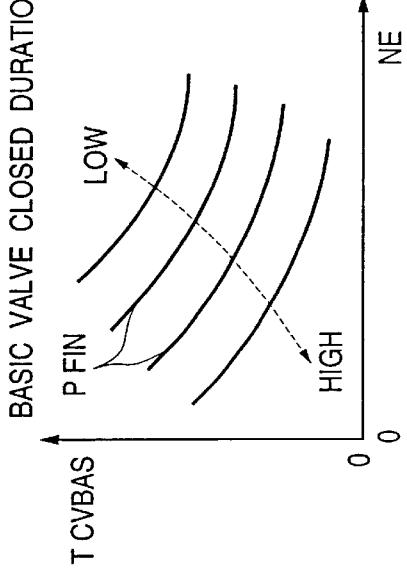
FIG. 4(c) shows a pulse duty map used in determining a duty cycle of pulses for producing the current supplied to a metering valve.

The routine proceeds to step 130 wherein a target current IFIN to be supplied to the solenoid 46 is determined by adding the correction current INE to the basic current IBAS. The routine proceeds to step 140 wherein based on the target current IFIN, a duty factor IDUTY of a pulse widthmodulated (PWM) signal is determined which is used to modify the current supplied to the solenoid 46 under the pulse duty control to adjust the magnetic force produced by the solenoid 46. The pulse duty control of the current supplied to the solenoid 46 (i.e., the opening area of the inlet port 42a of the metering valve 40) is achieved by installing a switching element (not shown) in an electric path extending from a battery (not shown) mounted in the vehicle to the solenoid 46 and driving the switching element using the PWM signal. The duty factor IDUTY of the pulse widthmodulated (PWM) is determined by look-up using a pulse duty map, as shown in FIG. 4(c), based on the target current IFIN determined in step 130 and the battery voltage VB and increases with increases in target current IFIN and the battery voltage VB.

The routine proceeds to step 150 wherein it is determined whether a pressure control mode flag F is one (1) or not. The pressure control mode flag F indicates whether the control of the common rail pressure is in a low engine speed control mode or in a high engine speed control mode. If a YES answer is obtained (F=1) meaning that the control of the common rail pressure is in the low engine speed control mode, then the routine proceeds to step 160 wherein it is determined whether the engine speed NE is greater than the reference speed NH or not. If a NO answer is obtained, then the routine proceeds directly to step 180. Alternatively, if a YES answer is obtained, then the routine proceeds to step 170 wherein the pressure control mode flag F is set to zero (0) for switching the control of the common rail pressure from the low engine speed control mode to the high engine speed control mode and proceeds to step 310.

Figure 4D:
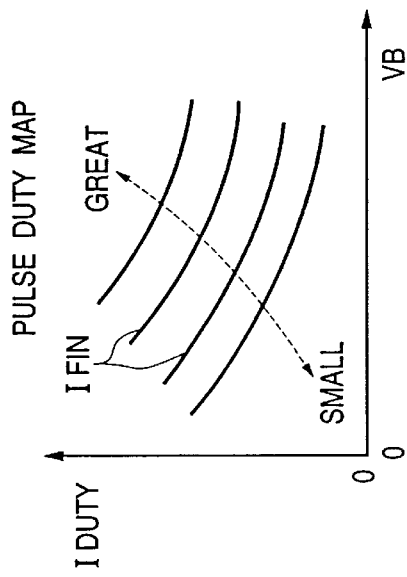
FIG. 4(d) shows a basic valve closed duration map used in determining a basic valve closed duration in which a metering valve is to be closed.

In step 180, in order to open and close the metering valve 40 cyclically in a time interval equivalent to 120° rotation of the engine 2 in the low engine speed control mode as well as to control the opening area of the inlet port 42a of the metering valve 40 under the pulse duty control, a basic valve closed duration TCVBAS that is the length of time the metering valve 40 is to be closed during 120° rotation of the engine 2 is determined by look-up using a basic valve closed duration map, as shown in FIG. 4(d), based on the engine speed NE and the target common rail pressure PFIN. The basic valve closed duration TCVBAS is prolonged as the engine speed NE increases and as the target common rail pressure PFIN decreases.

The routine proceeds to step 190 wherein a valve closed duration correction time TFBK is determined for decreasing a pressure difference ΔP between the target common rail pressure PFIN and an actual common rail pressure Pc measured by the common rail pressure sensor 9 to zero (0). The valve closed duration correction time TFBK is a feedback variable for correcting the valve closed duration TCVBAS determined in step 180 under feedback control and is determined, for example, as a function of the sum of the product of the pressure difference ΔP and a constant of proportion Kp, the product of an integral value of the pressure difference ΔP and an integration constant Ki, and the product of a differential value of the pressure difference ΔP and a differential constant Kd.

The routine proceeds to step 200 wherein a target valve closed duration TCVFIN that is a target length of time the metering valve 40 is closed every 120° rotation of the engine 2 is determined by adding the basic valve closed duration TCVBAS derived in step 180 and the valve closed duration correction time TFBK derived in step 190 together.

The routine proceeds to step 210 wherein it is determined whether the target valve closed duration TCVFIN is smaller than a lower time limit Tmin or not. If a NO answer is obtained, then the routine proceeds to step 220 wherein it is determined whether the target valve closed duration TCVFIN is greater than an upper time limit Tmax or not. If a NO answer is obtained (TCVFIN<Tmax), then the routine proceeds to step 230.

In step 230, the duty factor IDUTY derived in step 140 is defined as a target duty factor IDUTYF for controlling the opening area of the inlet port 42a of the metering valve 40 under the pulse duty control. The routine proceeds to step 240 wherein the target valve closed duration TCVFIN is set in a pulse output inhibit timer and then terminates.

The pulse output inhibit timer is installed in the ECU 6 to inhibit the PWM signal used to control energization of the solenoid 46 from being outputted for the target valve closed duration TCVFIN after determined in step 240. Upon determination of the target duty factor IDUTYF in step 230 or step 280, as will be described later, the ECU 6 outputs the PWM signal of high level for a period of time corresponding to the target duty factor IDUTYF every 1 msec. to control the rate of current flowing to the solenoid 46.

If a YES answer is obtained in step 210 (TCVFIN<Tmin), then the routine proceeds to step 250 wherein the lower time limit Tmin is determined as the target valve closed duration TCVFIN. If a YES answer is obtained in step 220 (TCVFIN>Tmax), then the routine proceeds to step 260 wherein the upper time limit Tmax is determined as the target valve closed duration TCVFIN.

The lower and upper time limits Tmin and Tmax are minimum and maximum controllable spans, respectively, in which the metering valve 40 can be opened and closed completely regardless of the speed NE of the engine 2. Steps 250 and 260 adjust the target valve closed duration TCVFIN so as to fall within the lower and upper time limits Tmin and Tmax.

When the target valve closed duration TCVFIN is restricted in step 250 and 260 to within the lower and upper time limits Tmin and Tmax, it makes impossible to control the quantity of fuel supplied to the rotary pump 20 so as to eliminate the pressure difference ΔP under the feedback control. Thus, after step 250 or 260, the routine proceeds to step 270 wherein a duty factor correction value IDFBK used to have the pressure difference ΔP between the target common rail pressure PFIN and the actual common rail pressure Pc reach zero is determined. Specifically, the duty factor correction value IDFBK is to correct a feedback-controlled variable for controlling the opening area of the inlet port 42a of the metering valve 40 and determined in a similar manner to that used in determining the valve closed duration correction time TFBK.

After step 270, the routine proceeds to step 280 wherein the target duty factor IDUTYF is determined by adding the duty factor IDUTY derived in step 140 and the duty factor correction value IDFBK together and proceeds to step 240 as described above.

If a NO answer is obtained in step 150 meaning that the pressure control mode flag F is reset which indicates that the control of the common rail pressure is in the high engine speed control mode, then the routine proceeds to step 290 wherein it is determined whether the engine speed NE is lower than the reference speed NL or not. If a YES answer is obtained, then the routine proceeds to step 300 wherein the pressure control mode flag F is set to one (1) for switching the control of the common rail pressure from the high engine speed control mode to the low engine speed control mode and proceeds to step 180.

If a NO answer is obtained in step 290, then the routine proceeds directly to step 310.

The reference speed NL used in determination of whether the control of the common rail pressure is to be switched to the low engine speed control mode or not is set smaller than the reference speed NH used in step 160 in determination of whether the control of the common rail pressure is to be switched to the high engine speed control mode or not, thereby providing hysteresis to the mode switching determinations to avoid the hunting of the control system.

In step 310, the duty factor correction value IDFBK used to have the pressure difference ΔP between the target common rail pressure PFIN and the actual common rail pressure Pc reach zero is determined, similar to step 270.

The routine proceeds step 320 wherein the target duty factor IDUTYF is determined by adding the duty factor IDUTY derived in step 140 and the duty factor correction value IDFBK derived in step 310 together. The routine proceeds to step 330 wherein the target valve closed duration TCVFIN is set to zero (0) to inhibit the cyclic on-off control of the metering valve 40 and terminates.

Figure 5A:
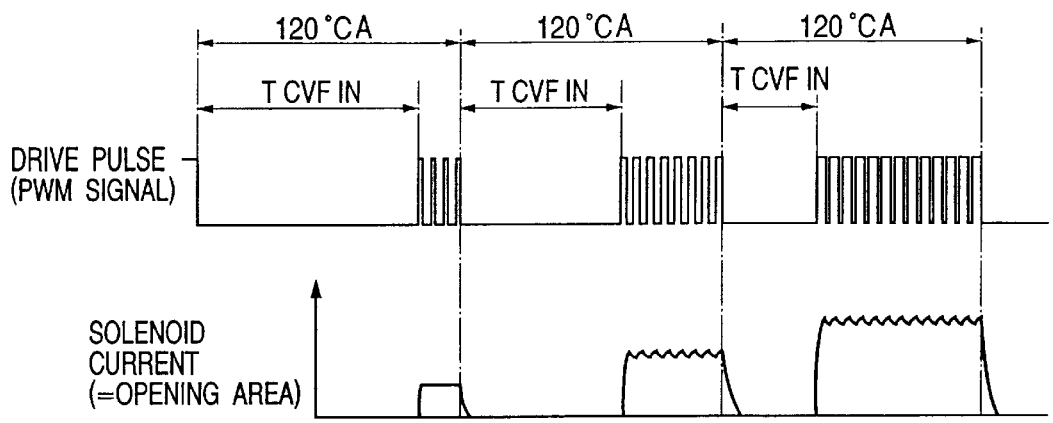
FIG. 5(a) shows the relation between dive pulses and solenoid current in a low engine speed mode.
Figure 5B:
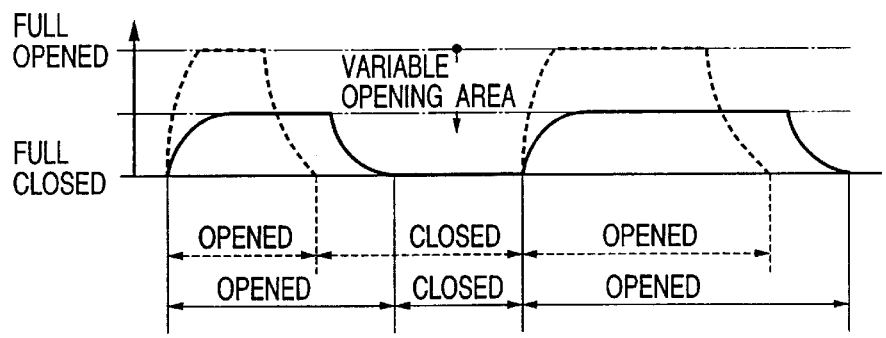
FIG. 5(b) shows an operation of a metering valve in a low engine speed mode.

As apparent from the above discussion, during a period of time until the engine speed NE exceeds the reference speed NH after engine start-up and when the engine speed NE drops below the reference level NL (<NH) after exceeding the reference speed NH, the accumulator fuel injection system 1 performs the control of the common rail pressure in the low engine speed control mode. In the low engine speed control mode, the current, which is, as shown in FIG. 5(a), produced as a function of the duty factor of the PWM signal, is supplied to the solenoid 46 of the metering valve 40 to control the opening area of the inlet port 42a, i.e., the flow rate of fuel supplied to the rotary pump 20 and inhibited from flowing to the solenoid 46 for the target valve closed duration TCVFIN every 120° rotation of the engine 2. Therefore, even when the engine 2 is operating at low speeds, so that it is required to inject a small quantity of fuel into the engine 2, the quantity of fuel supplied to the rotary pump 20 in each 120° rotation of the engine 2 is controlled with high accuracy as a function of, as shown in FIG. 5(b), a combination of the opening area of the inlet port 42a of the metering valve 40 and the length of time the metering valve 40 is opened.

Figure 5C:
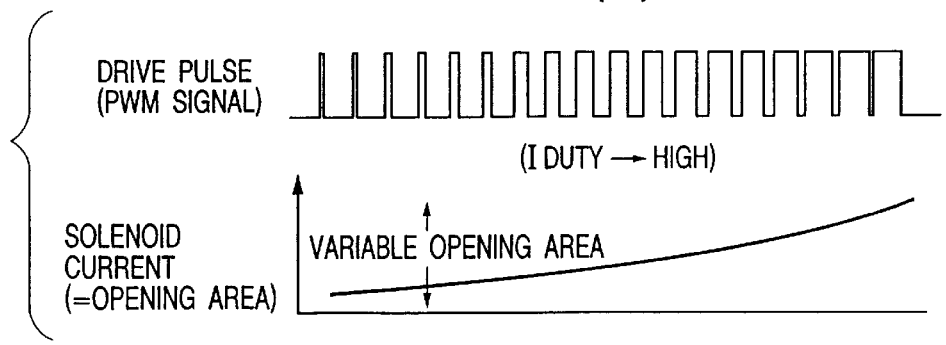
FIG. 5(c) shows the relation between dive pulses and solenoid current in a high engine speed mode.

Once the engine speed NE exceeds the reference speed NH, the accumulator fuel injection system 1 performs the control of the common rail pressure in the high engine speed control mode until the engine speed NE drops below the reference speed NL. In the high engine speed control mode, the target valve closed duration TCVFIN is set to zero in step 330 of FIG. 3 to keep the metering valve 40 opened. Specifically, the inlet port 42a of the metering valve 40 is kept opened, and the opening area of the inlet port 42a is regulated as a function of the amount of current supplied to the solenoid 46 which is, as shown in FIG. 5(c), produced by the PWM signal. Therefore, even when the engine 2 is operating at high speeds, thus decreasing a time interval in which the fuel is sucked to one of the cylinders 24a to 24c of the rotary pump 20, which results in difficulty in controlling the on-off operation of the metering valve 40 accurately, the quantity of fuel supplied to the rotary pump 20 is controlled with high accuracy.

In the low engine speed control mode wherein the length of time the metering valve 40 is opened and the opening area of the inlet port 42a are both controlled simultaneously, the target valve closed duration TCVFIN is first calculated based on the pressure difference ΔP between the target common rail pressure PFIN and the actual common rail pressure Pc (see step 200 of FIG. 3), after which the target duty factor IDUTYF is corrected based on the pressure difference ΔP only when the target valve closed duration TCVFIN lies out of a given range. This avoids interference of control of the length of time the metering valve 40 is opened with control of the opening are of the inlet port 42a, thereby ensuring the stability of fuel feed control.

The above embodiment refers to the accumulator fuel injection system for diesel engines, however, the present invention may be used with a fuel injection system designed to control the quantity of fuel sucked to a distributor type injection pump which distributes the fuel directly to injectors installed one in each cylinder or a gasoline engine fuel injection system designed to supply high-pressure fuel directly or through an accumulator (i.e., a common rail) to injectors installed in a direct injection engine.

The on-off operation of the metering valve 40 is performed every 120° rotation of the engine 2, however, may be asynchronized with the rotation of the engine 2. For instance, a valve opened duration in a predetermined cycle may be determined to control the quantity of fuel discharged from the metering valve 40. Alternatively, the valve closed duration and the valve opened duration in one cycle are determined separately to control the quantity of fuel discharged from the metering valve 40.

Figure 6:
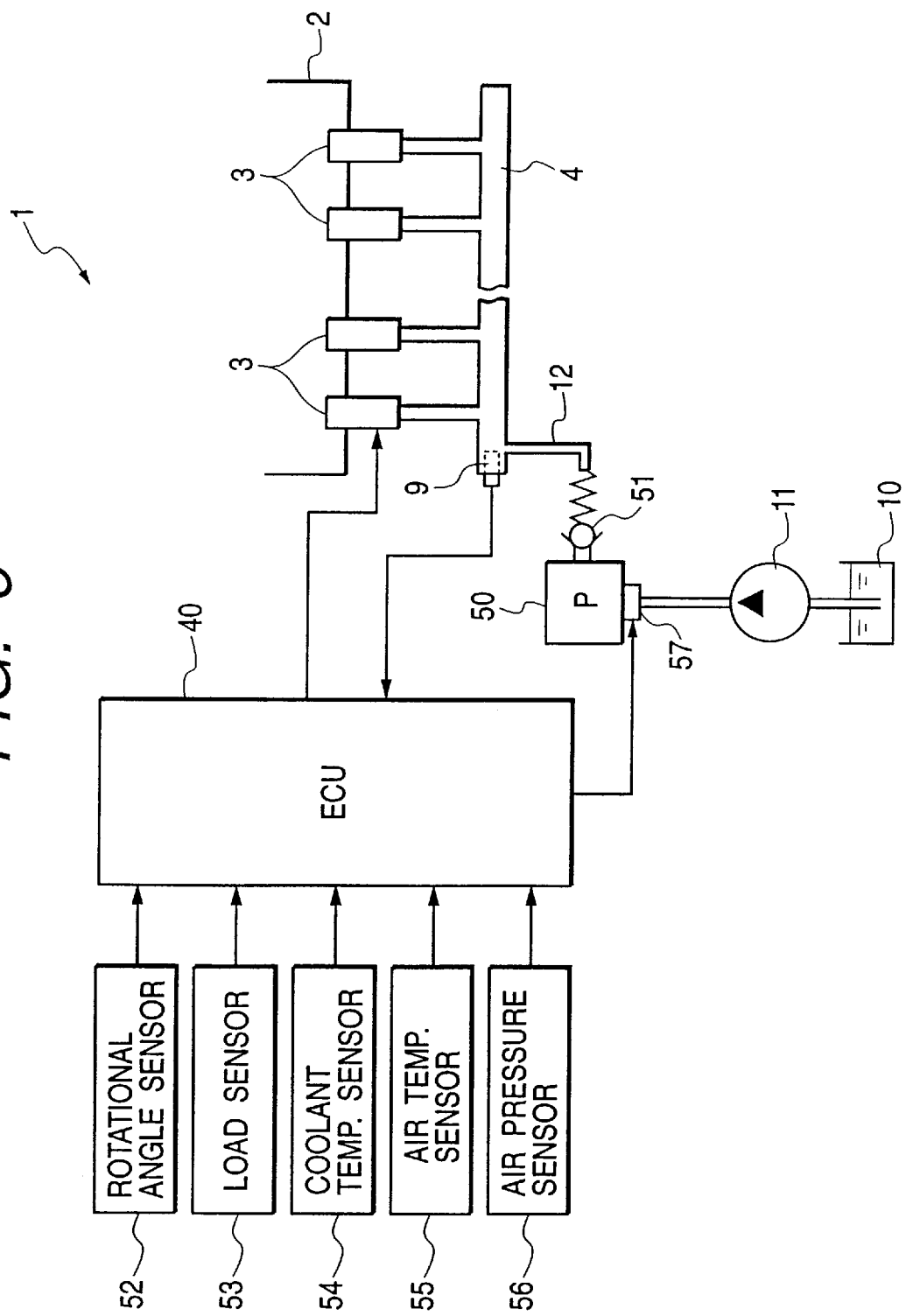
FIG. 6 is a block diagram which shows a fuel injection system according to the second embodiment of the invention.

FIG. 6 shows an accumulator fuel injection system 1 according to the second embodiment of the invention which is used, as one example, with a four-cylinder diesel engine. The same reference numbers as employed in the first embodiment refer to the same parts, and explanation thereof in detail will be omitted here.

The accumulator fuel injection system 1 includes a variable discharge high pressure pump 50. The variable discharge high pressure pump 50 sucks the fuel in the fuel tank 10 through the feed pump 11 and pressurizes and supplies it to the common rail 4 through three check valves 51, as will be described later in detail, and the feed pipe 12. The fuel pressure in the common rail 4 depends upon the operating condition of the engine 4, usually within about 20 to 160 MPa.

The variable discharge high pressure pump 50 is of a three-way feed type and has a discharge control device 57 installed in an inlet port thereof. to control the quantity of fuel discharged from the variable discharge high pressure pump 50. The discharge control device 57 includes a single solenoid valve which consists of a linear solenoid for adjusting the quantity of fuel discharged from three outlets.

The ECU 6 monitors the fuel pressure in the common rail 4 through the common rail pressure sensor 9 to provide a pressure control signal to the discharge control device 57. The discharge control device 57 controls the quantity of fuel discharged from the high pressure pump 50 to have the actual common rail pressure reach a target pressure determined as a function of engine load and engine speed.

The accumulator fuel injection system 1 also includes a rotational angle sensor 52, an engine load sensor 53, a coolant temperature sensor 54, an inlet air temperature sensor 55 and an inlet air pressure sensor 56. The rotational angle sensor 52 measures the speed of the variable discharge high pressure pump 50. The engine load sensor 53 measures, for example, an accelerator opening (i.e., an opening of a throttle valve). The coolant temperature sensor 54 measures the temperature of an engine coolant. The inlet air temperature sensor 55 measures the temperature of the inlet air to the engine 2. The inlet air pressure sensor 56 measure the pressure of the inlet air. The ECU 6 receives outputs from the sensors 52 to 56 to determine a target injection timing and a target quantity of fuel to be injected into the engine 2 and provides control signals indicative thereof to the injectors 3.

Figure 7:
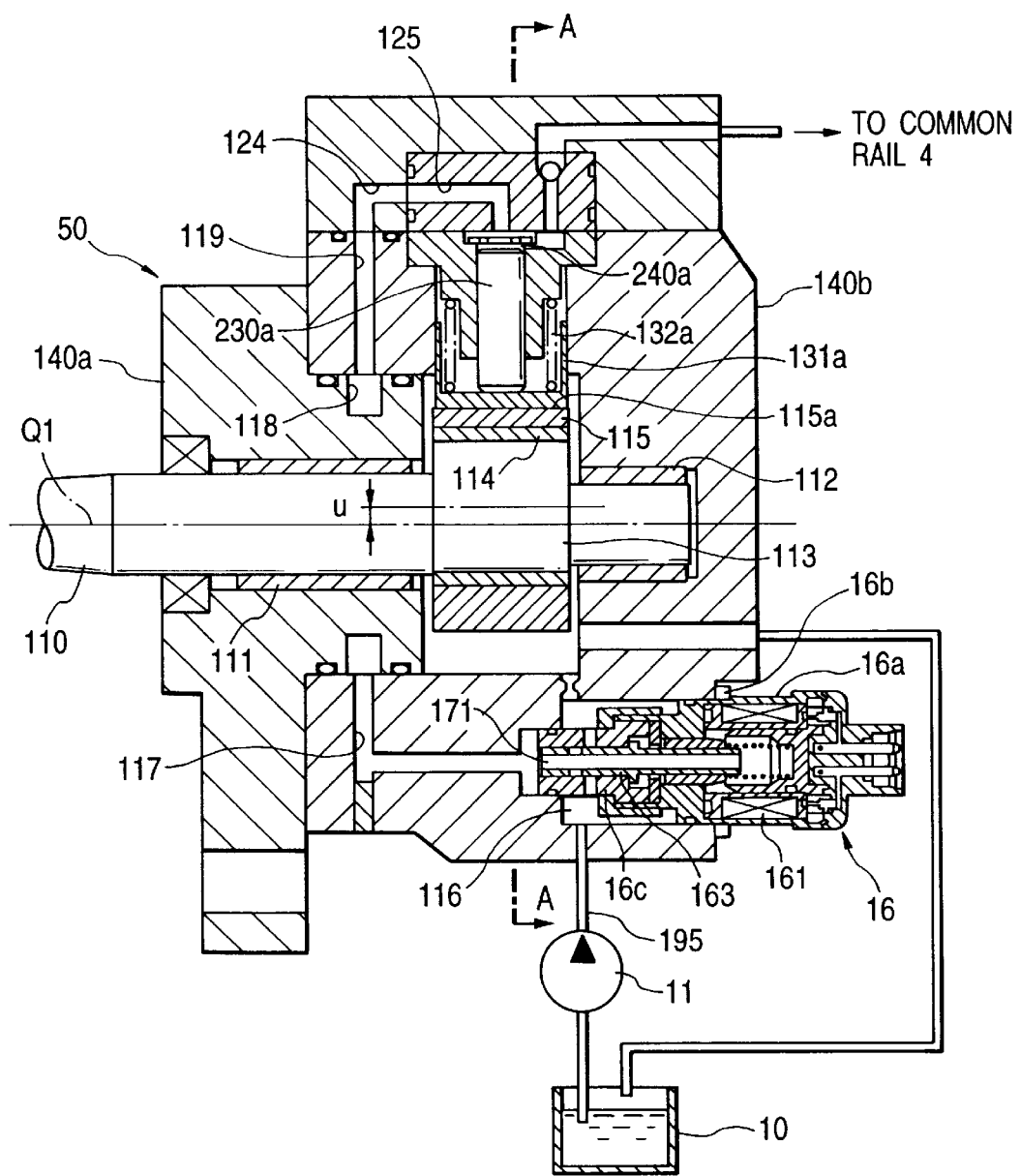
FIG. 7 is a partially cross sectional view which shows a variable discharge high pressure pump.

FIG. 7 shows an internal structure of the variable discharge high pressure pump 50.

The pump 50 includes pump housings 140a and 140b which have disposed herein friction bearings 111 and 112, respectively, to support a drive shaft 110 rotatably. The engine 4 is, as described above, a four-cylinder engine. The drive shaft 110 is, thus, rotated in synchronism with ⅔ rotation of the engine 4. The drive shaft 110 has an eccentric portion 113 disposed between the friction bearings 111 and 112. The eccentric portion 113 has the center line shifted away from the longitudinal center line of the drive shaft 110 by a distance u. The eccentric portion 113 has disposed on its outer surface a friction bearing 114 on which an eccentric cam 115 is mounted rotatably.

Figure 8:
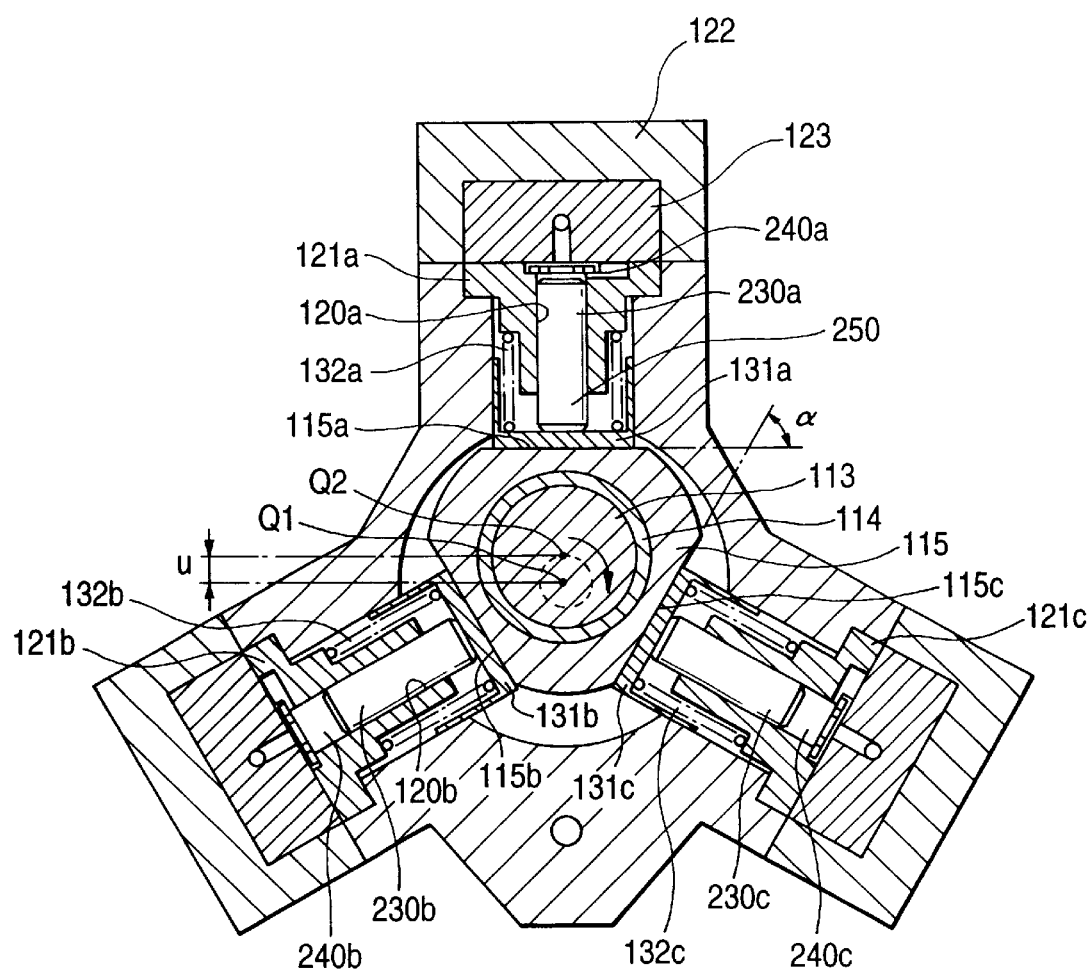
FIG. 8 is a cross sectional view taken along the line A—A in FIG. 7.

The eccentric cam 115 is, as clearly shown in FIG. 8, of polygonal shape and has three flat surfaces 115a, 115b, and 115c formed at regular intervals of angle. Cylindrical blocks 121a, 121b, and 121c are disposed in the housing 140 which have formed therein cylinders 120a, 120b, and 120c within which plungers 230a, 230b, and 230c are mounted slidably to define pressure chambers 240a, 240b, and 240c between ends thereof and bottoms of the cylinders 120a to 120c, respectively.

Adjacent two of the flat surfaces 115a to 115c make an angle a of 60° with each other. The flat surfaces 115a to 115c are oriented at right angles to the longitudinal center lines of the cylinders 120a to 120c, respectively. The longitudinal center lines of the cylinders 120a to 120c extend radially at angular intervals of 120°.

The rotation of the eccentric cam 115 following rotation of the drive shaft 110 causes the center Q2 of the eccentric cam 115 to rotate about the center Q1 of the drive shaft 110 along a circular path, as indicated by a broken line, which has the radius u, thereby causing the flat surfaces 115a to 115c of the eccentric cam 115 to move in an outward direction from the center Q1 of the drive shaft 110, thus resulting in reciprocating motion of the plungers 230a to 230c within the cylinders 120a to 120c. This will cause the fuel within the pressure chambers 240a to 240c to be pressurized in sequence.

Referring back to FIG. 7, a solenoid valve 16 is disposed in a lower portion of the pump housing 140b and defines a fuel sump 116 around an end thereof. The fuel in the fuel tank 10 is sucked and pressurized by the feed pump 11 up to about 10 atm. and fed to the fuel sump 116 through a low-pressure path 195. The solenoid valve 16 is attached at a flange 16b to the housing 140b using bolts (not shown).

Figure 9:
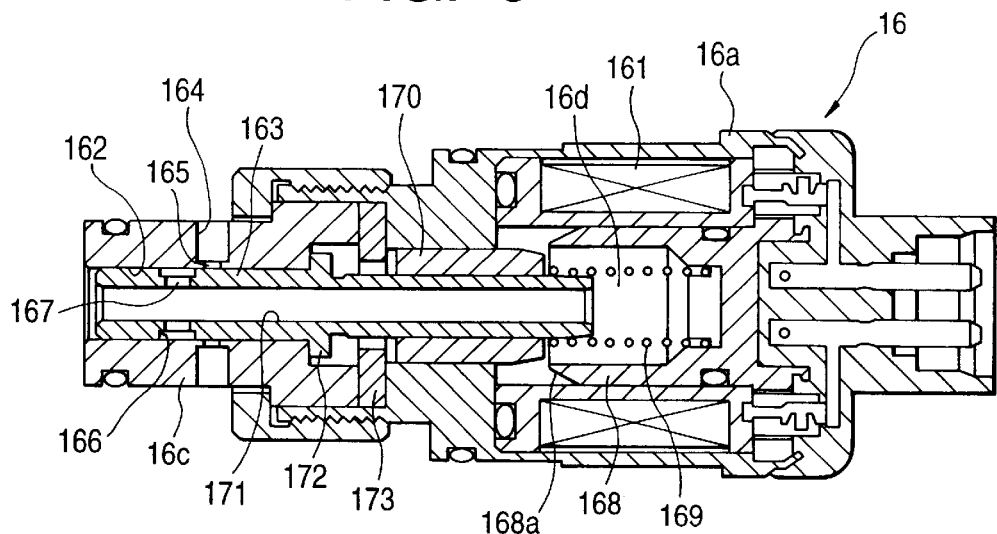
FIG. 9 is a longitudinal cross sectional view which shows a solenoid valve.

The solenoid valve 16, as shown in FIG. 9, includes a housing 16a having a coil 161 disposed therein and a valve body 16c fitted into an end of the housing 16a. The valve body 16c has formed therein a cylindrical chamber 162 in which a spool 163 is retained slidably. The valve body 16c also has formed therein a fluid path 164 and a fluid path 165 which is smaller in sectional area than the fluid path 164. The fluid paths 164 and 165 establish communication between the cylindrical chamber 162 and the fuel sump 116. The fluid path 165 is formed with slits each of which has a constant width and extends in a direction of movement of the spool 163.

The spool 163 has formed in the center thereof a fluid path 171 extending in a lengthwise direction thereof and bores 167 and an annular groove 166. The bores 167 communicate with the fluid path 171. The annular groove communicates with the fluid path 165 in the valve body 16c when the spool 163 is moved inward of the valve body 16c. The spool 163 also has a flange 172 formed on a central outer surface thereof as a stopper to define an allowable spool travel range between the flange 172 and a shim 173 disposed between ends of the valve body 16c and the housing 16a. The spool 163 is opened at both ends thereof to minimize fluid pressure acting on the spool 163 in the lengthwise direction.

An armature 170 is installed on the inner end of the spool 163 and opposed to a stator 168 mounted in the housing 16a coaxially with the coil 161. A spring 169 is disposed within a cylindrical chamber 16d to urge the spool 163 outward at all times. When the coil 161 is in the off-state, the fluid communication between the fluid path 171 and the fluid sump 116 is, as clearly shown in FIG. 7, blocked.

The stator 168 has a tapered end 168a. The position of the spool 163 depends upon the amount of current flowing through the coil 161. Specifically, the solenoid valve 16 works as a linear solenoid valve. When the coil 161 is energized, it will cause the spool 163 to be moved inward (the right in FIG. 9) to establish fluid communication between the fluid path 171 and the fuel sump 116. An increase in current supplied to the coil 161 will cause the amount of movement of the spool 163 toward the stator 168 to be increased, thereby resulting in an increase in area of openings between the bores 165 and 166 and the fluid paths 164. The amount of movement of the spool 163 is controlled by the ECU 6 under the pulse duty control. The solenoid valve 16 is, as clearly shown in the drawings, of a normally closed type, which avoids fuel transportation if the solenoid valve 16 fails.

The fluid path 171 in the spool 163, as clearly shown in FIG. 7, communicates with an annular low pressure fluid path 118 formed in the pump housing 140a through a low pressure fluid path 117 formed in the pump housing 140b. The fluid path 118 communicates with a fluid path 119 formed in the pump housing 140b. The fluid path 119 communicates through paths 124 and 125 with a pressure chamber 240a defined above an upper end of a plunger 230a. The fluid path 171 in the spool 163 also communicates with pressure chambers 240b and 240c, as shown in FIG. 8, in a similar path structure to that described above.

Figure 10:
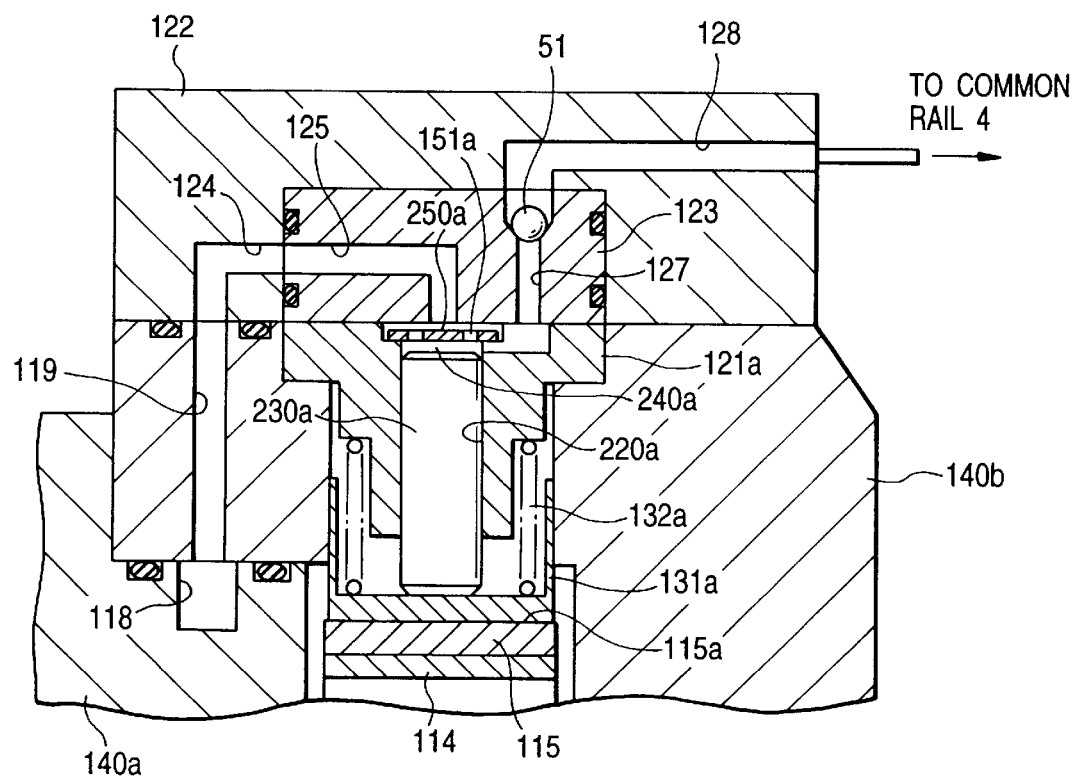
FIG. 10 is a partially enlarged view which shows a variable discharge high pressure pump.

Three covers 122 and three fluid path blocks 123, as shown in FIG. 8, are installed on an upper wall of the pump housing 140b through bolts (not shown). Each of the fluid path blocks 123, as clearly shown in FIG. 10, is in contact with an upper surface of one of the cylindrical blocks 121 a to 121 c (only the cylindrical block 121 a is shown for the brevity of illustration). The paths 124 and 125 are formed in each of the covers 122 and each of the cylindrical blocks 121a to 121c.

Within an individual pressure chamber, as for example, the pressure chamber 240a, a plate 250a is disposed as a check valve. The plate 250a has a plurality of holes 151a formed therein out of registry with the path 125. The cover 122 and the cylindrical block 121a have formed therein high pressure fluid paths 127 and 128. The check valve 51 is disposed in the high pressure fluid path 128.

With the above arrangements, the inward movement of the spool 163 of the solenoid valve 16 by electromagnetic force applied from the coil 161 causes the fuel sucked into the fuel sump 116 to flow into an individual pressure chamber, as for example, the pressure chamber 240a through the fluid paths 171, 117, 118, 119, 124, and 125, and the holes 151a of the plate 250a. The rotation of the drive shaft 110 causes the plunger 230a to reciprocate within the cylindrical chamber 120a to pressurize the fluid in the pressure chamber 240a, thereby urging the plate 250a into engagement with the bottom of the fluid path block 123 to block the fluid communication between the pressure chamber 240a and the fluid path 125. When the fluid pressure in the pressure chamber 240a is elevated by a lift of the plunger 230a up to a reference level, it will cause the check valve 51 to be lifted away from the fluid path 127 to establish fluid communication between the pressure chamber 240a and the fluid path 128, so that the pressurized fuel is discharged from the pressure chamber 240a. In this way, the pressurized fuel is fed to the common rail 4 cyclically from the pressure chambers 240a to 240c in synchronism with 120° rotation of the drive shaft 110.

Disposed between the eccentric cam 115 and the plungers 230a to 230c are, as shown in FIG. 8, cylindrical pads 131a, 131b, and 131c with side walls slidable within cylindrical chambers 250 in the pump housing 140b. Between the pads 131a to 131c and the cylindrical blocks 121a to 121c, coil springs 132a, 132b, and 132c are disposed to urge the pads 131a to 131c into constant engagement with the flat surfaces 115a to 115c of the eccentric cam 115, respectively.

Figure 11:
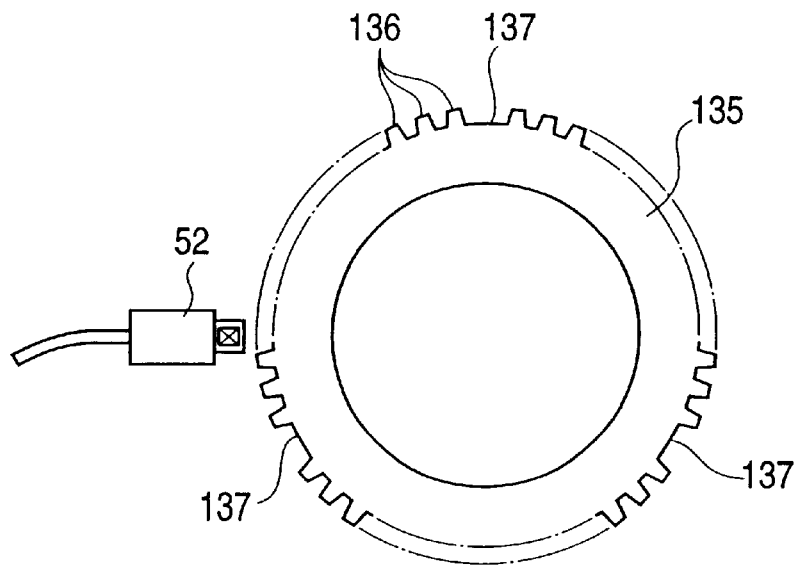
FIG. 11 shows a structure of a rotational angle sensor.
Figure 12A:
FIG. 12(a) shows an output from the rotational angle sensor of FIG. 11.
Figure 12B:
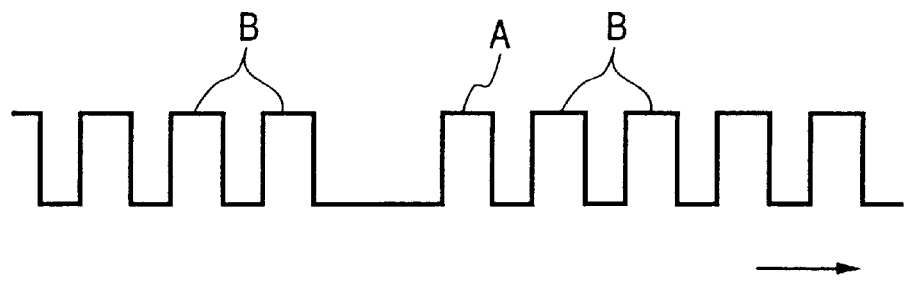
FIG. 12(b) shows pulses derived by shaping the output of the rotational angle sensor in FIG. 12(a)

The rotational angle sensor 52, as shown in FIG. 11, faces a signal rotor 135 rotated in synchronism with rotation of the drive shaft 110. The signal rotor 135 has a total of 54 protrusions 136 formed on its circumference and three flat portions 137 provided at regular intervals of 120°. The rotational angle sensor 52 produces a signal, as shown in FIG. 12(a), rising in level every passage of the protrusions 136. The ECU 6 shapes the output from the rotational angle sensor 52 into one shown in FIG. 12(b) which consists of pulses B and a reference pulse A that is produced by the first one of the protrusions 135 following the each of the flat portions 37 and counts 18 pulses (17 pulses B plus one reference pulse A) every lift of the plungers 230a to 230c to determine the speed and angular position of the variable discharge high pressure pump 50.

Figure 13:
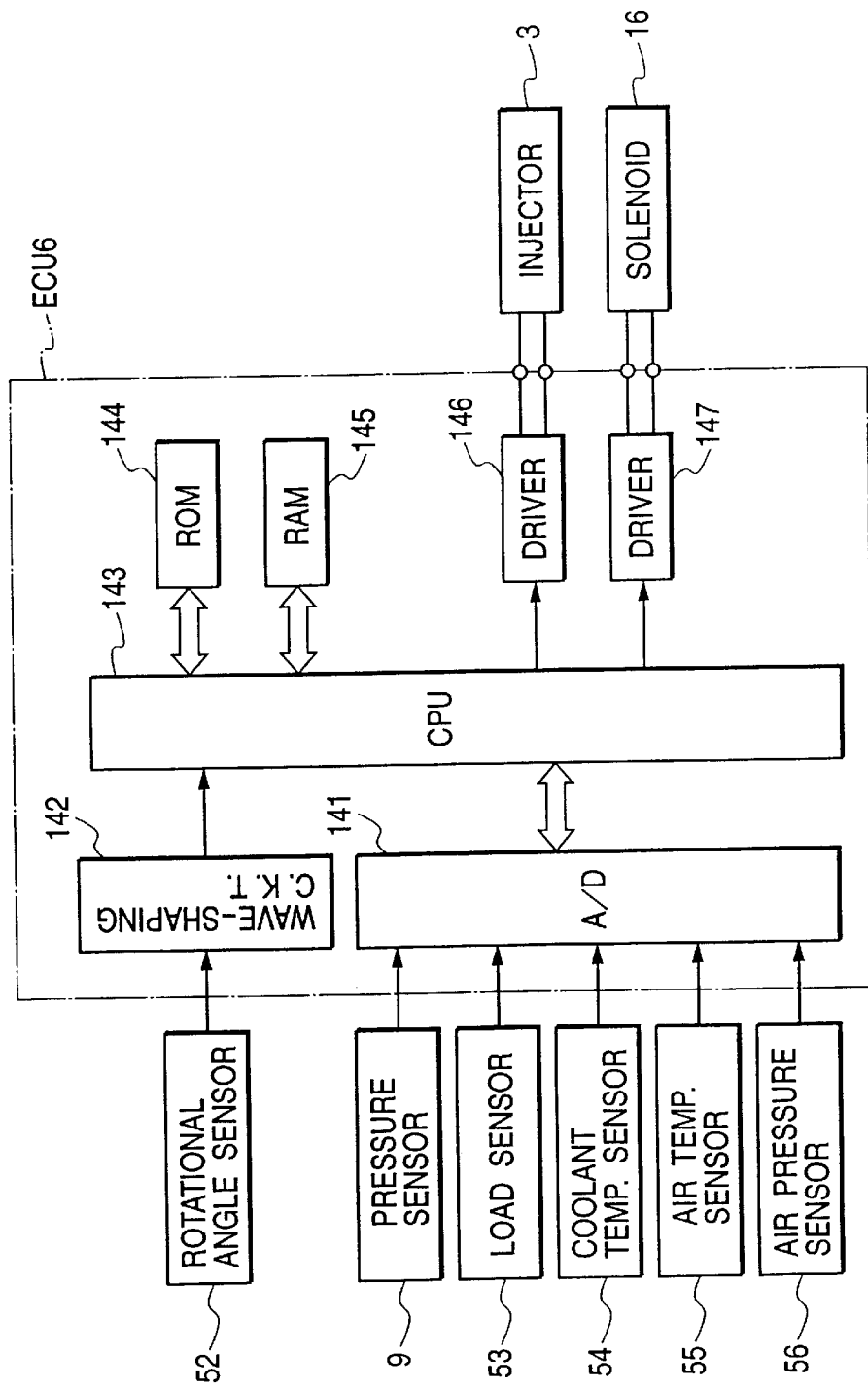
FIG. 13 is a block diagram which shows a circuit structure of an electronic control unit (ECU) of the fuel injection system of FIG. 1.

The ECU 6, as shown in FIG. 13, consists of an A/D converter 141, a waveform shaping circuit 142, a CPU 143, a ROM 144, a RAM 145, and drive circuits 146 and 147. The A/D converter 141 converts analog outputs from the sensors 9, and 53 to 56 into digital signals and outputs them to the CPU 143. The waveform shaping circuit 142 shapes, as described above, the waveform of outputs from the rotational angle sensor 52 to produce rectangular pulses. The CPU 143 receives outputs from the sensors 52, 9, and 53 to 56 to control the amount of fuel discharged from the variable discharge high pressure pump 50. The drive circuits 146 and 147 actuate the injector 3 and the solenoid valve 16 in response to control signals from the CPU 143, respectively. In practice, however, the three drive circuits 146 are provided, one for each of the three injectors 3.

Figure 14:
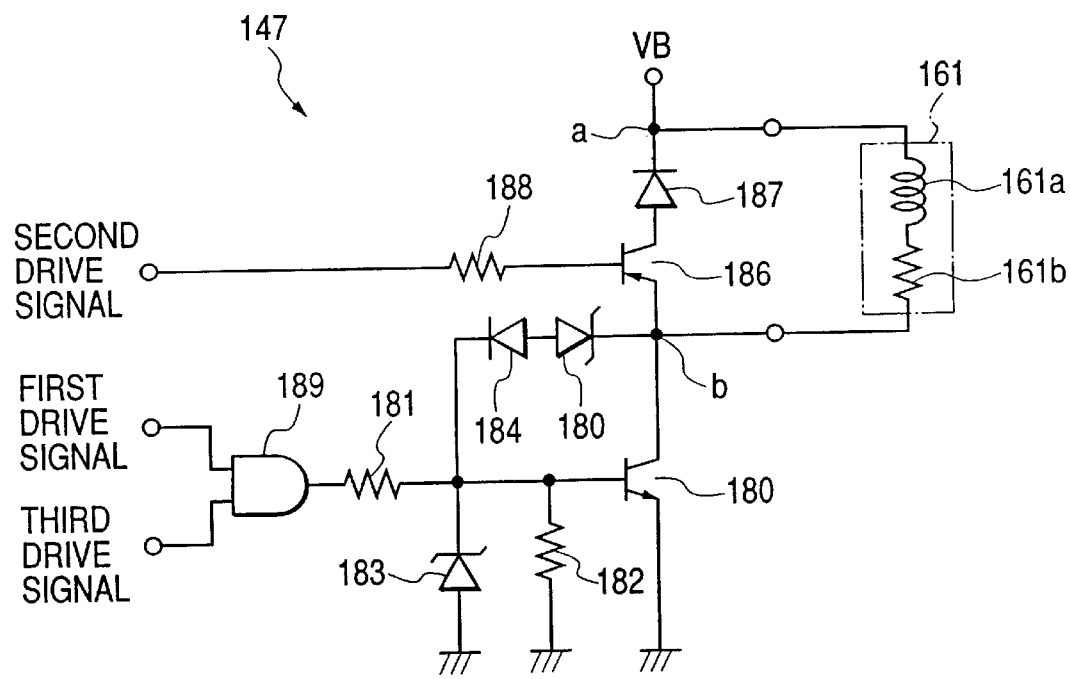
FIG. 14 is a circuit diagram which shows a structure of a drive circuit for a solenoid valve.

FIG. 14 shows a circuit structure of the drive circuit 147 for the solenoid valve 16.

The coil 161 of the solenoid valve 16 consists of an inductance component 61*a* and a resistance component 61*b* and connects at one end with a battery VB (not shown) and at the other end with the collector of an npn transistor 180. The npn transistor 180 connects at the emitter with a grounded terminal.

A resistor 181 is disposed between an AND gate 189 and the transistor 180. To the AND gate 189, first and third drive signals are inputted. A resistor 182 is connected at one end to a junction of the resistor 181 and the transistor 180 and at the other end to the grounded terminal.

A zener diode 183 is connected at the cathode to the junction of the resistor 181 and the transistor 180 and at the anode to the grounded terminal. The zener voltage Vz of the zener diode 182 is 4.7V which is slightly lower than an output voltage of 5.0V from the AND gate 189. A diode 184 is connected at the cathode to the junction of the resistor 181 and the base of the transistor 180 and at the anode to the anode of the zener diode 185. The zener diode 185 is connected at the cathode to the collector of the transistor 180.

To the cathode of the zener diode 185, the emitter of an pnp transistor 186 and the end of the coil 161 are connected. The pnp transistor 186 is connected at the collector to the anode of a diode 187. The diode 187 is connected at the cathode to the battery VB. To the base of the transistor 186, the end of a resistor 188 is connected. To the other end of the resistor 188, the second drive signal is inputted.

In operation, the first drive signal is inputted from the ECU 6 when the time the solenoid valve 16 is to be opened is reached. The third drive signal has a duty cycle defined by the pulse interval T2 and the pulse width T3. In this embodiment, the pulse interval T2 is approximately 1 ms. The transistor 180 is turned on and off in response to an AND signal obtained by ANDing the first and third drive signals.

When the first drive signal rises to the high level, it will cause the transistor 180 to be turned on, so that the current flows from the battery VB to the coil 161 of the solenoid valve 16. The inductance component 61*a* of the coil 161 provides a smooth rise in rate of current flow to the coil 161. During a period of time in which the first drive signal is at the high level (i.e., the valve on-duration T1), an average current Io depending upon the pulse width T3 of the third drive signal flows through the coil 161, thereby causing the solenoid valve 16 to be opened. The amount of displacement of the spool 163 of the solenoid valve 16 depends upon the degree of the average current Io. In other words, the amount of fuel to be discharged from the solenoid valve 16 is determined by the degree of the average current Io. When the first drive signal drops to the low level at the end of the valve on-duration T1, it will cause the current flow through the coil 161 to be decreased to zero, so that the solenoid valve 16 is closed.

The second drive signal is reverse in logical level to the first drive signal. When the second drive signal is at the low level, the transistor 186 is turned on, thereby causing the high-voltage side (*a* in FIG. 14) and the low-voltage side (*b*) of the coil 161 to connect with each other through the diode 187. Thus, when the transistor 180 is turned off, the current flows through an closed loop consisting of the coil 161, the transistor 186, and the diode 187.

Specifically, when the third drive signal is turned on and off cyclically for the valve on-duration T1, it will cause the transistor 180 to be turned on and off cyclically. The closed loop consisting of the coil 161, the transistor 186, and the diode 187 is formed cyclically for the valve on-duration T1 when the transistor 180 is turned off, thereby minimizing the quantity of heat produced from the transistor 180.

When the first drive signal falls in level, and the transistor 180 is turned off, the transistor 186 is also turned off, thereby opening the connection of the points a and b, so that the electric potential at the point b rises up to the zener voltage Vz=30V. The transistor 180 increases in resistance thereof, so that it consumes the magnetic energy stored in the inductance component 161*a* of the coil 161, thereby resulting in a rapid decrease in current flowing through the coil 161, which closes the solenoid valve 16 quickly.

Figure 16:
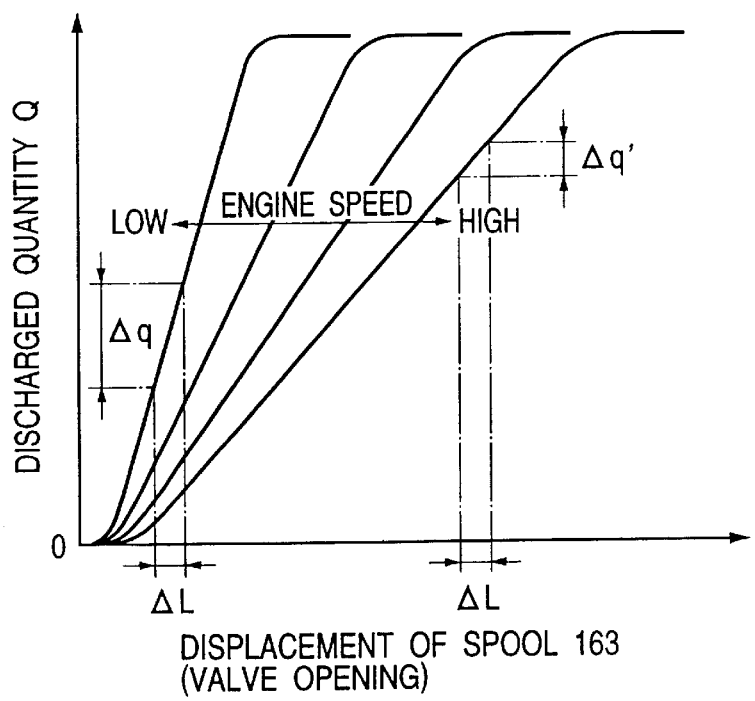
FIG. 16 is a graph which shows the relation between a discharged quantity of fuel and a displacement of a spool used in a solenoid valve.

FIG. 16 shows the relation between the quantity of fuel discharged from the solenoid valve 16 and the amount of displacement of the spool 163.

A change in discharged quantity of fuel per unit of displacement of the spool 163 (i.e., $\Delta q/\Delta L$) depends upon the engine speed. Specifically, as the engine speed decreases, the length of time the fuel is sucked into the pump 50 is increased, so that the ratio $\Delta q/\Delta L$ increases and meets the relation of $\Delta q/\Delta L > \Delta q'/\Delta L$ in FIG. 16.

Ensuring a discharged quantity of fuel in a high engine speed range requires an increase in maximum fluid path opening area of the spool 163 (i.e., a maximum degree of opening of the solenoid valve 16), thus resulting in lowered accuracy of adjustment of the quantity of fuel discharged from the pump 50 in a low engine speed range. In order to avoid this problem, this embodiment controls the length of time the solenoid valve 16 is opened as well as the amount of displacement of the spool 163 in the low engine speed range. Specifically, the adjustment of amount of displacement of the spool 163 is achieved by controlling the pulse width T3 (i.e., the duty cycle) of the third drive signal, while the adjustment of length of time the solenoid valve 16 is opened is achieved by controlling the valve on-duration T1.

Figure 17:
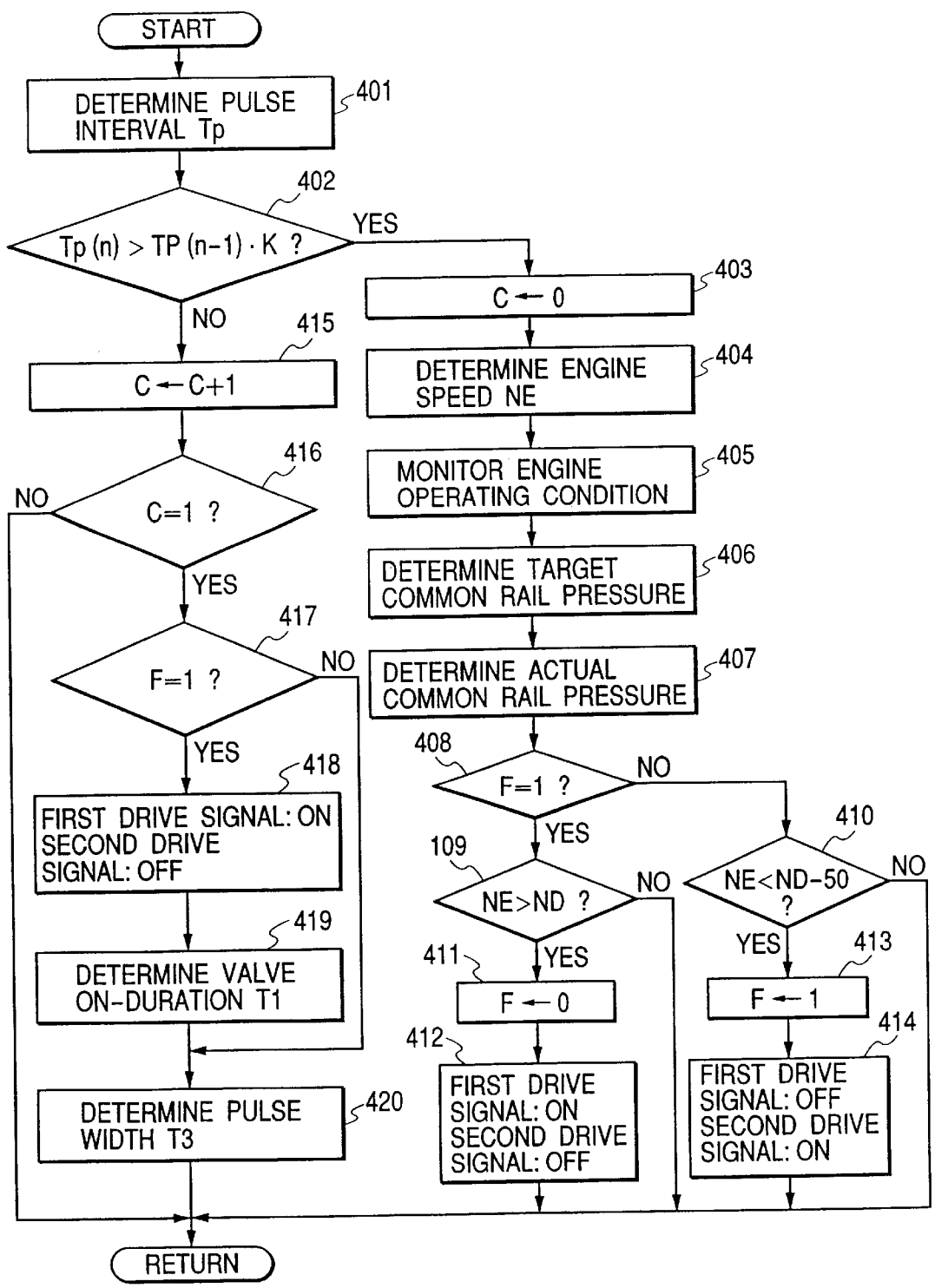
FIG. 17 is a flowchart of a program performed to control the quantity of fuel supplied to a common rail.

FIG. 17 shows a program or sequence of logical steps performed by the CPU 143 of the ECU 6 every input of pulses from the rotational angle sensor 52 to control energization of the solenoid valve 16 to have the common rail pressure reach the target common rail pressure.

After entering the program, the routine proceeds to step 401 wherein the time interval between the start of the previous program execution cycle and the start of this program execution cycle, that is, the pulse interval Tp between rises of adjacent two of pulses, as shown in FIG. 12(*b*), provided by outputs of the rotational angle sensor 52 is determined.

The routine proceeds to step 402 wherein it is determined whether the pulse interval Tp(n) determined in step 401 in this program execution cycle is greater than the product of the pulse interval Tp(n−1) determined one program execution cycle earlier and a constant K or not. This determination is made for determining whether a pulse produced by an output of the rotational angle sensor 52 in this program execution cycle is the reference pulse A, as shown in FIG. 12(*b*), or not. When the reference pulse A is produced, the pulse interval Tp will be about 2.5 times that when the pulse B is produced. The constant K is, thus, set to 2.28. If a YES answer is obtained, it is concluded that the reference pulse A is produced in this program execution cycle, and the routine proceeds to step 403.

In step 403, a pulse counter value C is reset to zero (0) for determining the timing with which the first and second drive signals are to be outputted.

The routine proceeds to step 404 wherein the engine speed NE is determined based on outputs of the rotational angle sensor 52.

The routine proceeds to step 405 wherein engine operating conditions such as engine load, engine coolant temperature, inlet air temperature, and inlet air pressure are determined using outputs from the engine load sensor 53, the coolant temperature sensor 54, the inlet air temperature sensor 55, and the inlet air pressure sensor 56.

The routine proceeds to step 406 wherein the target common rail pressure is determined based on the engine speed NE and engine operating conditions determined in steps 404 and 405.

The routine proceeds to step 407 wherein the actual common rail pressure is determined based on an output of the common rail pressure sensor 9.

The routine proceeds to step 408 wherein it is determined whether a control mode flag F is one (1) or not. When the control mode flag F is one (1), it means that the low engine speed control mode is entered in which the fluid path opening area of the solenoid valve 16 (i.e., the amount of displacement of the spool 163) and the valve on-duration T1 in which the solenoid valve 16 is opened are both controlled. Alternatively, when the control mode flag F is zero (0), it means that the high engine speed control mode is entered in which only the fluid path opening area of the solenoid valve 16 is controlled. The control mode flag F is set to one (1) upon initiation of the program following turning on of the ignition key of the vehicle.

Therefore, if a YES answer is obtained in step 408 (F=1), then the routine proceeds to step 409 wherein it is determined whether the engine speed NE is greater than a reference value ND or not. The reference value ND is a criterion for determining whether the valve on-duration T1 is to be controlled or not and is set to 2000 rpm in this embodiment. Alternatively, if a NO answer is obtained in step 408 (F=0), then the routine proceeds to step 410 wherein it is determined whether the engine speed NE is smaller than the reference value ND minus 50 rmp or not. The use of a value derived by subtracting 50 rpm from the reference value ND as a criterion provides a hysteresis to determination of whether the control mode is to be switched or not, thereby avoiding the hunting which would be produced when the engine speed NE varies near the reference value ND cyclically.

If F=1, and NE≦ND or if F=0, and NE≧ND−50, the routine terminates. The CPU 143 keeps the current control mode as is.

If a YES answer is obtained in step 409, then the routine proceeds to step 411 wherein the control mode flag F is set to zero (0). The routine proceeds to step 412 wherein the CPU 43 outputs the first drive signal of high level (ON) and the second drive signal of low level (OFF) and terminates.

If a YES answer is obtained in step 410, then the routine proceeds to step 413 wherein the control mode flag F is set to one (1). The routine proceeds to step 414 wherein the CPU 43 outputs the first drive signal of low level (OFF) and the second drive signal of high level (ON) and terminates.

Figure 18:
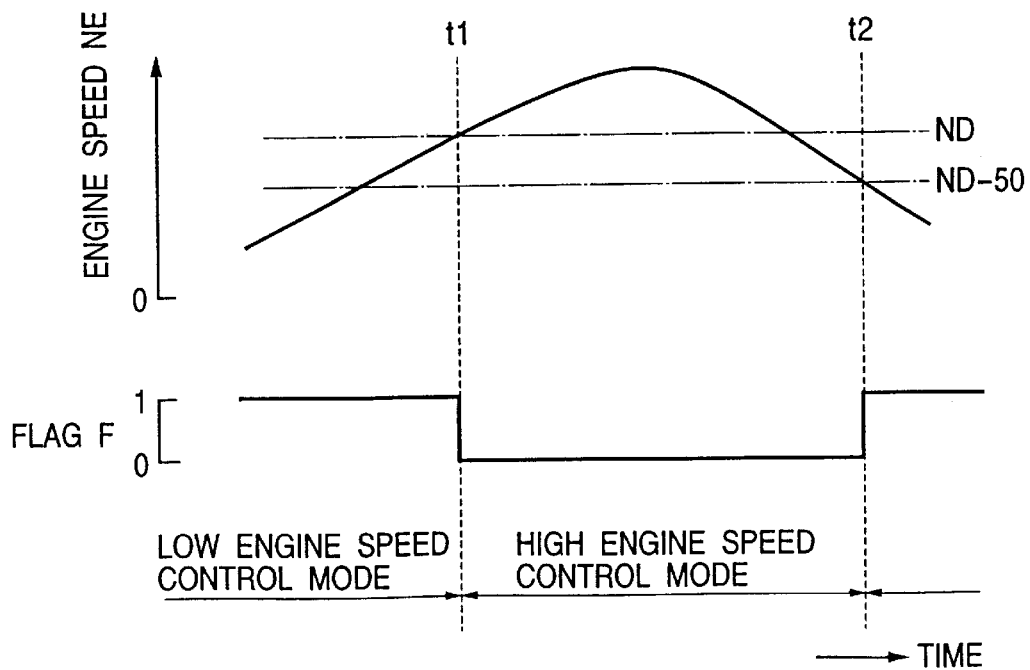
FIG. 18 shows the relation between engine speed and mode of fuel discharge control.

Referring now to FIG. 18, when the engine speed NE reaches the reference value ND at time t1, the control mode flag F is set to zero (step 411). The low engine speed control mode in which the fluid path opening area of the solenoid valve 16 and the valve on-duration T1 in which the solenoid valve 16 is opened are both controlled is switched to the high engine speed control mode in which only the fluid path opening area of the solenoid valve 16 is controlled. When the engine speed NE drops below the reference value ND minus 50 at time t2, the control mode flag F is set to one (step 413). The high engine speed control mode is switched to the low engine speed control mode.

If a NO answer is obtained in step 402 meaning that the pulse produced by the output of the rotational angle sensor 52 in this program execution cycle is not the reference pulse A, then the routine proceeds to step 415 wherein the pulse counter value C is incremented by one (1). The routine proceeds to step 416 wherein it is determined whether the pulse counter value C is one (1) or not. If a YES answer is obtained concluding that the time the energization of the solenoid valve 16 is to be controlled has been reached, then the routine proceeds to step 417. Alternatively, if a NO answer is obtained in step 416,then the routine terminates.

In step 417, it is determined whether the control mode flat F is one (1) or not. If a YES answer is obtained, then the routine proceeds to step 418 wherein the CPU 43 outputs the first drive signal of high level and the second drive signal of low level. The routine proceeds to step 419 wherein the valve on-duration T1 is determined based on a difference between the actual common rail pressure and the target common rail pressure. The valve on-duration T1 is the length of time the second drive signal is kept at the low level and increased as the actual common rail pressure becomes lower than the target common rail pressure.

Figure 15:
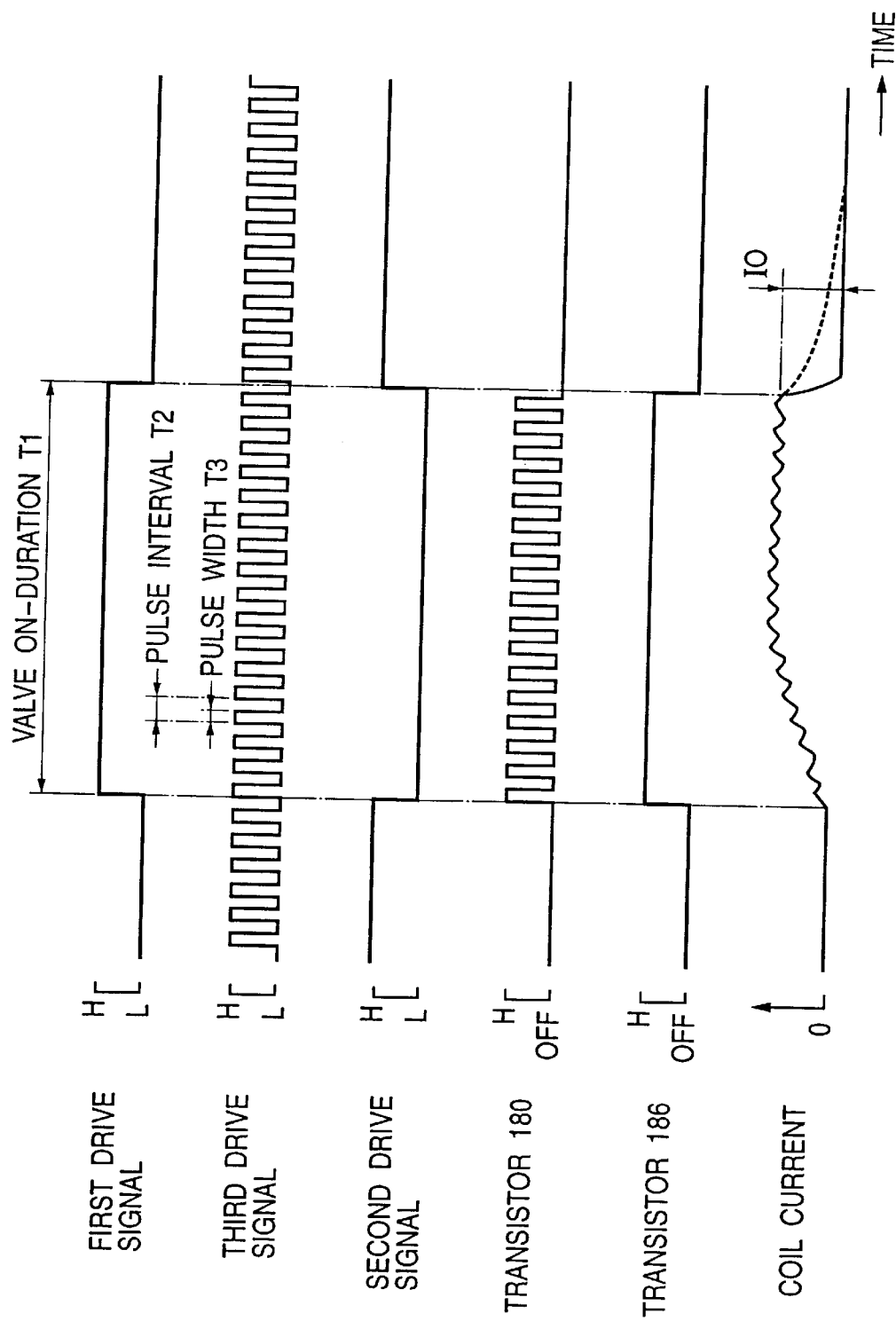
FIG. 15 is a time chart which shows the relation among first, second, and third drive signals inputted to a drive circuit for a solenoid valve, transistors of the drive circuit, and current supplied to a coil of the solenoid valve.

The routine proceeds to step 412 wherein the on-time of the third drive signal, i.e., the pulse width T3 shown in FIG. 15 is determined based on the difference between the actual common rail pressure and the target common rail pressure. The pulse width T3 is increased as the actual common rail pressure becomes lower than the target common rail pressure, so that the amount of displacement of the spool 163 is increased, thus resulting in an increase in fluid path opening area of the solenoid valve 16. FIG. 19 shows the relation among the first drive signal and the amount of lift of the flat portions 115a to 115c of the eccentric cam 115 and the plungers 230a to 230c of the variable discharge high pressure pump 50 in the low engine speed control mode in which the fluid path opening area of the solenoid valve 16 and the valve on-duration T1 in which the solenoid valve 16 is opened are both controlled.

The first drive signal is turned on and off in synchronism with 120° rotation of the drive shaft 110 (i.e., the engine 2). For instance, at time t11 when the plunger 230a almost reaches TDC, the first drive signal is turned on. Between times t11 and t12 (i.e., the valve on-duration), the solenoid valve 16 is actuated in the low engine speed control mode (steps 418 to 420 in FIG. 17), so that the fuel is sucked into the pressure chambers 240a to 240c of the pump 50. The quantity of fuel sucked per unit time is determined as a function of the pulse width T3 of the third drive signal inputted to the solenoid valve 16. In other words, the plunger 230a, for example, is moved up and down by an amount corresponding to the fluid path opening area of the solenoid valve 16 determined by the pulse width T3.

At time t12, the first drive signal is turned off to close the solenoid valve 16. Between times t12 and t13, for example, the pressure chamber 240a is kept in pressure constant, thereby holding the plunger 230a from moving. When time t13 is reached after the drive shaft 110 rotates 120° from time t11, the plunger 230b reaches TDC, and the first drive signal is turned on again. Similarly, when time t14 is reached after the drive shaft 110 rotates 120° from time t13, the plunger 230c reaches TDC, and the first drive signal is turned on again.

At time t15, the flat portion 115a of the eccentric cam 115 is brought into contact with the lower end of the plunger 230a through the pad 131a to lift up the plunger 230a, thereby decreasing the volume of the pressure chamber 240a to elevate the pressure of fuel therein. When the fuel pressure reaches a given valve opening set pressure, it will cause the check valve 51, as shown in FIG. 10 to be lifted up, thereby allowing the fuel in the pressure chamber 240a to be discharged to the common rail 4.

FIG. 20 shows the relation the relation among the first drive signal and the amount of lift of the flat portions 115a to 115c of the eccentric cam 115 and the plungers 230a to 230c of the variable discharge high pressure pump 50 in the high engine speed control mode in which only the fluid path opening area of the solenoid valve 16 is controlled.

The first drive signal is kept on without providing the valve on-duration T1. For instance, at time t21, the pulse width T3 of only the third drive signal is determined to control the solenoid valve 16 in the high engine speed control mode (step 420 in FIG. 17). The downward movement of the plunger 230a causes the fuel to be sucked into the pressure chamber 240a. Similarly, when times t22 and t23 are reached, the plungers 230b and 230c are moved downward, thereby causing the fuel to be sucked into the pressure chambers 240b and 240c, respectively, As apparent from the above discussion, when the engine speed is relatively low, the solenoid valve 16 is actuated in the low engine speed control mode, as shown in FIG. 19, thereby allowing fine adjustment of the quantity of fuel discharged from the variable discharge high pressure pump 50 to the common rail 4 as needed. In contrast, when the engine speed is relatively high, the solenoid valve 16 is actuated in the high engine speed control mode, as shown in FIG. 15, without controlling the valve on-duration T1 in which the solenoid valve 16 is opened. The reason that the valve on-duration T1 needs not be limited in the high engine speed range is because a change in quantity of fuel discharged from the solenoid valve 16 per unit of displacement of the spool 163 (i.e., $\Delta q/\Delta L$) when the engine speed is high is, as described above with reference to FIG. 16, smaller than that when the engine speed is low.

By way of example, FIG. 21 shows the relation among the first drive signal and the amount of lift of the flat portions 115a to 115c of the eccentric cam 115 and the plungers 230a to 230c of the variable discharge high pressure pump 50 when only the valve on-duration T1 is controlled.

When the first drive signal is turned off, the solenoid valve 16 is closed completely, while when the first drive signal is turned on, the solenoid valve 16 is opened fully. For instance, between times t31 and t32, the plunger 230a is moved downward following downward movement of the flat portion 115a of the eccentric cam 115. Between times t32 and t33, the plunger 230a is held from moving downward because the solenoid valve 16 is closed fully. Immediately after time t33, the plunger 230a moves down to the flat portion 115a rapidly. This causes the fuel to be sucked into the pressure chamber 240a suddenly, thus resulting in difficulty in controlling fine adjustment of the amount of fuel discharged from the variable discharge high pressure pump 50.

Figure 22:
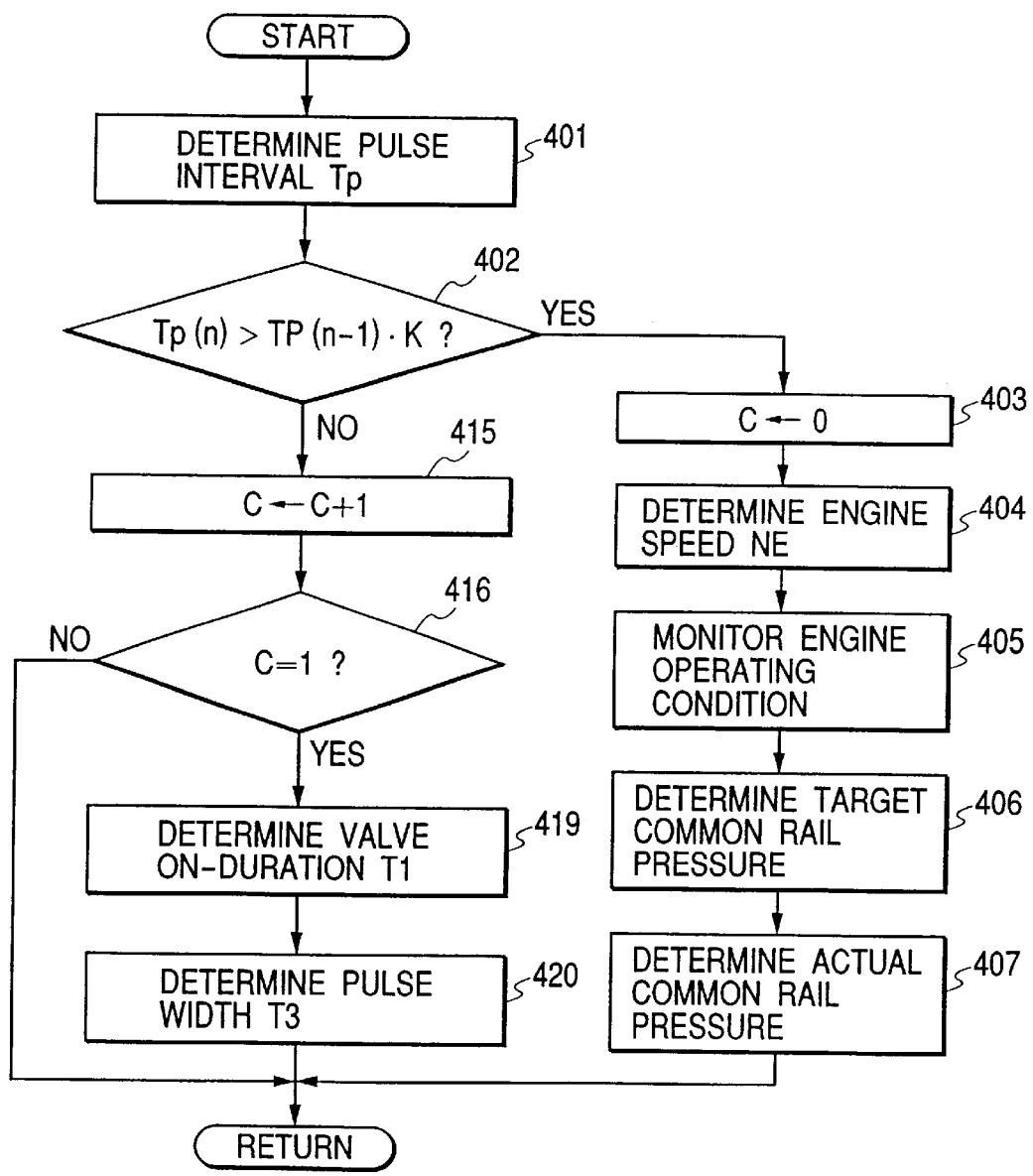
FIG. 22 shows a flowchart of a program which is a modification of the one shown in FIG. 17.

FIG. 22 shows a solenoid valve control program which is a modification of the one shown in FIG. 17 in the second embodiment. This program simplifies the control of the solenoid valve 16 by eliminating selection of the low and high engine speed control modes.

Figure 23:
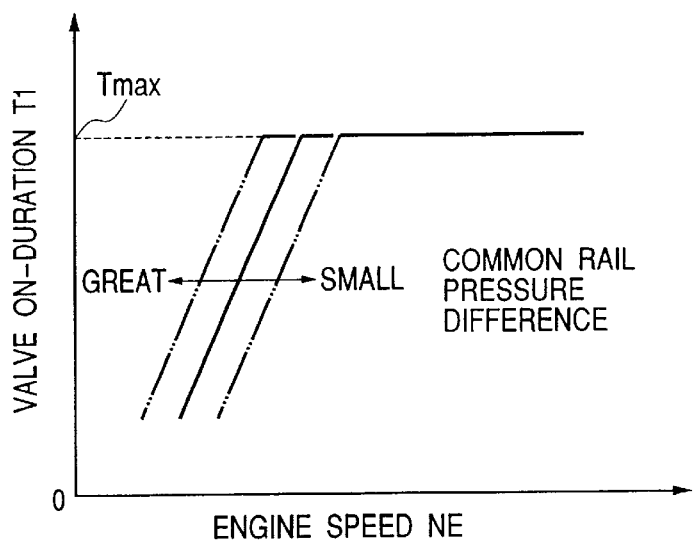
FIG. 23 is a graph which shows the relation between a valve on-duration of a solenoid valve and engine speed in terms of a difference between an actual common rail pressure and a target common rail pressure.

Specifically, this program is equivalent to the one shown in FIG. 17 from which steps 408 to 411, 417, and 418 are omitted. The CPU 143 determines the target common rail pressure and the actual common rail pressure when the reference pulse A is produced by an output from the rotational angle sensor 52, that is, if a YES answer is obtained in step 402. When the pulse B is produced, that is, when the pulse counter value C is one (1) in step 116, the valve on-duration T1 and the pulse width T3 of the third drive signal are determined in steps 419 and 420. The determination of the valve on-duration T1 is achieved by look-up using a map, as shown in FIG. 23. The determination of the pulse width T3 is achieved based on the difference between the target common rail pressure and the actual common rail pressure in the same manner as in step 420 of FIG. 17.

FIG. 23 shows the map used in determining the valve on-duration T1 in terms of the engine speed NE and the difference between the target common rail pressure and the actual common rail pressure.

Basically, the valve on-duration T1 is increased as the engine speed NE becomes high, however, when the engine speed NE exceeds a predetermined value, the valve on-duration T1 is kept at a maximum value Tmax. This means that the first drive signal is kept on for a period of time longer than one cycle of pulses produced by outputs from the rotational angle sensor 52. Thus, in the high engine speed range, the solenoid valve 16 is actuated in the high engine speed control mode in which only the fluid path opening area of the solenoid valve 16 (i.e., the amount of displacement of the spool 163) is controlled. In the low engine speed range, the solenoid valve 16 is actuated in the low engine speed control mode in which the fluid path opening area of the solenoid valve 16 and the valve on-duration T1 are both controlled.

In the above second embodiment, the switching between the low and high engine speed control modes of the solenoid valve 16 is performed as a function of the engine speed NE, however, it may be achieved using an engine load (i.e., output of the engine load sensor 53) or a combination of the engine speed NE and the engine load.

Further, the solenoid valve 16 may alternatively be disposed in the outlet of the pump 50, for example, the high pressure fluid path 127 or 127. In this case, the high pressure fuel acts on the solenoid valve 16, which may lead to instability of operation of the solenoid valve 16, however, suitable selection of the low and high engine speed control modes enables fine adjustment of the quantity of fuel with high accuracy over a wide operating range of the engine 2.

Figure 24:
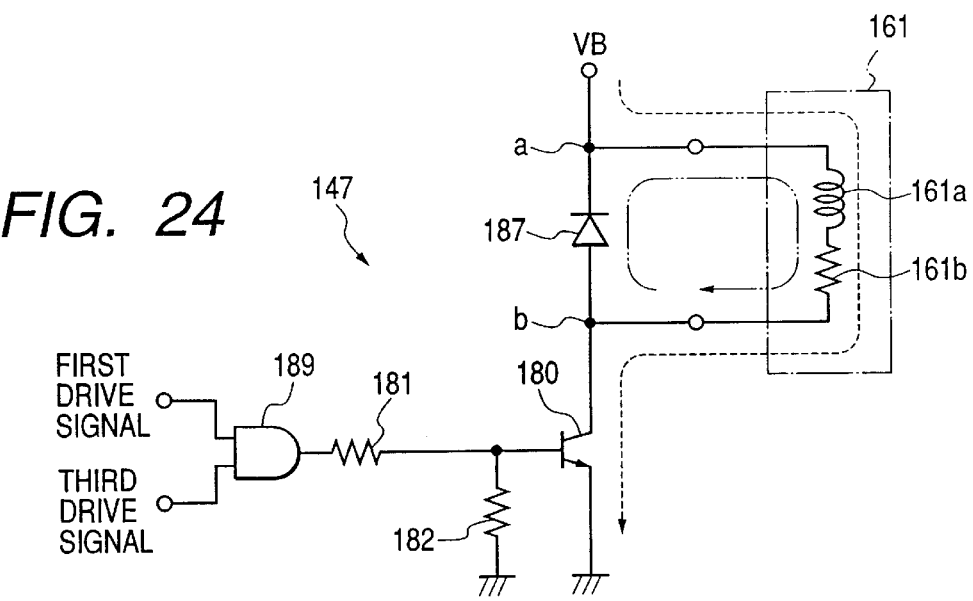
FIG. 24 is a circuit diagram which shows a modification of the circuit structure shown in FIG. 14.
Figure 25:
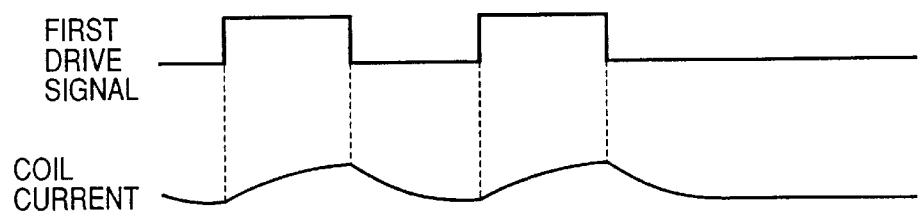
FIG. 25 shows waveforms of a first drive signal and current supplied to a coil of a solenoid valve in FIG. 24.

FIG. 24 shows a modification of the circuit structure of the drive circuit 147. The same reference numbers as employed in FIG. 14 refer to the same parts, and explanation thereof in detail will be omitted here.

The shown structure is equivalent to the one of FIG. 14 from which the zener diodes 183 and 185, the diode 184, the transistor 186, and the resistor 188 are omitted.

The high voltage side (point a)and the low voltage side (point b) of the coil 161 are connected through the diode 187 at all times. During a time when the first drive signal is turned on, the current depending upon the pulse width T3 (i.e., the duty cycle) of the third drive signal, as shown in FIG. 15, flows through the coil 161. When the first drive signal falls in level to turn off the transistor 180, the current flows through the closed loop consisting of the coil 161 and the diode 187. This minimizes the quantity of heat produced by the transistor 180.

Figure 26:
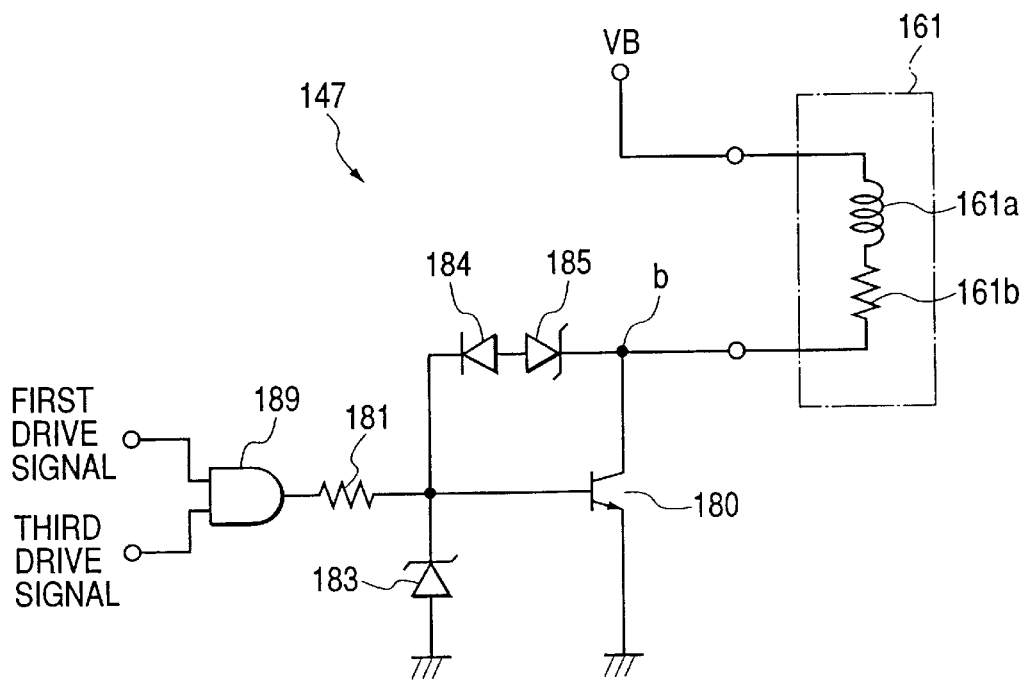
FIG. 26 is a circuit diagram which shows the second modification of the circuit structure shown in FIG. 14.

FIG. 26 shows the second modification of the circuit structure of the drive circuit 147. The same reference numbers as employed in FIG. 14 refer to the same parts, and explanation thereof in detail will be omitted here.

The shown structure is equivalent to the one of FIG. 14 from which the transistor 186, the diode 187, and the resistor 188 are omitted.

Figure 27:
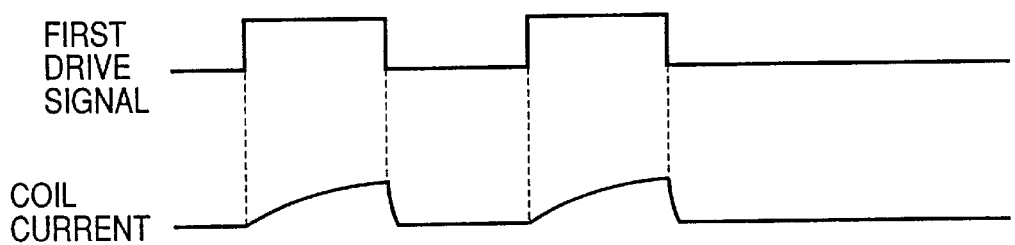
FIG. 27 shows waveforms of a first drive signal and current supplied to a coil of a solenoid valve in FIG. 26.

The high voltage side (point a)is not connected to the low voltage side (point b) of the coil 161. When the first drive signal falls in level to turn off the transistor 180, the electric potential appearing at the point b rises up to the zener voltage Vz=30V of the zener diode 185, thereby increasing the resistance of the transistor 180, which consumes the magnetic energy saved in the inductance component 61a of the coil 161. This results in a rapid decrease in current, as shown in FIG. 27, flowing through the coil 161, thus closing the solenoid valve 16 quickly.

As an alternative to installing the zener diode 185 in the drive circuit 147 for elevating the electric potential at the grounded side of the coil 161, a transistor may be used which is designed to block and establish the current flow through the coil 161 selectively and to elevate the electric potential at the grounded side of the coil 161.

The variable discharge high pressure pump 50 may alternatively have the structure wherein a plurality of plungers are arranged along the length of the drive shaft 110 so that they may be moved up and down in synchronism with a rotational movement of the drive shaft 110 through a given angle to pressurize and discharge the fuel to the common rail 4.

Figure 28:
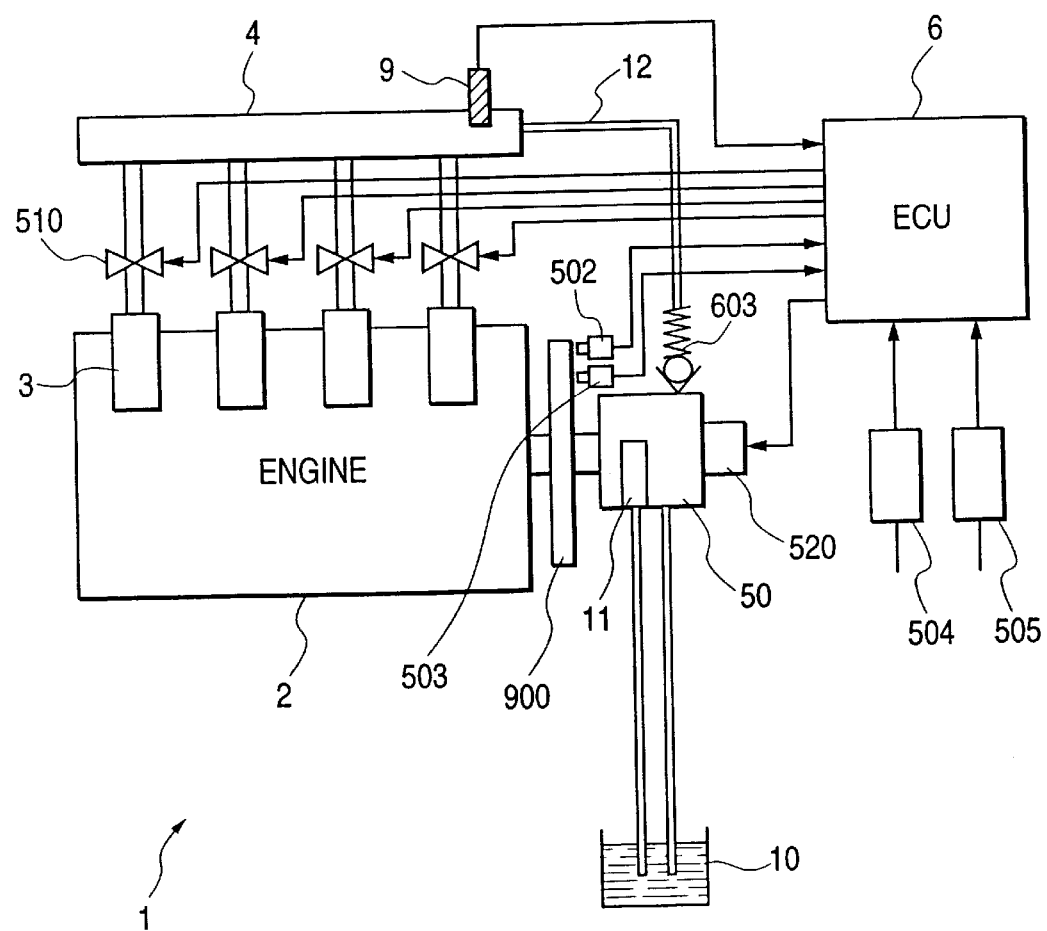
FIG. 28 is a block diagram which shows a fuel injection system according to the third embodiment of the invention.

FIG. 28 shows an accumulator fuel injection system 1 according to the third embodiment of the invention. The same reference numbers as employed in the above embodiments refer to the same parts, and explanation thereof in detail will be omitted here.

The accumulator fuel injection system 1 includes an engine speed sensor 502, a TDC (Top Dead Center) sensor 503, a throttle sensor 504, and a temperature sensor 505. The engine speed sensor 502 monitors NE pulses, as will be described later, through a coupling K connected to a cam shaft of the engine 2. The TDC sensor 503 detects a top dead center of pistons of the engine 2. The temperature sensor 505 measures, for example, the temperature of coolant for the engine 2. The ECU 6 receives information on common rail pressure, engine speed, TDC of pistons, throttle valve opening, and temperature from the sensors 9, 502 to 505 to provide control signals to solenoid valves 510 of the injectors 3 and a delivery control unit 520. The delivery control unit 520 is responsive to the control signal from the ECU 6 to control the amount of fuel discharged from the variable discharge high pressure pump 50 to have the actual common rail pressure reach the target common rail pressure. The variable discharge high pressure pump 50 of this embodiment has the feed pump 11 disposed therein.

Figure 29:
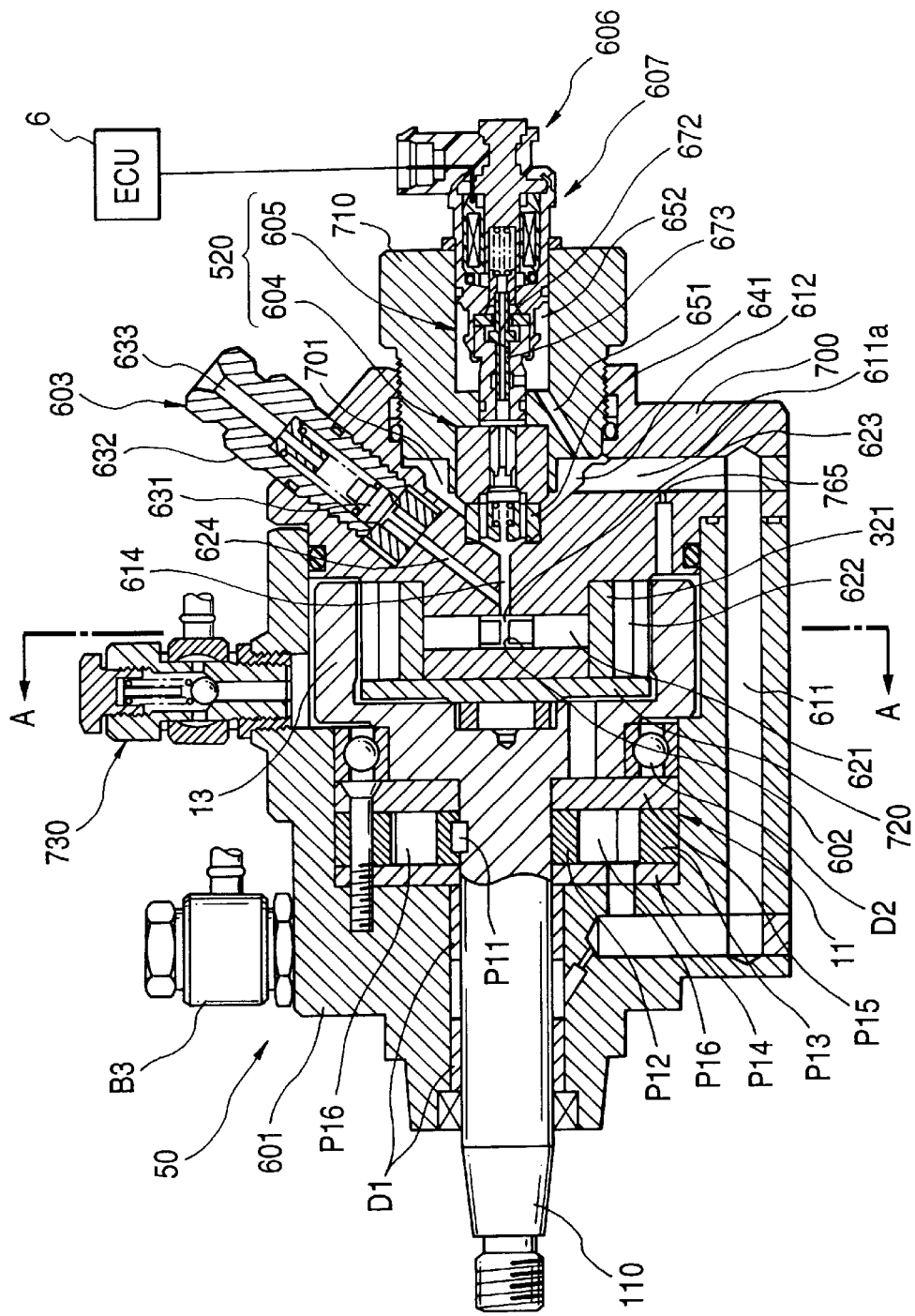
FIG. 29 is a cross sectional view which shows a variable discharge high pressure pump.
Figure 30:
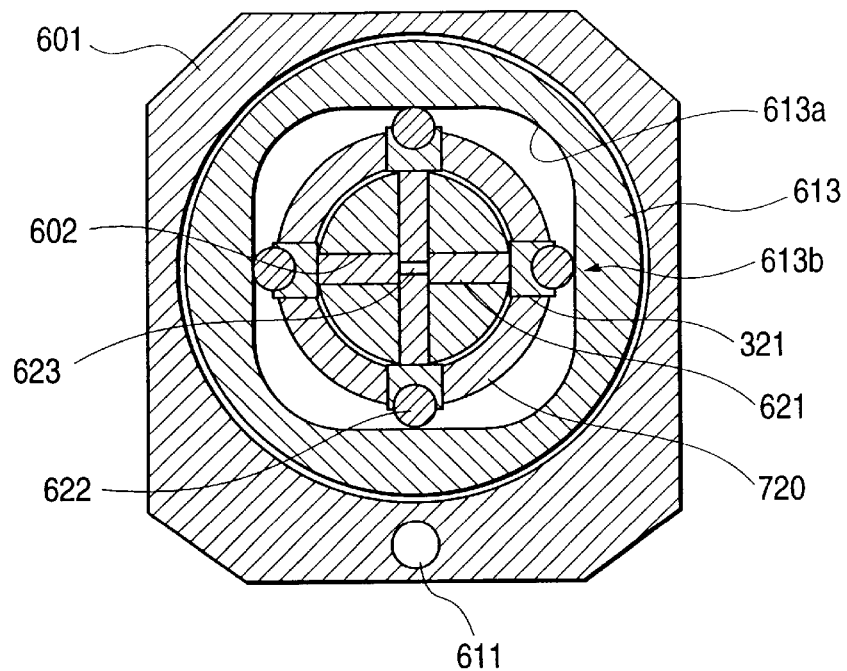
FIG. 30 is a cross sectional view taken along the line A—A in FIG. 29.

The variable discharge high pressure pump 50 includes, as shown in FIGS. 29 and 30, a pump housing 601 in which a drive shaft 110 is supported rotatably through bearings D1 and D2. To the drive shaft 110, the vane type feed pump 11 is connected which pumps the fuel out of the fuel tank 10 to supply it to a feed path 611. A cam 613 is formed integrally on an end of the drive shaft 110. The cam 613 rotates at a speed of ½ times the engine speed. The rotation of the cam 613 causes a rotor P12 of the feed pump 11 to rotate through a woodruff plate P11 to suck through an inlet valve B3 the fuel from the fuel tank 10 into a chamber within the feed pump 11 defined by the rotor P12, a casing P13, and covers P14 and P15. The fuel sucked into the feed pump 11 is fed to the feed path 611 through a line (not shown) by a vane P16 installed on the rotor P12 according to the rotation of the rotor P12.

The fuel within the feed path 611 is, as will be discussed later in detail, not only fed to the common rail 4, but also flows into the pump 50 through an orifice 765 for lubricating interior parts of the pump 50. After lubrication, the fuel is discharged from a valve 730 and returned to the fuel tank 10. The valve 730 also serves to keep the internal pressure of the pump 50 substantially at the atmospheric pressure.

A pump head 700 is installed in an end portion of the pump housing 601. The pump head 700 has formed on the center of a side surface a protrusion inserted into the cam 613 in which a plurality of sliding grooves 602, as shown in FIG. 30, are formed. Within the sliding grooves 602, plungers 621 are disposed slidably. Each of the plungers 621 has disposed on its end a shoe 321 retaining a cam roller 622 rotatably. The shoes 321 are supported slidably by a guide 720 so that they may be moved only in a radius direction. The guide 720 is secured on the pump head 700 through bolts (not shown).

The cam 613 is slidable along the periphery of the cam roller 622. The cam 613 has, as clearly shown in FIG. 30, formed therein an inner surface 613a having substantially a rectangular shape. The rotation of the cam 613 causes the cam rollers 622 to be moved or lifted in a radial direction of the cam 613 along the undulation of the cam surface 613a (generally referred to as a lift curve) to change the volume of a pressure chamber 623 defined by inner ends of the plungers 621 within the sliding grooves 602, thereby sucking the fuel into the pressure chamber 23 and pressurizing it cyclically. The centers 613b between adjacent two of corners of the cam surface 613a corresponding to tops of a developed profile (i.e., the lift curve) of the cam surface 613a. When the cam rollers 622 engage the tops 613b of the cam surface 613a, the plungers 621 reach an inner limit to minimize the volume of the pressure chamber 623.

Usually, typical variable discharge pumps have springs to urge the plungers 621 into constant engagement with the cam 613. The pump 50 of this embodiment is of the type to control a sucked quantity of fuel. Thus, if the plungers 621 is forced by the spring pressure to move down to the lower limit when a sucked quantity of fuel is small, it will cause a great drop in pressure in the pressure chamber 623, which may lead to the cavitation. In order to avoid this problem, the pump 50 does not use the spring and moves the plungers 621 by a lift of the cam 613 produced by rotation of the drive shaft 110 in a compression stroke and by the pressure of sucked fuel in a suction stroke. Therefore, when a sucked quantity of fuel is small, the plungers 621 move toward the cam 613 only by the distance corresponding to the sucked quantity of fuel, so that the cam rollers 622 are held away from the cam surface 613a. A sucked quantity of fuel depends upon the rate at which the fuel is sucked.

The fuel pressurized in the pressure chamber 623 is fed from a delivery valve 603 installed in the pump head 700 through an outlet path 624 to the common rail 4. The delivery valve 603 consist of a valve 631 and a return spring 632 urging the valve 631 to a valve closed position. The valve 631 is opened when the fuel pressure exceeds the spring pressure to discharge the fuel from an outlet port 633.

The pump head 700 has formed in the right end thereof, as viewed in the drawing, a hole 701 which communicates with the pressure chamber 623 through a path 614. Within the hole 701, a stopper 641, a check valve 604, and a lock adapter 710 are disposed. The lock adapter 710 is screwed into the pump head 700 to secure the stopper 641 and the check valve 604 within the pump head 700. A throttle valve 605 that is one of component parts of the delivery control unit 520 is fitted into the lock adapter 710 in alignment with the check valve 604. An oil sump 612 is formed between the lock adapter 710 and the pump housing 601. An oil sump 652 is formed within the lock adapter 710. The oil sumps 612 and the 652 are connected to each other through a path 651 formed in the lock adapter 710. The feed paths 611 and 611 a and the oil sump 612, the path 651, and the oil sump 652 form a low pressure fluid path.

Figure 31A:
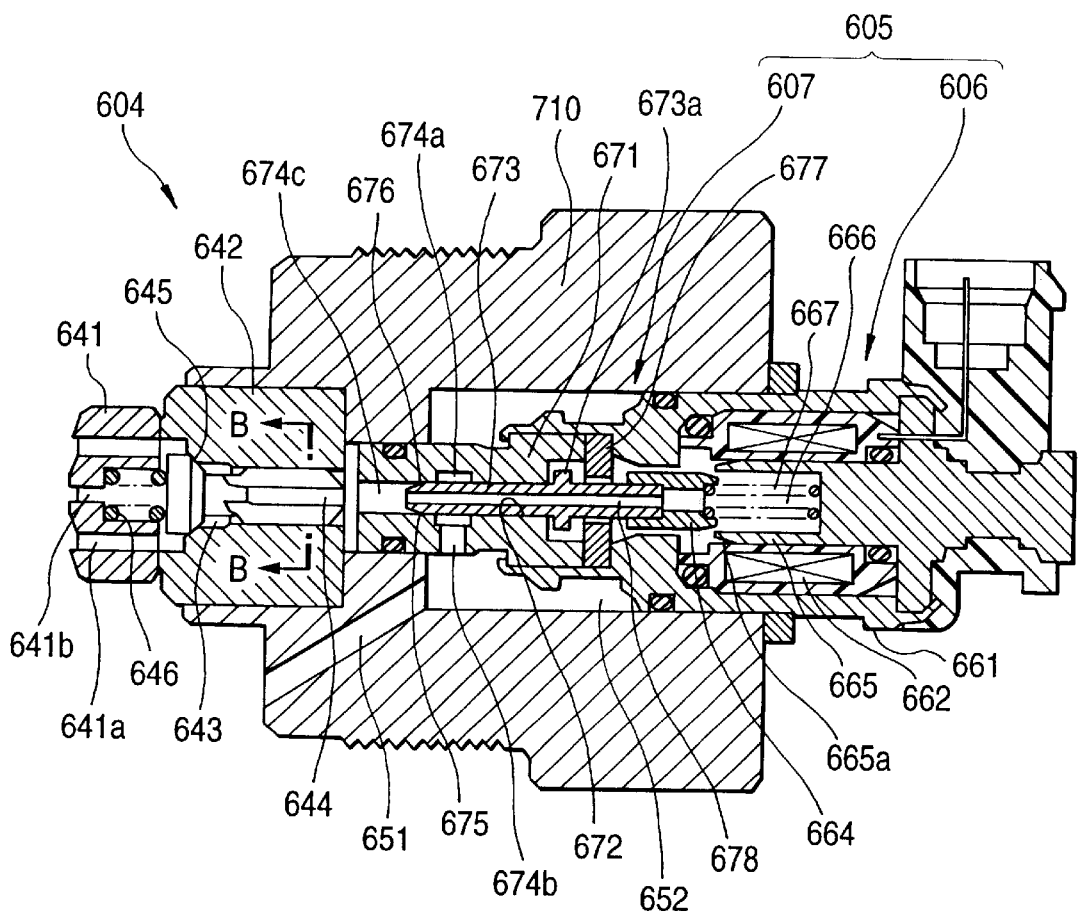
FIG. 31(a) is a longitudinal cross sectional view which shows a throttle valve.
Figure 31B:
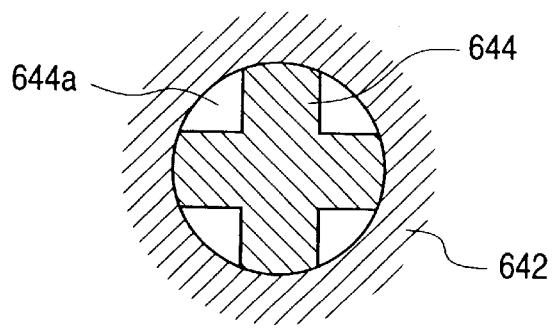
FIG. 31(b) is a cross sectional view taken along the line B—B in FIG. 31(a)

The check valve 604, as shown in FIG. 31(*a*), includes a housing 642 and a needle valve 644. The housing 642 has a fluid path 643 extending horizontally. The needle valve 644 opens and closes the fluid path 643. The fluid path 643 leads to a conical valve seat 645. The needle valve 644 is urged by a spring 646 retained in the stopper 641 into constant engagement with the valve seat 645. Specifically, the check valve 604 is normally closed and is responsive to the pressure of fuel flowing from the throttle valve 605 to be opened. The needle valve 644 has, as clearly shown in FIG. 31(*b*), formed in its periphery four grooves through which the fuel passes.

The stopper 641 has formed therein fluid paths 641*a* and 641*b* for establishing fluid communication between the pressure chamber 623 and the fluid path 643. When the pressurized fuel starts to be discharged from the pump 50, the dynamic pressure of fuel from the pressure chamber 623 acts directly on the needle valve 644 through the central fluid path 641 b, thereby increasing a response rate of the needle valve 644 when closed.

When the check valve 604 is opened in response to the pressure of fuel flowing from the throttle valve 605, the fuel flows into the pressure chamber 623 through the valve seat 645 of the check valve 604 and the fluid paths 641*a* and 641*b* of the stopper 641. The needle valve 644 is opened in response to the dynamic pressure of the fuel pressurized in the pressure chamber 623 and kept as is until the end of a feed cycle of the fuel, i.e., the end of the compression stroke of the plungers 621.

The throttle valve 605 includes a valve assembly 607 and an actuator 606. The actuator 606 has a housing 661 fitted into the lock adapter 701. The valve assembly 607 includes a valve body 671 and an annular shim 677 which are fitted into an end of the housing 661. The valve body 671 has formed therein a cylindrical chamber 672 in which a needle valve 673 is disposed and moved by the actuator 606.

The valve body 671 has an annular fluid path 674*a* formed around an end of the needle valve 673. The fluid path 674*a* communicates with the oil sump 652 through a fluid path 764*b* and with the check valve 604 through a fluid path 74*c*.

The needle valve 673 has a flange 673*a* working as a stopper which collides with the shim 677 to hold the needle valve 673 from moving toward the actuator 606.

An armature 664 is press-fitted on the right end of the needle valve 673 in alignment with a stator 665 with a given air gap therebetween. A coil 662 is wound around the periphery of the stator 665. A spring 667 is disposed within a spring chamber 666 formed in the stator 665 to urge the armature 664 left, as viewed in the drawing. The coil 662 is energized by the current supplied from the ECU 6 to produce magnetic force which attracts the needle valve 673 right, as viewed in the drawing.

A conical valve seat 675 is formed in an end of the fluid path 674*c* on which the needle valve 673 is seated when the coil 662 is deenergized to block fluid communication between the fluid paths 674*a* and 674*c*.

The stator 665 has a tapered head 665*a* which decreases in diameter as reaching the armature 664. The amount of lateral movement of the needle valve 673 (i.e., the armature 664), thus, depends upon the current flowing through the coil 662. As the current supplied to the coil 662 is increased, the amount of movement of the needle valve 673 is increased to increase an opening area between the fluid paths 674*a* and 674*c*.

Figure 32:
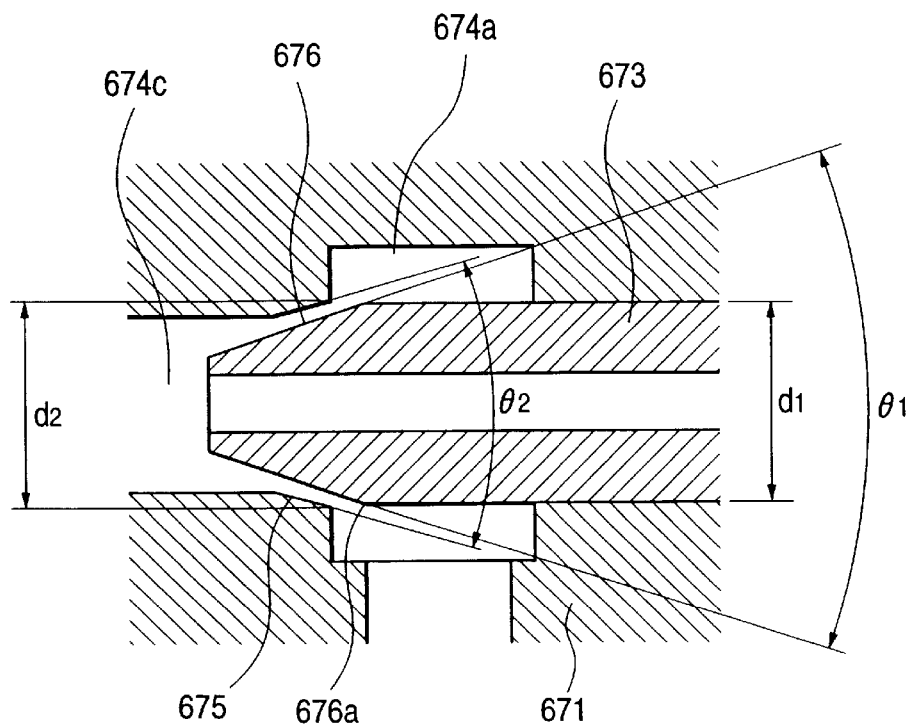
FIG. 32 is a partially enlarged view which shows a head of a needle valve installed in a throttle valve.

FIG. 32 is an enlarged view which shows the end of the needle valve 673. The diameter d1 of the needle valve 673 is 3.0 mm. The angle θ1 of the tapered head 676 is 30°. A maximum diameter d2 of the conical valve seat 675 is 3.1 mm. The angle θ2 of the conical valve seat 675 is 28°. When closed, the needle valve 673, thus, engages at a seal edge 676*a* the valve seat 675 hermetically to block the communication between the fluid paths 674*a* and 674*c*. Therefore, when the needle valve 673 is closed, the fuel pressure in the oil sump 652 does not urge the needle valve 673 in the valve opening direction at all. The diameter of the seal edge 676*a* is substantially equal to that of the needle valve 673, but may be smaller in a certain range that does not cause a failure in operation of the needle valve 673.

When the throttle valve 605 is opened to move the armature 664 right, as viewed in FIG. 31 (*a*), it will cause the spring chamber 666 to decrease in volume. The fuel in the spring chamber 666 flows into the fluid path 674*c* through a fluid path 678 extending along the longitudinal center line of the needle valve 673, thereby balancing the fuel pressures in the spring chamber 666 and the fluid path 674*c* with each other. This allows the spring 667 to have a smaller spring modulus, which also allows the attractive force produced by the actuator 606 to be decreased.

The variable discharge high pressure pump 50 performs a sequence of fuel suction and feed operations four times every rotation of the cam 613. The quantity fuel discharged from the pump 50 depends upon the quantity of fuel sucked into the pressure chamber 623. A sucked quantity of fuel Q may be expressed as:

$$Q = a \times S \times \sqrt{\Delta P \times \text{time}}$$

where a is a coefficient, S is a fluid path opening area of the throttle valve 605, ΔP is feed pressure, and time is determined by speed of the pump 50.

If a, ΔP, and time are constant, the sucked quantity of fuel Q may be controlled by adjusting the fluid path opening area S of the throttle valve 605. Specifically, the more the fluid path opening area of the throttle valve 605, the more the sucked quantity of fuel. The fluid path opening area of the throttle valve 605, i.e., the amount of displacement of the needle valve 673 is determined as a function of the current supplied to the coil 662 to produce the attractive force through the armature 664 and the spring pressure of the spring 667. Increasing the current supplied to the coil 662 causes the amount of displacement of the needle valve 673 to be increased to increase the quantity of fuel sucked into the pressure chamber 623.

The control of the variable discharge high pressure pump 50 will be discussed with reference to FIGS. 33(*a*) to 33(*e*) and FIGS. 34(*a*) to 34(*e*).

The NE pulses in FIG. 33(*a*) are outputs from the engine speed sensor 502 after being shaped in waveform by the ECU 6. The NE pulses indicate the phase of movement of the cam 613. The ECU 6, as described above, receives outputs from the load sensor 503, the common rail pressure sensor 9, the temperature sensor 505, and an atmospheric pressure sensor (not shown) and controls the current to be supplied to the coil 662 of the throttle valve 605 to regulate the quantity of fuel sucked into the pressure chamber 623.

FIGS. 33(a) to 33(e) show operations of the pump 50 when the engine speed is high.

The ECU 6 monitors the NE pulses produced by outputs from the engine speed sensor 503. The location of lack of the NE pulses bears a given angular relation to the tops 613b of the cam surface 613a. The ECU 6 monitors the angle (or time) from the lack of the NE pulses to determine the time when the actuator 606, i.e., the coil 662 is to be energized.

When a small quantity of current is supplied to the coil 662, the amount of displacement of the needle valve 673 is small, so that the fluid path opening area between the valve seat 675 and the head 676 of the needle valve 673 will be small. This causes the fuel to flow into the pressure chamber 623 slowly during the suction stroke of the plungers 621 (from (a) in FIG. 33(d)). The plungers 621 are moved outward, as viewed in FIG. 30, gradually without following the movement of the cam surface 613a. When the cam surface 613a starts to push the plungers 621 inwardly (at (b) in FIG. 33(d)), the compression stroke or feed stroke of the plungers 621 is initiated to pressurize the fuel in the pressure chamber 623. During the feed stroke of the plungers 621, the pressurized fuel acts on the check valve 604 and closes it fully. All the fuel pressurized in the pressure chamber 623 is, thus, fed to the common rail 4 from the delivery valve 603.

When it is required to increase the quantity of fuel fed to the common rail 4, the ECU 6 increases the current supplied to the coil 662 of the actuator 606 to increase the fluid path opening area between the valve seat 675 and the head 676 of the needle valve 673. This causes the rate at which the fuel flows into the pressure chamber 623 through the check valve 604 to rise, thereby moving the plungers 621 outward at high speeds. In this case, as clearly shown in FIG. 33(d), the plungers 621 engage the cam surface 613a earlier than when the quantity of fuel sucked into the pressure chamber 623 is small. A larger quantity of fuel is, thus, sucked into the pressure chamber 623.

As apparent from the above discussion, the amount of movement of the plungers 621 depends upon the amount of lateral displacement of the needle valve 673. The quantity of fuel fed to the common rail 4 per cycle of the pump 50 is expressed by the amount of movement of the plungers 621× the diameter of the plungers 621× the number of the plungers 621 (four in this embodiment).

FIGS. 34(a) to 34(e) show operations of the pump 50 when the engine speed is low.

In a low engine speed range, the ECU 6 controls, like the first embodiment, the length of time the throttle valve 605 is opened (i.e., the valve on-duration T1) as well as the fluid path opening area of the throttle valve 605 (i.e., the amount of displacement of the needle valve 673). This will be referred to below, similar to the above embodiments, as the low engine speed control mode. The control mode, as described above, when the engine speed is high will be referred to below as the high engine speed control mode.

As clearly shown in FIG. 34(b), only during the valve on-duration T1, the ECU 6 turns on the throttle valve 605 (i.e., the actuator 606).

When the coil 662 of the actuator 606 is energized, the fuel starts to be sucked into the pressure chamber 623, however, it is stopped immediately when the coil 662 is deenergized, so that the plungers 621 are held from moving outward in the course of the suction stroke. Afterwards, when the cam surface 613a is bought into contact with the plungers 621 after a given angular displacement of the cam 613, the feed stroke of the plungers 621 is initiated to pressurize the fuel in the pressure chamber 623, which is, in turn, fed to the common rail 4 from the delivery valve 603. The timing with which the ECU 6 supplies the current to the coil 662 of the actuator 606 is, as can be seen from FIGS. 34(d) and 34(e), advanced slightly from the tops of the lift curve of the cam 613 in light of the response rate of the needle valve 673 so that the fuel can be sucked into the pressure chamber 623 immediately after completion of the feed stroke of the plungers 621.

In the low engine speed range, the valve on-duration is increased as compared with the fluid path opening area of the throttle valve 605, thereby eliminating the need for the needle valve 673 to move quickly at the beginning and end of the valve on-duration. This allows the throttle valve 605 to be implemented with a linear solenoid valve, as shown in FIGS. 29 and 31(a).

Figure 35:
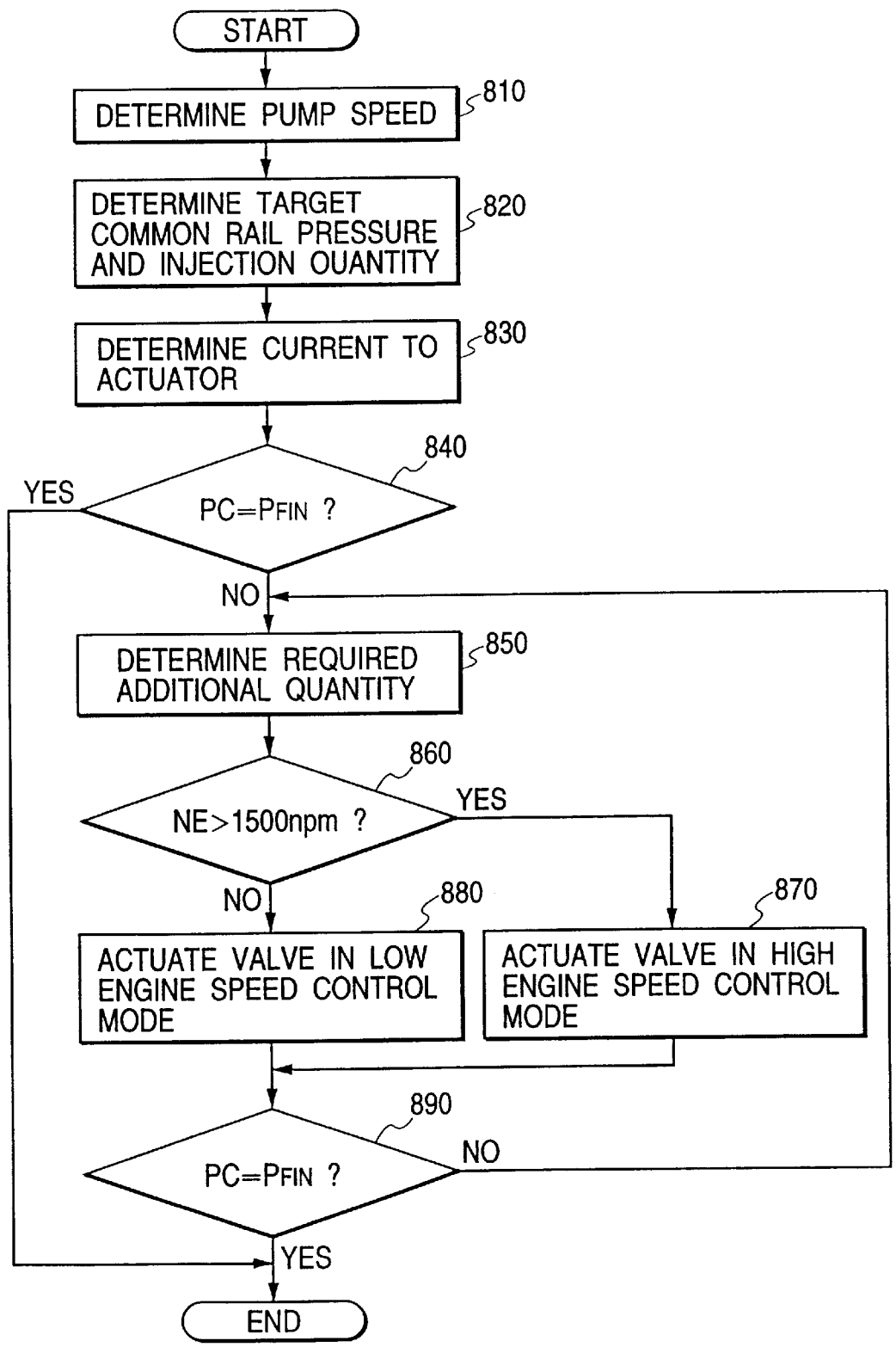
FIG. 35 is a flowchart which shows a program performed in the third embodiment.

FIG. 35 shows a program or sequence of logical steps performed by the ECU6 of the third embodiment.

After entering the program, the routine proceeds to step 810 wherein the ECU 6 monitors the NE pulses produced by outputs of the engine speed sensor 52 to determine the speed of the engine 2 (i.e., the speed of the pump 50). The routine proceeds to step 820 wherein the ECU 6 monitors an output of the throttle sensor 504 to determine the target common rail pressure PFIN and the injection quantity by look-up using given maps (not shown). The routine proceeds to step 830 wherein the ECU 6 determines the current to be supplied to the throttle valve 605 is determined based on the speed of the pump 50 and the target quantity of fuel to be fed to the common rail 4 and then opens the throttle valve 605.

The routine proceeds to step 840 wherein it is determined whether the actual common rail pressure Pc measured by the common rail pressure sensor 9 is equal to the target common rail pressure PFIN or not. If a YES answer is obtained then the routine terminates. Alternatively, if a NO answer is obtained, then the routine proceeds to step 850 wherein a difference between the actual common rail pressure Pc and the target common rail pressure PFIN is determined to derive an additional quantity of fuel to be discharged from the pump 50.

The routine proceeds to step 860 wherein it is determined whether the engine speed NE is greater than 1500 rpm or not. If a YES answer is obtained meaning that the engine 2 is operating at high speeds, then the routine proceeds to step 870 wherein the throttle valve 605 is actuated in the high engine speed control mode, as described above. Alternatively, if a NO answer is obtained meaning that the engine 2 is operating at low speeds, then the routine proceeds to step 880 wherein the throttle valve 605 is actuated in the low engine speed control mode, as described above. When it is required in step 880 to increase the quantity of fuel to be discharged from the pump 50 further, the ECU 6 increases the current to be supplied to the throttle valve 605 by a preselected unit and determines the valve on-duration T1.

The routine proceeds to step 890 wherein it is determined whether the actual common rail pressure Pc reaches the target common rail pressure PFIN or not. If a NO answer is obtained, then the routine returns back to step 850. Alternatively, if a YES answer is obtained, then the routine terminates.

The determination in step 860 of whether the pump 50 should be actuated in the low engine speed control mode or in the high engine speed control mode may alternatively be made by calculating a variation in pressure of fuel in the common rail 4 per unit of displacement of the needle valve 673 and actuating the pump 50 in the low engine speed control mode if the calculated variation in common rail pressure exceeds a predetermined threshold value, meaning that a change in discharged quantity of fuel per unit of displacement of the needle valve 673 (i.e., Δq/ΔL in FIG. 16) is increased.

Figure 36:
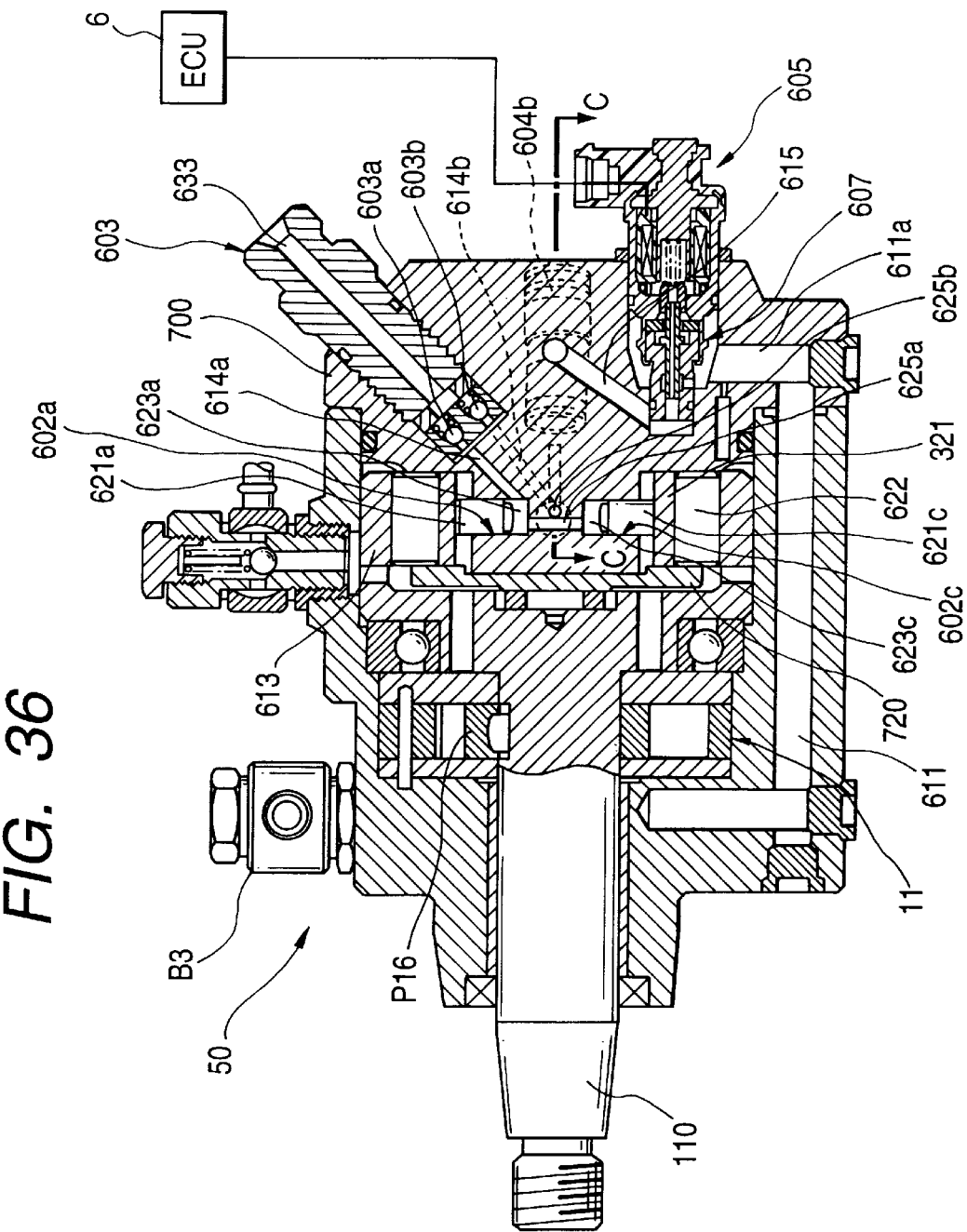
FIG. 36 is a cross sectional view which shows a variable discharge high pressure pump according to the fourth embodiment of the invention

FIG. 36 shows a variable discharge high pressure pump 50 used in an accumulator fuel injection system according to the fourth embodiment of the invention.

Figure 37A:
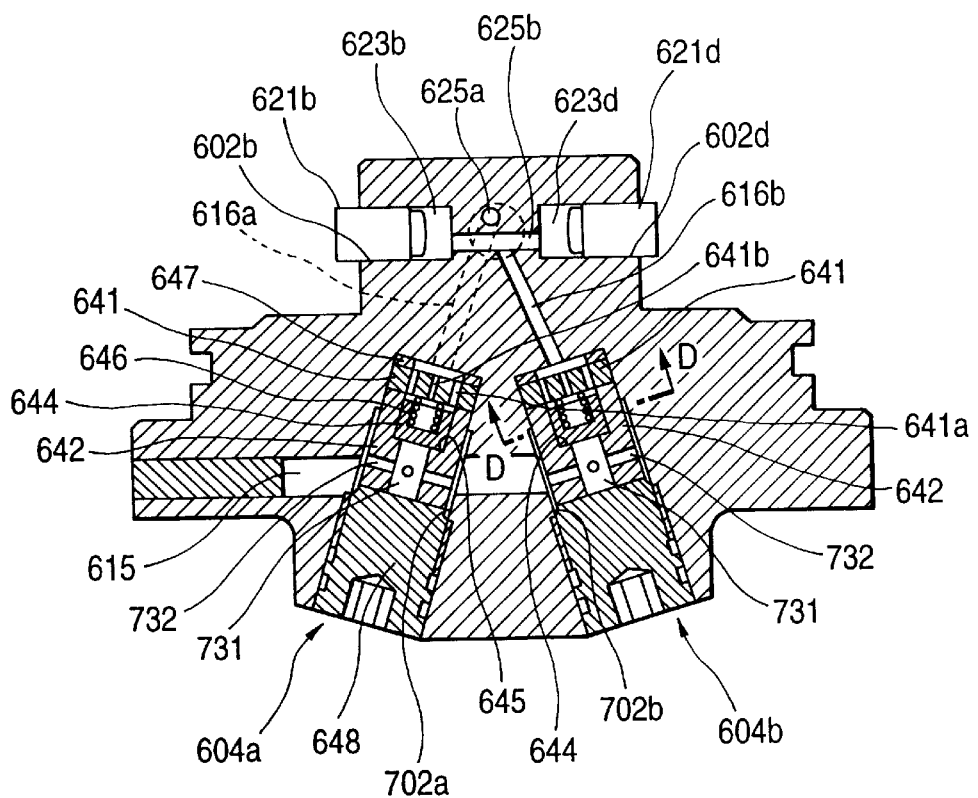
FIG. 37(a) is a partially cross sectional view taken along the line C—C in FIG. 36.

The pump 50 of this embodiment is basically identical in structure with the one in the third embodiment, however, has a pair of fuel feed lines. Specifically, the pump head 700, as shown in FIGS. 36 and 37(a), has two pairs of cylindrical chambers 602a, 602c, 602b, and 602d formed radially around the drive shaft 110 at angular intervals of 90°. The cylindrical chambers 602a and 602c are, as clearly shown in FIG. 36, connected to each other through a narrow fluid path 625a. Similarly, the cylindrical chambers 602b and 602d are, as shown in FIG. 38(a), connected to each other through a narrow fluid path 625b. Plungers 621a, 621b, 621c, and 621d are slidably disposed within the cylindrical chambers 602a to 602d to define pressure chambers 623a, 623b, 623c, and 623d between heads of the plungers 621a to 621d and inner walls of the cylindrical chambers 602a to 602d, respectively.

The cam 613 is in contact with cam rollers 622 installed on ends of the plungers 621a to 621d through the shoes 321. The cam 613 has two tops in a lift curve so that adjacent two of the plungers 621a to 621d, for example, the plungers 621a and 621b are moved at different angular intervals. If opposed two of the plungers 621a to 621d, for example, the plungers 621a and 621c enter the feed stroke at a 120° angular position of the cam 613, they initiate the suction stroke at a 60° angular position of the cam 613. In the following discussion, the pressure chambers 623a, 623b, 623c, and 623d defined by the cylindrical chamber 602a and the plunger 621a, the cylindrical chamber 602b and the plunger 621b, the cylindrical chamber 602c and the plunger 621c, and the cylindrical chamber 602d and the plunger 621d will also be referred to as #1, #2, #3, and #4 chambers, respectively.

The pressure chambers 623a and 623d communicate with check valves 603a and 603b of the delivery valve 603, so that the fuel pressurized in the pressure chambers 623a and 623c and in the pressure chambers 623b and 623d may be discharged from the outlet port 633 in sequence.

The pump head 700 has formed therein, as clearly shown in FIG. 37(a), a pair of cylindrical bores 702a and 702b whose bottoms communicate with the fluid paths 625a and 625b through fluid paths 616a and 616b, respectively. The cylindrical bores 702a and 702b also communicate with an outlet path 615 of the throttle valve 605.

Within the cylindrical bores 702a and 702b, gaskets 647, stoppers 641, check valves 604a and 604b are disposed. Each of the check valves 604a and 604b consists of a housing 642 and a bolt 648 screwed into a corresponding one of the bores 702a and 702b to retain the housing 642, the stopper 641 and the gasket 647 therewithin. Each of the housing 642 has formed therein a longitudinal fluid path 731 and lateral fluid paths 732 extending perpendicular to each other through the fluid path 731. The longitudinal fluid paths 731 communicate with the fluid paths 616a and 616b through paths 64 1a and 64 1b formed in the stoppers 641, respectively. The fluid paths 616a and 616b lead to the pressure chambers 623a and 623c and the chambers 623b and 623d, respectively. The lateral fluid paths 732 communicate with the outlet of the throttle valve 605 through outlet path 615.

Figure 37B:
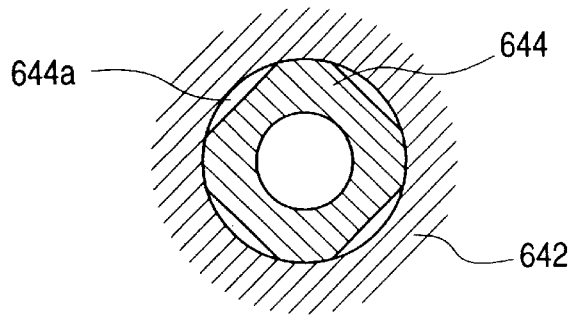
FIG. 37(b) is a cross sectional view taken along the line D—D in FIG. 37(a)

Each of the longitudinal fluid paths 731 has a large-diameter portion on the stopper side within which a cap-shaped valve 644 is urged by a spring 646 into constant engagement with a valve seat 645. Each of the valves 644, as clearly shown in FIG. 37(b), has formed thereon four flat outer surfaces to define fluid paths 644a between the flat surfaces and an inner wall of a corresponding one of the bores 702a and 702b to establish fluid communication between the lateral fluid paths 732and the outlet path 615.

The check valves 604a and 604b are opened in response to the fuel pressure flowing from the outlet path 615 of the throttle valve 605 and closed upon a rise in fuel pressure within the pressure chambers 623a to 623d.

With the above arrangements, first and second fuel feed lines are provided. In first fuel feed line, the fuel supplied from the feed path 611 is sucked into the pressure chambers 623a and 623c from the check valve 604a through the throttle valve 605 and pressurized and discharged to the common rail 4 through the check valve 603a of the delivery valve 603. In the second fuel feed line, the fuel supplied from the feed path 611 is sucked into the pressure chambers 623b and 623d from the check valve 604b through the throttle valve 605 and pressurized and discharged to the common rail 4 through the check valve 603b of the delivery valve 603.

FIGS. 38(a) to 38(f) show operations of the pump 50 when the engine speed is high.

Similar to the third embodiment, when the engine speed exceeds 1500 rpm, the ECU 6 actuates the pump 50 in the high engine speed control mode in which only the fluid path opening area of the throttle valve 605 is controlled.

The #1 and #3 pressure chambers are, as described above, oriented at angular intervals of 90° away from the #2 and #4 pressure chambers. The lift curve, as shown in FIG. 38(d), along which the plungers 621a and 621c in the #1 and #3 pressure chambers are moved is shifted 90° out of phase with the lift curve, as shown in FIG. 38(e), along which the plungers 621b and 621d in the #2 and #4 pressure chambers are moved. Therefore, the beginning (time d in FIG. 38(d))of the feed stroke of the plungers 621a and 621c in the #1 and #1 chambers is shifted from the beginning (time b in FIG. 38(e)) of the feed stroke of the plungers 621b and 621d in the #2 and #4 pressure chambers.

Between times a and b, all the plungers 621a to 621c in the #1 to #4 pressure chambers are in the suction stroke, so that the fuel pressure supplied from the throttle valve 605 are distributed to the #1 to #4 pressure chambers. The plungers 621a to 621c are moved slowly. When time b is reached, the #1 and #3 pressure chambers continue to suck the fuel, while the #2 and #4 pressure chambers start to feed the pressurized fuel. This causes the fuel supplied from the throttle valve 605 to flow only into the #1 and #3 pressure chambers, resulting in increased movement of the plungers 621a and 621c in the #1 and #3 pressure chambers.

When time c is reached, the #2 and #4 pressure chambers complete the feeding of the fuel and start to suck the fuel. All the plungers 621a to 621c in the #1 to #4 pressure chambers are moved slowly.

When time d is reached, the #2 and #4 pressure chambers continue to suck the fuel, while the #1 and #3 pressure chambers start to feed the pressurized fuel. This causes the fuel supplied from the throttle valve 605 flows only into #2 and #4 pressure chambers, resulting in increased movement of the plungers 621b and 621d in the #2 and #4 pressure chambers.

FIGS. 39(a) to 39(f) show operations of the pump 50 when the engine speed is low.

Similar to the third embodiment, when the engine speed is lower than 1500 rpm, the ECU 6 actuates the pump 50 in the low engine speed control mode in which the valve on-duration T1 and the fluid path opening area of the throttle valve 605 are both controlled.

The ECU 6 determines the valve on-duration T1 in synchronism with inputs of the NE pulses produced by outputs from the engine speed sensor 502 and starts to energize the throttle valve 605 when the plungers 621a and 621c in the #1 and #3 pressure chambers reach the top of the lift curve of the cam 613, as shown in FIG. 39(d), and when the plungers 621b and 621d in the #2 and #4 pressure chambers reach the top of the lift curve of the cam 613, as shown in FIG. 39(e). Upon energization of the throttle valve 605, the fuel is sucked into the #1, #2, #3, and #4 pressure chambers at the rate depending upon the rate of current flow to the throttle valve 605.

For instance, when it is required to feed a small quantity of fuel to the common rail 4, the ECU 6 starts at time a' to energize the throttle valve 605. All the plungers 621a to 621c in the #1 to #4 pressure chambers are in the suction stroke, so that the fuel pressure supplied from the throttle valve 605 are distributed to the #1 to #4 pressure chambers. The plungers 621a to 621c are moved slowly. When time b' is reached, the valve on-duration T1 expires. The ECU 6 closes the throttle valve 605 to stop the suction of fuel to all the #1 to #4 pressure chambers. The plungers 621a to 621d are held as they are regardless of rotation of the cam 613. The holding of the plungers 621a and 621c in the #1 and #3 pressure chambers continues until time d', while the holding of the plungers 621b and 621d of the #2 and #4 pressure chambers continues until the cam surface of the cam 613 reaches the plungers 621b and 621d at time c'.

When time d' is reached, the ECU 6 energizes the throttle valve 605 again. The #1 and #3 pressure chambers resume sucking the fuel, while the plungers 621b and 621d in the #2 and #4 pressure chambers reach the top of the lift curve of the cam 613, after which the #2 and #4 pressure chambers start to suck the fuel.

When time e' is reached, the ECU 6 deenergizes the throttle valve 605. All the #1 to #4 pressure chambers stop sucking the fuel. The plungers 621a to 621d are held as they are regardless of rotation of the cam 613. The holding of the plungers 621b and 621d in the #2 and #4 pressure chambers continues until time g', while the holding of the plungers 621a and 621c of the #1 and #3 pressure chambers continues until the cam surface of the cam 613 reaches the plungers 621a and 621c at time f'.

As apparent from the above discussion, the movement of the plungers 621a and 621c in the #1 and #4 pressure chambers during the feed stroke is shifted from that of the plungers 621 c and 621 d in the #2 and #4 pressure chambers during the feed stroke. This allows a maximum torque of the cam 613 required to move the plungers 621a to 621d to be decreased.

Even when the suction process in one of the first and second fuel feed lines is started during a time interval between completion of the suction process and start of the feed process in the other of the first and second fuel feed lines, the rate at which the fuel is sucked into the pressure chambers in the other of the first and second fuel feed lines is controlled by the degree of opening of the throttle valve 605. Thus, even when it is required to feed a small quantity of fuel to the common rail 4, the adjustment of quantity of fuel discharged from the pump 50 is achieved with high accuracy.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A fuel injection apparatus for an internal combustion engine comprising:

a fuel injection pump which sucks fuel from a feed pump in synchronization with rotation of the engine and pressurizes and discharges the fuel for fuel injection to the engine;

a metering valve disposed between said feed pump and said fuel injection pump to regulate the quantity of fuel sucked into said fuel injection pump, said metering valve having formed therein a fluid path communicating at one end with said feed pump and at the other end with said fuel injection pump and a valve member designed to selectively open and close the fluid path and change an area of the fluid path opened by the valve member; and a controller which actuates said metering valve so that a pressure of the fuel discharged from said fuel pump reaches a target pressure, said controller controlling 1) a valve on-off duration in which the valve member of said metering valve opens and closes the fluid path in a cycle to establish and block fluid communication between said feed pump and said fuel injection pump, and 2) the opened area of the fluid path independently as a function of an engine operating condition so that the amount of opened area falls within a continuous range of values.

2. A fuel injection apparatus as set forth in claim 1, wherein said controller actuates said metering valve in a first control mode in which the valve on-off duration and the opened area of the fluid path of said metering valve are both controlled when an engine speed is low and in a second control mode in which only the opened area of the fluid path of said metering valve is controlled when the engine speed is high.

3. A fuel injection apparatus as set forth in claim 1, wherein said metering valve includes a solenoid valve which moves the valve member, and wherein said controller controls an on-off operation of the solenoid valve and a rate of current supplied to the solenoid valve to regulate the on-off duration of said metering valve and the opened area of the fluid path.

4. A fuel injection apparatus as set forth in claim 1, wherein said fuel injection pump feeds the fuel to an accumulator chamber storing therein the fuel under high pressure for supplying the fuel to injectors installed in cylinders of the engine, and wherein said controller determines the on-off duration of said metering valve and the opened area of the fluid path based on an actual fuel pressure in the accumulator chamber, a target injection quantity of the fuel and a target pressure of the fuel injected to the engine from the injectors, and a speed of the engine so that the actual fuel pressure in the accumulator chamber reaches the target pressure of fuel.

5. A fuel injection apparatus for an internal combustion engine comprising:

a variable discharge pump driven in synchronization with rotation of the engine to pressurize and supply fuel to an accumulator chamber from which the fuel is injected into cylinders of the engine;

a solenoid valve moving a valve member linearly to open and close a fluid path connecting at one end with an inlet and at the other end with an outlet of said variable discharge pump; and a controller monitoring an operating condition of the engine, said controller actuating said solenoid valve in one of a first control mode and a second control mode according to the operating condition of the engine, the first control mode controlling both 1) a valve on-duration in which the solenoid valve is turned on to open the fluid path through the valve member and 2) an area of the fluid path opened by the valve member to establish fluid communication between the inlet and outlet of said variable discharge pump so that the amount of opened area of the fluid path falls within a continuous range of values, and the second control mode controlling only the opened area of the fluid path opened by the valve member so that the amount of opened area of the fluid path falls within a continuous range of values.

6. A fuel injection apparatus as set forth in claim 5, wherein said controller monitors a speed of the engine as the operating condition and actuates said solenoid valve in the first control mode when the speed of the engine is low and in the second control mode when the speed of the engine is high.

7. A fuel injection apparatus as set forth in claim 5, wherein said variable discharge pump includes a moving member which rotates to suck and feed the fuel cyclically, further comprising an angular position determining circuit which determines an angular position of the moving member, and wherein said controller monitors the angular position of the moving member determined by said angular position determining circuit and controls an on-off operation of the solenoid valve in synchronization with feeding of the fuel by said variable discharge pump.

8. A fuel injection apparatus as set forth in claim 6, wherein said solenoid valve is disposed in the inlet of said variable discharge pump.

9. A fuel injection apparatus as set forth in claim 6, wherein said solenoid valve includes a coil connecting at a first end with a power supply terminal and at a second end with a grounding terminal, and wherein said controller includes a solenoid drive circuit which includes a first switching element connecting with the second end of the coil to control a current flow through the coil, a diode disposed in a circuit line extending in parallel to the coil between the power supply terminal and the grounding terminal, allowing the current flow only to the power supply terminal from the grounding terminal, and a second switching element which is disposed in a portion of the circuit line between the diode and the grounding terminal and which is turned on when the solenoid valve is energized to open the fluid path to allow the current to flow through the circuit line.

10. A fuel injection apparatus as set forth in claim 9, wherein the solenoid drive circuit includes a step-up circuit which connects with the first switching element and which steps up an electric potential appearing at the grounding terminal of the coil temporarily.

11. A fuel injection apparatus for an internal combustion engine comprising:

a variable discharge pump driven in synchronization with rotation of the engine to pressurize and supply fuel to an accumulator chamber from which the fuel is injected into cylinders of the engine;

a solenoid valve moving a valve member linearly to open and close a fluid path connecting at one end with an inlet and at the other end with an outlet of said variable discharge pump; and a controller monitoring an operating condition of the engine, said controller regulating 1) an amount of movement of the valve member so as to control an opened area of the fluid path such that it falls within a continuous range of values according to a quantity of the fuel to be fed to the accumulator chamber and 2) a valve on-duration in which the solenoid valve is turned on to open the fluid path through the valve member according to the operating condition of the engine.

12. A fuel injection apparatus as set forth in claim 11, wherein said controller monitors a speed of the engine as the operating condition and shortens the valve on-duration as the speed of the engine decreases.

13. A fuel injection apparatus as set forth in claim 11, wherein said variable discharge pump includes a moving member which rotates to suck and feed the fuel cyclically, further comprising an angular position determining circuit which determines an angular position the moving member of said variable discharge pump, and wherein said controller monitors the angular position of the moving member determined by said angular position determining circuit and controls an on-off operation of the solenoid valve in synchronism with feeding of the fuel by said variable discharge pump.

14. A fuel injection apparatus as set forth in claim 11,wherein said solenoid valve is disposed in the inlet of said variable discharge pump.

15. A fuel injection apparatus as set forth in claim 11, wherein said solenoid valve includes a coil connecting at a first end with a power supply terminal and at a second end with a grounding terminal, and wherein said controller includes a solenoid drive circuit which includes a first switching element connecting with the second end of the coil to control a current flow through the coil, a diode disposed in a circuit line extending in parallel to the coil between the power supply terminal and the grounding terminal, allowing the current flow only to the power supply terminal from the grounding terminal, and a second switching element which is disposed in a portion of the circuit line between the diode and the grounding terminal and which is turned on when the solenoid valve is energized to open the fluid path to allow the current to flow through the circuit line.

16. A fuel injection apparatus as set forth in claim 15, wherein the solenoid drive circuit includes a step-up circuit which connects with the first switching element and which steps up an electric potential appearing at the grounding terminal of the coil temporarily.

17. A variable discharge pump comprising:

a pump body having formed therein a cylindrical chamber within which a plunger is disposed slidably to define a pressure chamber between a head of the plunger and an inner wall of the cylindrical chamber;

a plunger moving member disposed within said pump body, moving the plunger in a first direction to increase a volume of the pressure chamber to suck fuel from an inlet line and in a second direction to decrease the volume of the pressure chamber to pressurize and feed the sucked fuel from an outlet line;

a throttle valve opening and closing a portion of the inlet line leading to the pressure chamber in said pump body, said throttle valve being designed to change an opened area of the portion of the inlet line;

a check valve allowing the fuel to flow from said throttle valve to the pressure chamber during a time when the fuel is sucked into the pressure chamber and blocking flow of the fuel from the pressure chamber to said throttle valve during a time when the fuel is pressurized and fed to the outlet line; and a controller controlling 1) a valve on-off duration in which said throttle valve opens and closes the portion of the inlet line in a cycle and 2) the opened area of the portion of the inlet line to regulate a quantity of the fuel flowing into the pressure chamber so that the amount of opened area of the portion of the inlet line falls within a continuous range of values.

18. A variable discharge pump as set forth in claim 17, wherein said controller determines a valve on-duration in which said throttle valve opens the portion of the inlet line in synchronism with an operation of said plunger moving member.

19. A variable discharge pump comprising:

a pump body having formed therein cylindrical chambers within which first and second plungers are disposed slidably to define first and second pressure chambers between heads of the first and second plungers and inner walls of the cylindrical chambers, respectively;

a plunger moving member disposed within said pump body, moving the first and second plungers in a first direction to increase volumes of the first and second pressure chambers to suck fuel from an inlet line and in a second direction to decrease the volumes of the first and second pressure chambers to pressurize and feed the sucked fuel from an outline line, said plunger moving member moving the first and second plungers with different timings;

a throttle valve opening and closing a portion of the inlet line leading to the pressure chambers in said pump body, said throttle valve being designed to change an opened area of the portion of the inlet line;

first and second check valves disposed in first and second fluid paths connecting the inlet line and the first and second pressure chambers, respectively, said first and second check valves allowing the fuel to flow from said throttle valve to the first and second pressure chambers through the first and second fluid paths during a time when the fuel is sucked into the pressure chambers and blocking flow of the fuel from the first and second pressure chambers to said throttle valve through the first and second fluid paths during a time when the fuel is pressurized and fed to the outlet line; and a controller controlling 1) a valve on-off duration in which said throttle valve opens and closes the portion of the inlet line in a cycle and 2) the opened area of the portion of the inlet line to regulate a quantity of the fuel flowing into the first and second pressure chambers so that an amount of opened area of the portion of the inlet line falls within a continuous range of values.

20. A fuel injection apparatus for an internal combustion engine comprising:

a variable discharge pump including (a) a pump body having formed therein a cylindrical chamber within which a plunger is disposed slidably to define a pressure chamber between a head of the plunger and an inner wall of the cylindrical chamber, (b) a plunger moving member disposed within said pump body, driven in synchronization with rotation of the engine, said plunger moving member moving the plunger in a first direction to increase a volume of the pressure chamber to suck fuel from an inlet line and in a second direction to decrease the volume of the pressure chamber to pressurize and feed the sucked fuel to an outlet line, (c) a throttle valve opening and closing a portion of the inlet line leading to the pressure chamber in said pump body, said throttle valve being designed to change an opened area of the portion of the inlet line, and (d) a check valve allowing the fuel to flow from said throttle valve to the pressure chamber during a time when the fuel is sucked into the pressure chamber and blocking flow of the fuel from the pressure chamber to said throttle valve during a time when the fuel is pressurized and fed to the outlet line;

an accumulator storing therein the fuel fed from said variable discharge pump for fuel injection to the engine;

an accumulator pressure sensor measuring a pressure of the fuel in said accumulator chamber; and a controller controlling 1) a valve on-off duration in which said throttle valve opens and closes the portion of the inlet line in a cycle and 2) the opened area of the portion of the inlet line so that the amount of opened area falls within a continuous range of values to regulate a quantity of the fuel flowing into the pressure chamber so that the pressure of the fuel in said accumulator reaches a target pressure.

21. A fuel injection apparatus as set forth in claim 20, further comprising an engine speed determining circuit which determines a speed of the engine, and wherein said controller controls the valve on-off duration only when the speed of the engine is lower than a predetermined value.

22. A fuel injection apparatus for an internal combustion engine comprising:

a variable discharge pump including (a) a pump body having formed therein cylindrical chambers within which first and second plungers are disposed slidably to define first and second pressure chambers between heads of the first and second plungers and inner walls of the cylindrical chambers, respectively, (b) a plunger moving member disposed within said pump body, moving the first and second plungers in a first direction to increase volumes of the first and second pressure chambers to suck fuel from an inlet line and in a second pressure chambers to suck fuel from an inlet line and in a second direction to decrease the volumes of the first and second pressure chambers to pressurize and feed the sucked fuel to an outlet line, said plunger moving member moving the first and second plungers with different timings, (c) a throttle valve opening and closing a portion of the inlet line leading to the pressure chambers in said pump body, said throttle valve being designed to change an opened area of the portion of the inlet line, and (d) first and second check valves disposed in first and second fluid paths connecting the inlet line and the first and second pressure chambers, respectively, said first and second check valves allowing the fuel to flow from said throttle valve to the first and second pressure chambers through the first and second fluid paths during a time when the fuel is sucked into the pressure chambers and blocking flow of the fuel from the first and second pressure chambers to said throttle valve through the first and second fluid paths during a time when the fuel is pressurized and fed to the outlet line;

an accumulator storing therein the fuel fed from said variable discharge pump for fuel injection to the engine;

an accumulator pressure sensor measuring a pressure of the fuel in said accumulator chamber; and a controller controlling 1) a valve on-off duration in which said throttle valve opens and closes the portion of the inlet line in a cycle and 2) the opened area of the portion of the inlet line so that the amount of opened area of the portion of the inlet line falls within a continuous range of values to regulate a quantity of the fuel flowing into the pressure chamber, whereby the pressure of the fuel in said accumulator reaches a target pressure.

23. A fuel injection apparatus as set forth in claim 22, further comprising an engine speed determining circuit which determines a speed of the engine, and wherein said controller controls the valve on-off duration only when the speed of the engine is lower than a predetermined value.

24. A fuel injection apparatus for an internal combustion engine comprising:

a high-pressure pump supplying a high-pressure fuel to the internal combustion engine;

a control valve designed to move a valve member to selectively open and close a fluid path extending through an inlet and an output of said high-pressure pump; and a controller controlling movement of the valve member of said control valve to 1) regulate an opened area of the fluid path in a first control mode so that the amount of opened area of the fluid path falls within a continuous range of valves and 2) also controlling a path opened duration in which the fluid path is opened by the valve member in a second control mode, said controller controlling activation of the first and second control modes as a function of a given parameter.

25. A fuel injection apparatus as set forth in claim 24, wherein said controller controls the activation of the first and second control modes as a function of the given parameter indicating a preselected operating condition of the internal combustion engine so as to bring an amount of high-pressure fuel to be supplied to the internal combustion engine into agreement with a target value.

26. A fuel injection apparatus as set forth in claim 25, wherein said high-pressure pump operates cyclically to pressurize fuel inputted thereto in synchronism with rotational movement of the internal combustion engine.

* * * * *